(12) United States Patent
Nortrup

(10) Patent No.: US 8,478,512 B2
(45) Date of Patent: *Jul. 2, 2013

(54) REAL-TIME TRAFFIC CONDITION MEASUREMENT USING NETWORK TRANSMISSION DATA

(76) Inventor: Edward H. Nortrup, Stoneham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/295,226

(22) Filed: Nov. 14, 2011

(65) Prior Publication Data

US 2012/0065872 A1  Mar. 15, 2012

Related U.S. Application Data

(63) Continuation of application No. 13/019,869, filed on Feb. 2, 2011, which is a continuation of application No. 12/391,745, filed on Feb. 24, 2009, now Pat. No. 7,904,240, which is a continuation of application No. 11/052,547, filed on Feb. 7, 2005, now Pat. No. 7,522,995.

(60) Provisional application No. 60/541,990, filed on Feb. 5, 2004, provisional application No. 60/578,494, filed on Jun. 10, 2004, provisional application No. 60/617,857, filed on Oct. 12, 2004.

(51) Int. Cl.
*G06F 19/00* (2011.01)

(52) U.S. Cl.
USPC .......................................... 701/117

(58) Field of Classification Search
USPC ................. 701/117–119, 400–414, 416, 418, 701/419, 421, 428
See application file for complete search history.

(56) References Cited

U.S. PATENT DOCUMENTS 6,594,576 B2 * 7/2003 Fan et al. ...................... 701/117
6,611,750 B2 * 8/2003 MacPhail et al. ............. 701/117
2011/0276259 A1 * 11/2011 Nortrup ........................ 701/118

* cited by examiner

*Primary Examiner* — Kim T Nguyen
(74) *Attorney, Agent, or Firm* — GTC Law Group LLP & Affiliates

(57) ABSTRACT

In embodiments of the present invention, data that is transmitted over a network that is utilized by cell phones within multiple automobiles may be used to calculate real-time traffic conditions, including but not limited to the time it will take to travel a certain distance using a given route. Real-time traffic conditions may be calculated by, for example, measuring real-time traffic density for a specific geographic region. Traffic conditions and traffic density may be calculated using parameters including, but not limited to, a time of day, a day of the week corresponding to the real-time calculation of the traffic condition measure, a weather condition corresponding to the real-time calculation of the traffic condition measure; or some other parameter relating to traffic conditions. This real-time traffic condition data may be manually accessed by a user from their cell phone or automatically provided to a user's cell phone.

20 Claims, 66 Drawing Sheets

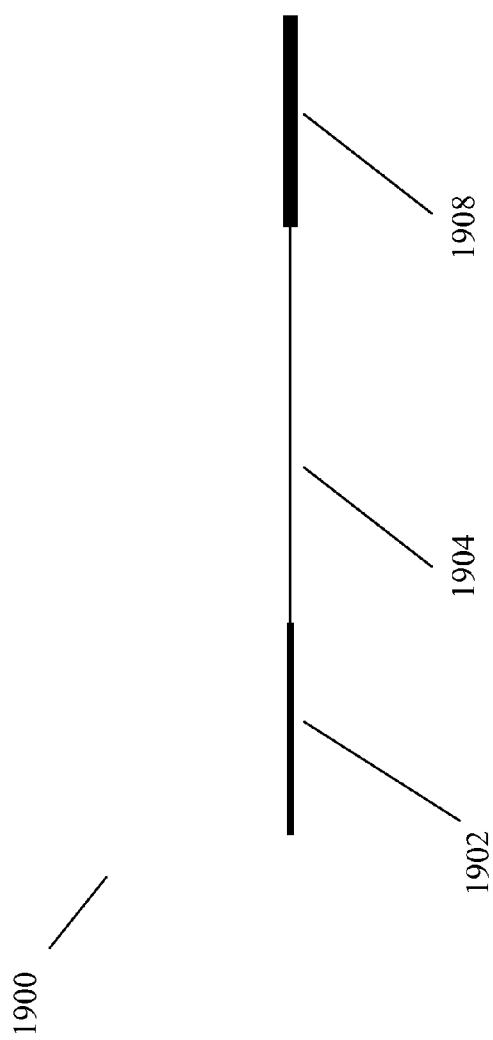

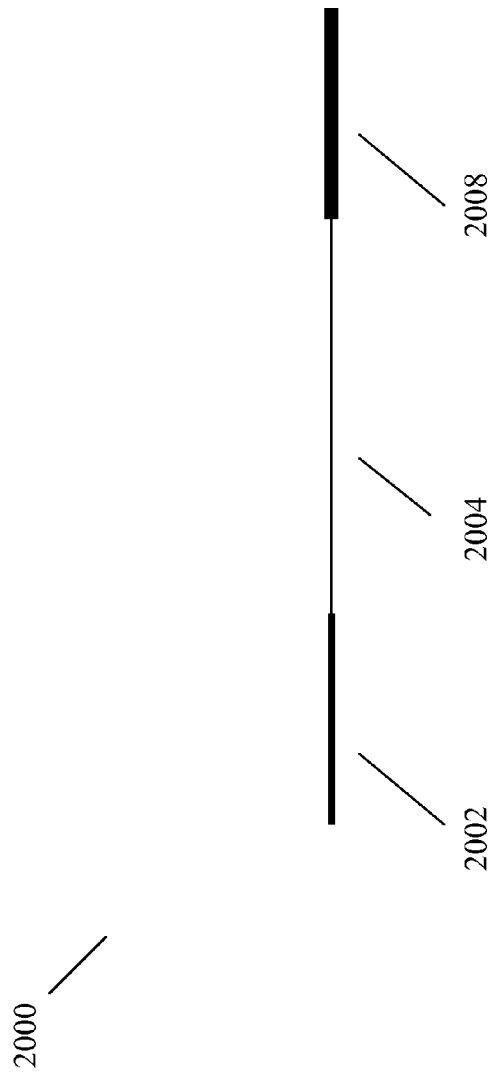

REAL-TIME TRAFFIC CONDITION MEASUREMENT USING NETWORK TRANSMISSION DATA

RELATED APPLICATIONS

This application is a continuation of U.S. application Ser. No. 13/019,869, filed Feb. 2, 2011. U.S. application Ser. No. 13/019,869 is a continuation of U.S. application Ser. No. 12/391,745, filed Feb. 24, 2009, now U.S. Pat. No. 7,904,240, issued Mar. 8, 2011. U.S. Pat. No. 7,904,240 is a continuation of U.S. application Ser. No. 11/052,547, filed Feb. 7, 2005, now U.S. Pat. No. 7,522,995, issued Apr. 21, 2009. Application Ser. No. 11/052,547 claims the benefit of the following U.S. Provisional Patent Applications: U.S. Prov. App. No. 60/541,990, filed Feb. 5, 2004; U.S. Prov. App. No. 60/578,494, filed Jun. 10, 2004; and U.S. Prov. App. No. 60/617,857, filed Oct. 12, 2004.

The entire contents of each of the foregoing applications is incorporated herein by reference.

BACKGROUND

1. Field of the Invention

The present invention relates to systems and methods for locating positions, determining route information and providing information to users. More particularly, in embodiments, systems and methods for mapping positions, predicting traffic patterns, presenting route information, presenting navigation information, presenting information related to locations, and providing intuitive interfaces to a user for retrieving information.

2. Description of Related Art

People and things move throughout the world while interacting with many other people and objects. Methods and systems of tracking and predicting such movements can improve operations. Generally, these systems are poor and do not provide for adequate information for acceptable tracking or predicting.

SUMMARY OF THE INVENTION

In embodiments of the present invention, a computer program product may use data that is transmitted over a network that is utilized by cell phones within multiple automobiles to calculate real-time traffic conditions, including but not limited to the time it will take to travel a certain distance using a given route. Real-time traffic conditions may be calculated by, for example, measuring real-time traffic density for a specific geographic region. Traffic conditions and traffic density may be calculated using parameters including, but not limited to, a time of day corresponding to the real-time calculation of the traffic condition measure, a day of the week corresponding to the real-time calculation of the traffic condition measure, a weather condition corresponding to the real-time calculation of the traffic condition measure, a road condition corresponding to the real-time calculation of the traffic condition measure, or some other parameter relating to traffic conditions. This real-time traffic condition data may be manually accessed by a user from their cell phone. The real-time traffic condition data may also be automatically provided to a user's cell phone.

In embodiments of the present invention, a computer program product may perform the steps of: identifying a first location, at time one, of a plurality of automobiles using triangulation to locate a cell phone within each of the plurality of automobiles, wherein the triangulation is based at least in part on data that is transmitted over a network that is utilized by the cell phone within each of the plurality of automobiles. Next, a second location may be identified, at a time two, subsequent to time one, for each of the plurality of automobiles using triangulation to locate the cell phone within each of the plurality of automobiles, wherein the triangulation is based at least in part on data that is transmitted over a network that is utilized by the cell phone within each of the plurality of automobiles. A vehicle speed may be calculated for each of the plurality of automobiles using the first location at time one and the second location at time two and the calculated vehicle speed may be used to create a traffic condition measure for a route in proximity to the first and second locations. Calculations may be iteratively performed using the aforementioned process, in real-time, at a time interval to calculate a real-time traffic condition measure.

In embodiments, the real-time traffic condition measure may be a measure of traffic density and this measure of traffic density may be used to predict a travel time. The travel time prediction may be based at least in part on a measure of traffic density and at least one other parameter. The parameters may included, but are not limited to, a time of day corresponding to the real-time calculation of the traffic condition measure; a day of the week corresponding to the real-time calculation of the traffic condition measure; a weather condition corresponding to the real-time calculation of the traffic condition measure; a road condition corresponding to the real-time calculation of the traffic condition measure, or some other parameter relating to traffic conditions.

In embodiments of the present invention, a computer program product may perform the steps of: identifying a first location, at time one, of a plurality of automobiles using triangulation to locate a cell phone within each of the plurality of automobiles, wherein the triangulation is based at least in part on data that is transmitted over a network that is utilized by the cell phone within each of the plurality of automobiles. Next, a second location may be identified, at a time two, subsequent to time one, for each of the plurality of automobiles using triangulation to locate the cell phone within each of the plurality of automobiles, wherein the triangulation is based at least in part on data that is transmitted over a network that is utilized by the cell phone within each of the plurality of automobiles. A vehicle speed may be calculated for each of the plurality of automobiles using the first location at time one and the second location at time two and the calculated vehicle speed may be used to create a traffic condition measure for a route in proximity to the first and second locations. Calculations may be iteratively performed using the aforementioned process, in real-time, at a time interval to calculate a real-time traffic condition measure. A user request may be received from a user's cell phone for traffic condition information associated with the route and the real-time traffic condition measure may be displayed to the user's cell phone.

In embodiments, the real-time traffic condition measure presented to the display of a user's cell phone may be created upon receipt of the user's request. The user request may be a manual request or the user request may be an automated request that is sent from the user's cell phone upon the user's cell phone entering a geographic location. In embodiments, a geographic location may be a geographic region.

In embodiments, the real-time traffic condition measure presented to the display of the user's cell phone may derive from a second user's prior request for the same traffic information as requested by a prior user. The second user's request may be a manual request or the second user's request may be an automated request that is sent from the second user's cell phone upon the second user's cell phone entering a geographic location.

In embodiments of the present invention, a computer program product may perform the steps of: identifying the first location, at time one, of a plurality of automobiles using triangulation to locate a cell phone within each of the plurality of automobiles, wherein the triangulation is based at least in part on data that is transmitted over a network that is utilized by the cell phone within each of the plurality of automobiles. Next, a second location may be identified, at a time two, subsequent to time one, for each of the plurality of automobiles using triangulation to locate the cell phone within each of the plurality of automobiles, wherein the triangulation is based at least in part on data that is transmitted over a network that is utilized by the cell phone within each of the plurality of automobiles. A vehicle speed may be calculated using the first location at time one and the second location at time two and the calculated vehicle speed may be used to create a traffic condition measure for a route in proximity to the first and second locations. Calculations may be iteratively performed using the aforementioned process, in real-time, at a time interval to calculate a real-time traffic condition measure. A user request may be received from a user's cell phone for traffic condition information associated with the route and the real-time traffic condition measure may be displayed to the user's cell phone, wherein the presented real-time traffic condition measure is selected from a plurality of real-time traffic conditions measures based at least in part on the presented real-time traffic condition measure containing traffic data relating to a geographic area in proximity to a cell phone tower from which the user's request was received.

In embodiments, the presented real-time traffic condition measure may be calculated upon receipt of a user's request or calculated prior to receiving the user's request.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

FIG. 19 illustrates a map of traffic density according to the principles of the present invention.

FIG. 20 illustrates a map of traffic flow according to the principles of the present invention.

DETAILED DESCRIPTION OF THE PREFERRED EMBODIMENT(S)

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below.

An aspect of the present invention relates to providing maps, routes, directions, navigation, and other information relating to routes and or locations. In embodiments, maps, locations, routes and other information is provided to assist a user in assessing such information before, during, after and or in compilation of traveling. For example, improved methods and systems for providing travel time estimates and alternate routes are provided. These systems methods include, among other things, route generation in a real time mode and in a typical traffic condition mode. The typical conditions may include, among other things, travel conditions during a certain time of day, week, and or year to provide an improved estimate of travel time during these periods.

Figure 1:
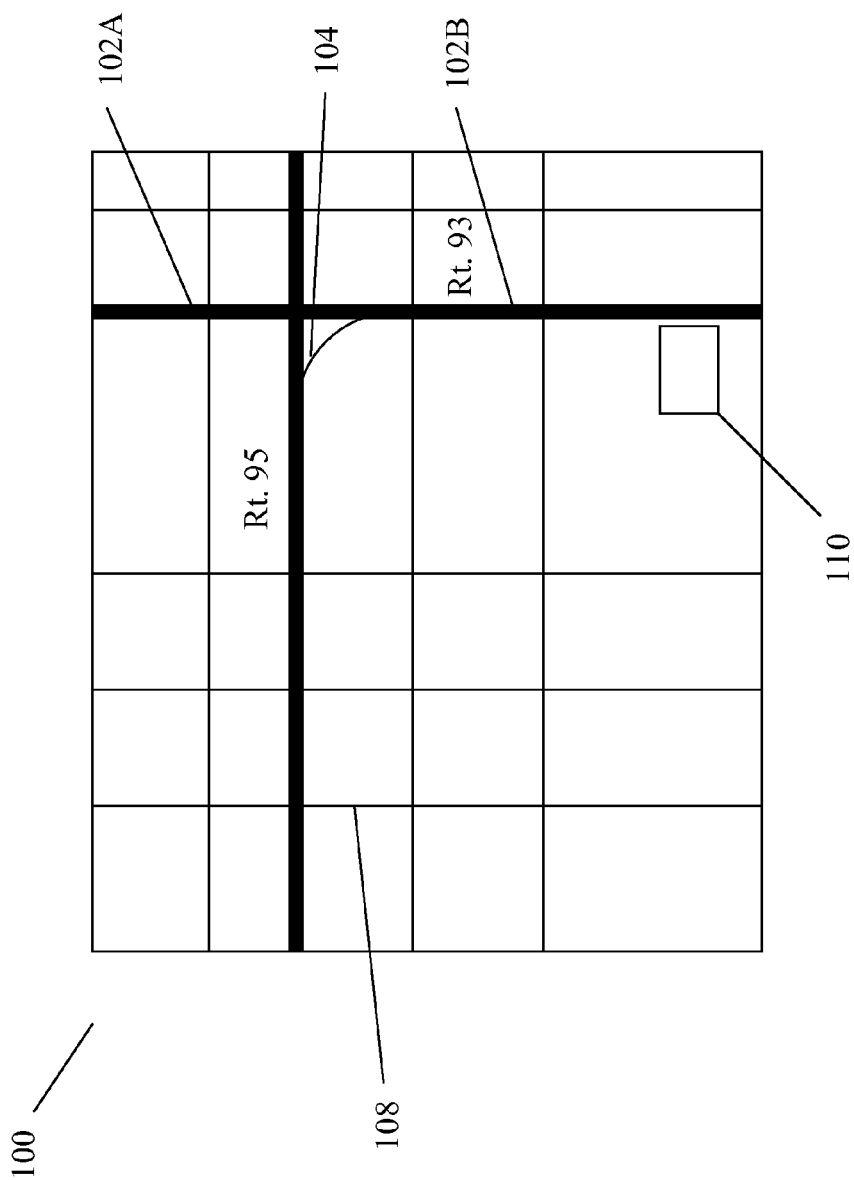
FIG. 1 illustrates a road map according to the principles of the present invention.

FIG. 1 illustrates a map 100 according to the principles of the present invention. In an embodiment, the map includes representations of highways 102A and 102B as well as secondary roads 108 and access ramp 104. The map may also include one or more landmarks, buildings, facilities and the like 110. A map according to the present invention may be used for a road map, trail map, facility map, store map, personal location map, traffic map, or other map as may be useful to a user. In an embodiment, the map may be used to facilitate setting directions, informing of congestion, informing of population, informing of attractions, or provide other information useful to a user.

Figure 2:
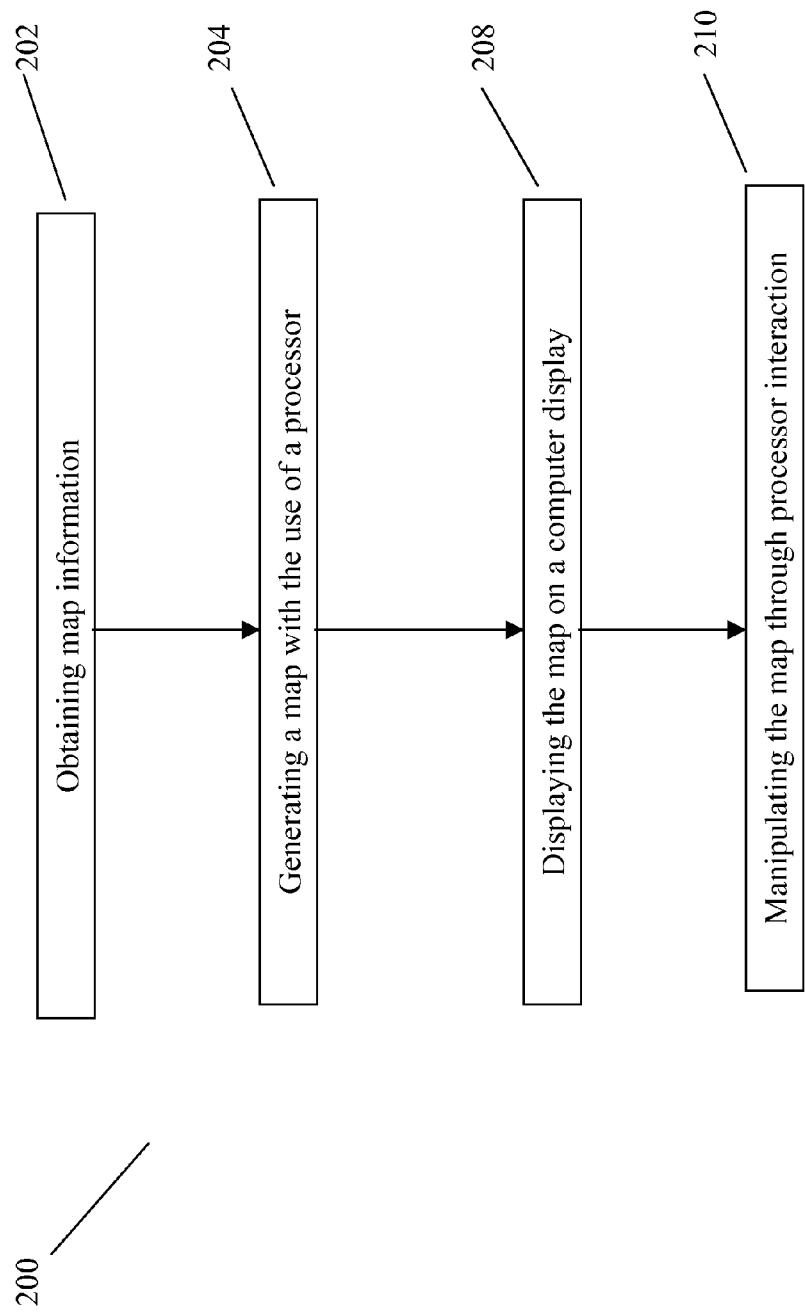
FIG. 2 illustrates a flow diagram for presenting a computer generated map according to the principles of the present invention.

FIG. 2 illustrates a method for generating a map using a computer to facilitate the generation 200 according to the principles of the present invention. The method 200 includes obtaining map information 202. For example, map information may be gathered through manual sources, reference sources, computer sources, online sources, or other sources where map information may be found. The method 200 includes generating a map facilitated by a computer 204. For example, the information gathered may be used by a computer program to generate a map 100. The method 200 includes displaying the map on a computer screen, mobile communication device screen, or other screen adapted to display information to be available to a user 208. The method 200 includes a step of manipulating the map through the processing facility 210. For example, a user may interact with the map by zooming in and out, moving center of the map to another location, or other interactions. In an embodiment, a user may request a route from location to location and the computing facility may provide a suggested route. In an embodiment, the computing facility may provide an estimated travel time associated with the route.

Figure 3:
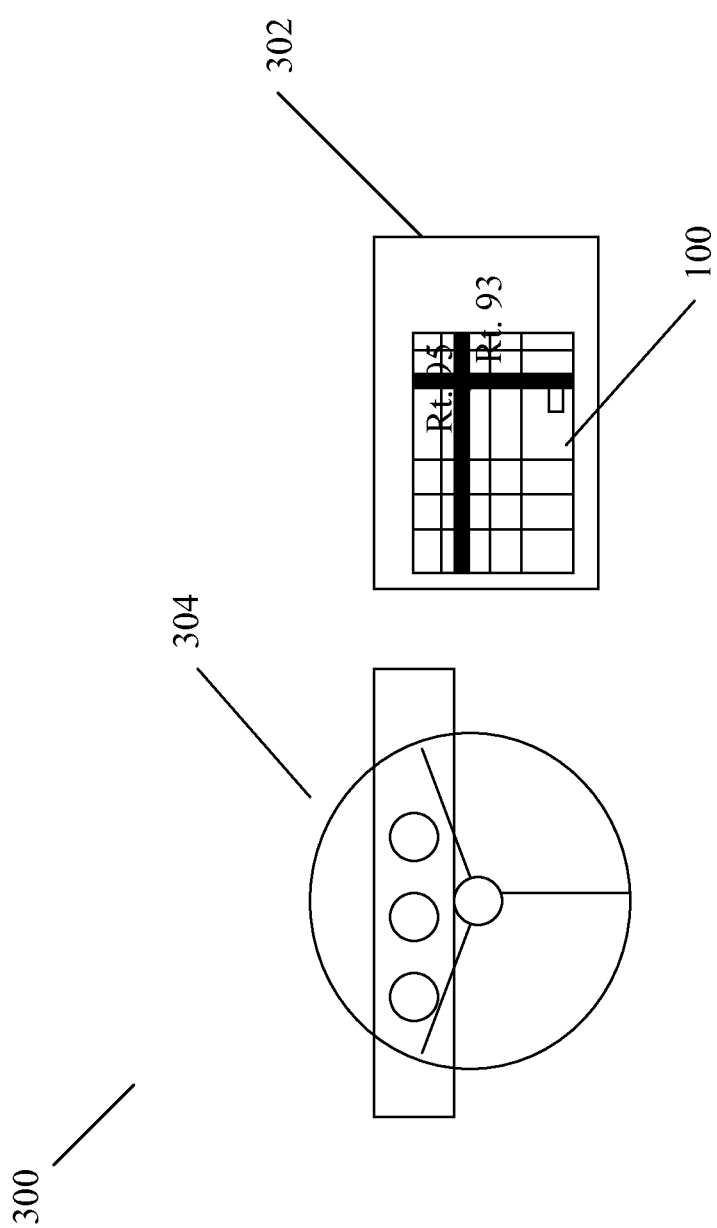
FIG. 3 illustrates an in car map with gps according to the principles of the present invention.

FIG. 3 illustrates a mobile mapping facility 302 in an automobile 300 according to the principles of the present invention. The automobile 300 includes a cluster of performance meters 304 (e.g. speedometer). In an embodiment, the mobile mapping facility 302 may be affixed to another facility (e.g. an automobile). In an embodiment, the mobile mapping facility 302 may be a hand held or otherwise mobile for personal mobility. The mobile mapping facility 302 includes a display facility where a map 100 may be displayed. The mobile mapping facility 302 may include a computer operating facility to display the map as well as allow a user to interact with the map. The mapping facility 302 may also include a gps or other locating facility to provide location information to the computing facility. In an embodiment, location information may be used to update the map, provide warnings, or other information. In an embodiment, a user may request a route from location to location and the mobile mapping facility 302 may provide a suggested route. In an embodiment, the computing facility may provide an estimated travel time associated with the route. In an embodiment, the computing facility may regenerate new route suggestions based on route information provided by the user, gps facility, locating facility, external data or internal data.

Figure 4:
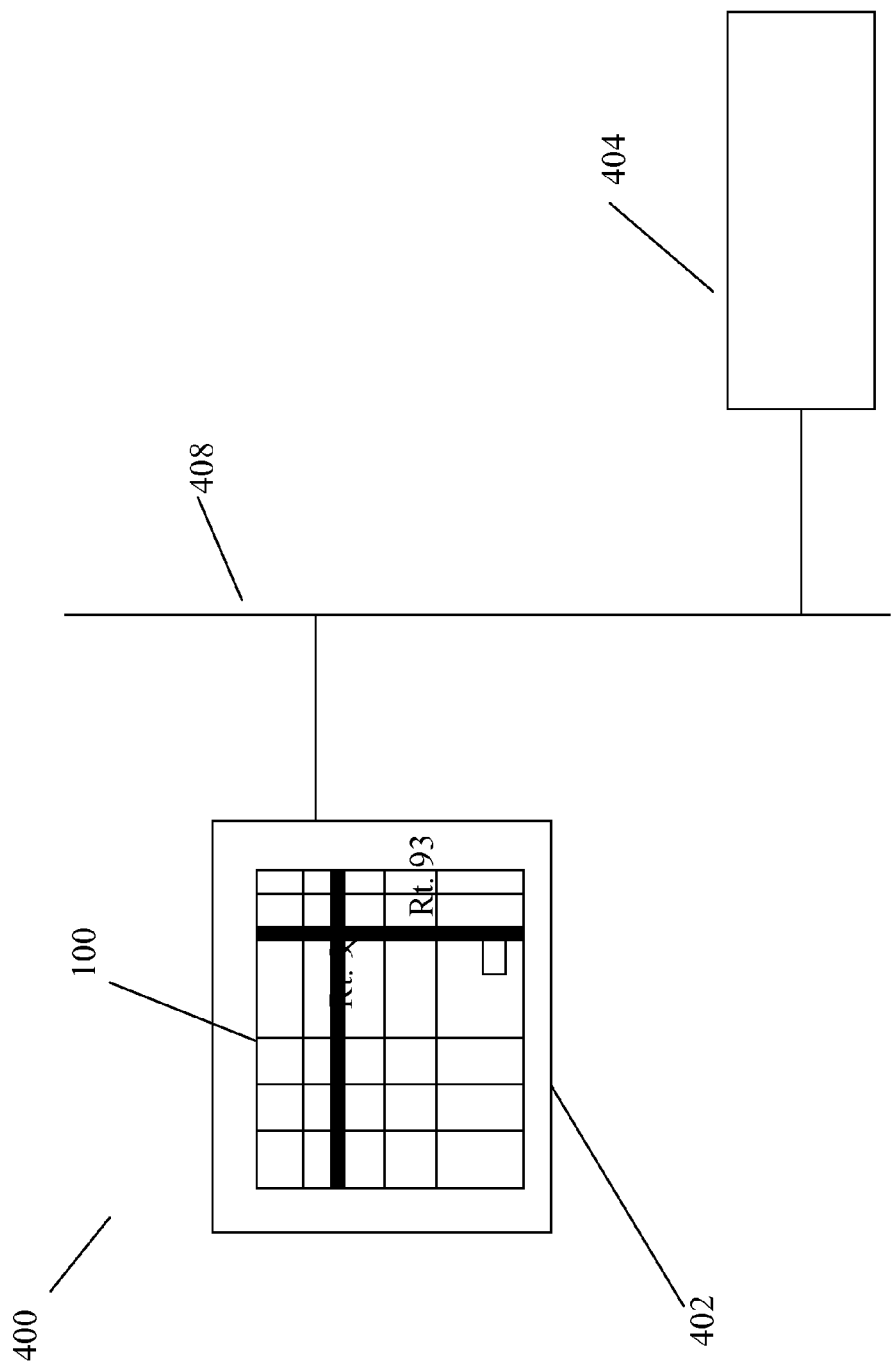
FIG. 4 illustrates a web based map according to the principles of the present invention.

FIG. 4 illustrates a networked mapping facility 400 according to the principles of the present invention. The networked mapping facility 400 includes a display facility 402 where a map 100 may be displayed for example. The display may be associated with a local computing facility (not shown) and the computing facility may be associated with a server computing facility 404 through a network 408. In an embodiment, the network 408 may be a local area network, wide area network, world wide web, personal network or other network. For example, a user may use a client application to access a website (e.g. mapquest.com) to request a map or directions. The server application may respond by providing the client application with the desired map and or directions from location to location. In an embodiment, the networked mapping facility 400 may regenerate new route suggestions based on route information provided by the user, gps facility, locating facility, external data or internal data.

Figure 5:
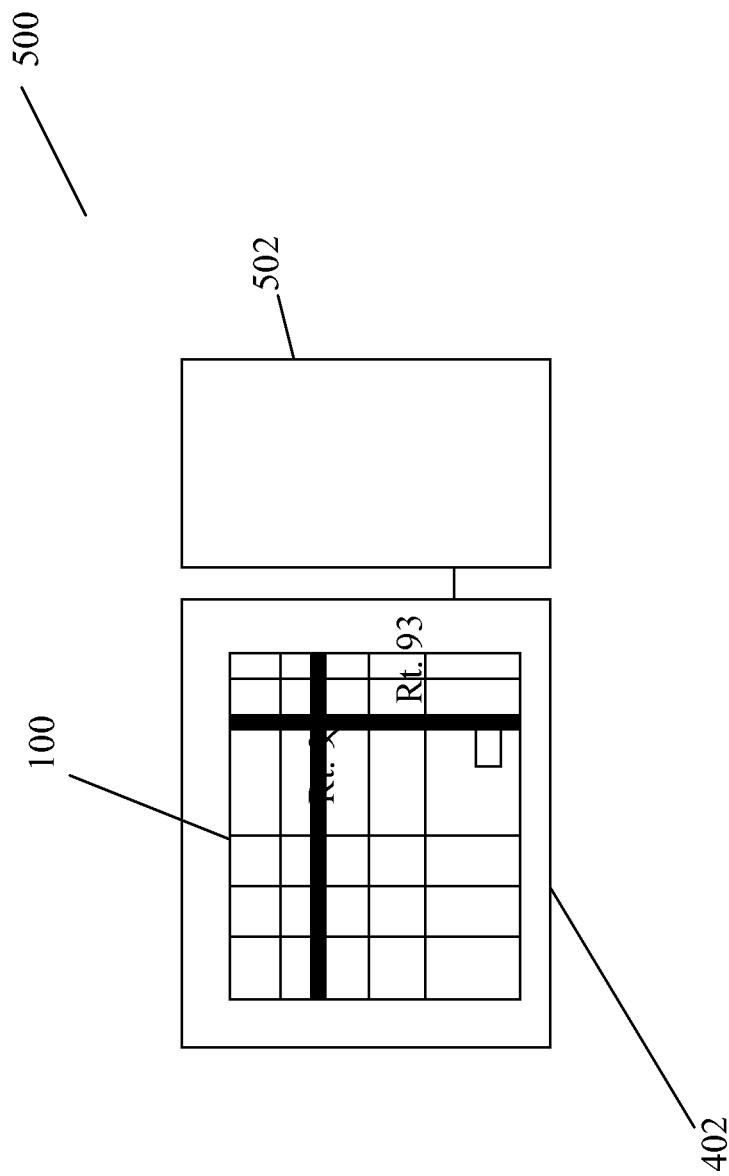
FIG. 5 illustrates a computer map according to the principles of the present invention.

FIG. 5 illustrates a local mapping facility 500 according to the principles of the present invention. The local mapping facility 500 includes a display facility 402 where a map 100 may be displayed for example. The local mapping facility 500 includes a computing facility 502 that is associated with the display facility 402. The computing facility 502 may generate maps according to the principles of the present invention. In an embodiment, a user may interact with the computing facility to display, manipulate or otherwise interact with a map and or the mapping software used to generate the map. In an embodiment, the local mapping facility 500 may regenerate new route suggestions based on route information provided by the user, gps facility, locating facility, external data or internal data.

Figure 6:
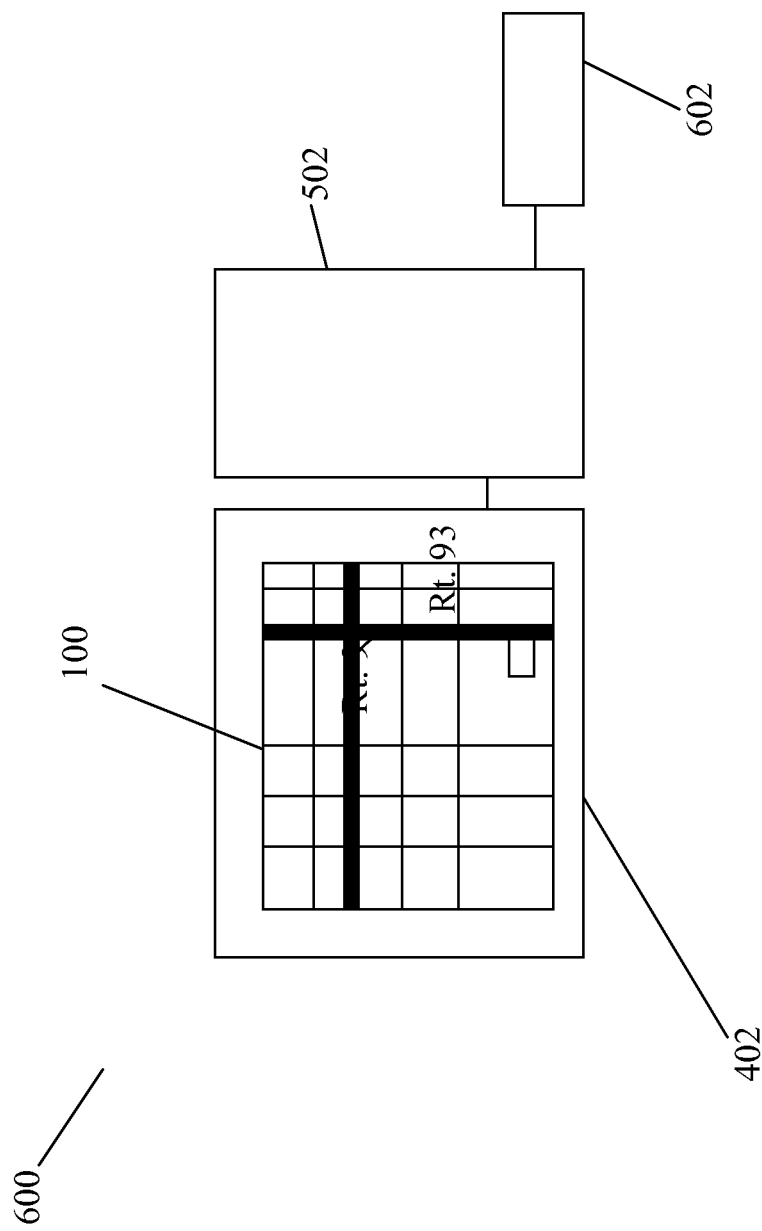
FIG. 6 illustrates a computer map with gps according to the principles of the present invention.

FIG. 6 illustrates a local mapping facility associated with information facility 602. In an embodiment, the information facility may be associated with the computing facility 502 through a network, or be locally accessible either internal or external to the computing facility 502. In an embodiment, the information facility 602 may be adapted to provide information to be used to generate a map or portion of a map. For example, the information facility may be a gps facility to generate location information, a database to supply route information, or other information required and or desired for map and or direction generation and or modification.

An aspect of the present invention involves locating vehicles, people or other things and using that information to facilitate travel. In an embodiment, mobile phones, or other transmitters, are located through triangulation (e.g. TruePosition triangulation software for 911 locations offered by TruePosition, Inc., King of Prussia, Pa.) or other techniques to locate vehicles on roadways. In an embodiment, the locations may be used to estimate roadway congestion and or travel speed. For example, cell phones in an area may be located and mapped against a known roadway map to determine roadway congestion levels. In another example, the position of the cell phone locations over a period of time may be tracked to estimate route speed. In an embodiment, cell phone locations are tracked while the cell phone is otherwise in normal use. In another embodiment, cell phones in an area are requested to transmit so their positions can be determined.

Figure 7:
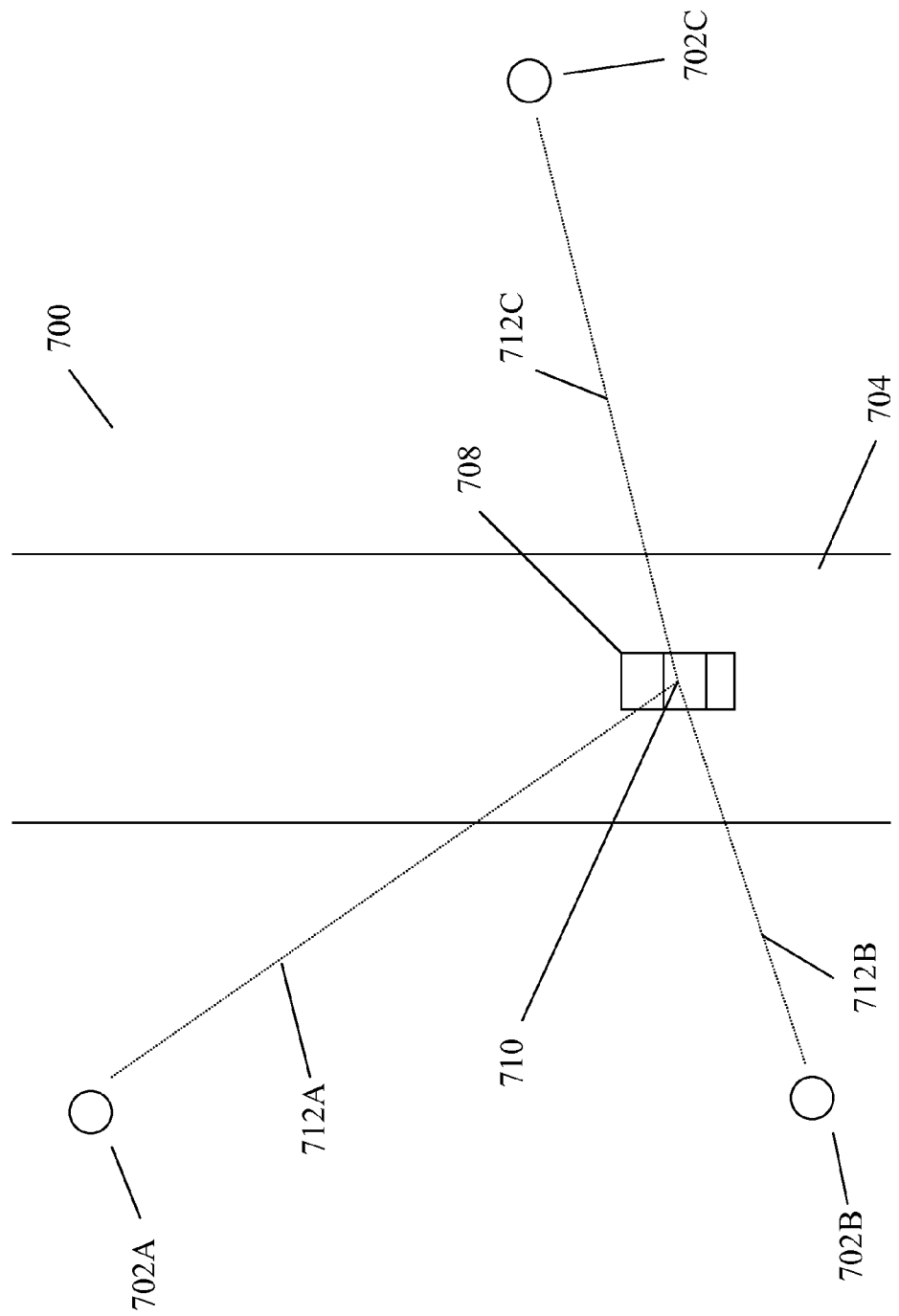
FIG. 7 illustrates a tracking position through cell phone triangulation according to the principles of the present invention.

FIG. 7 illustrates a location facility 700 according to the principles of the present invention. In an embodiment, a cell phone 710, or other transmitting device, is located through a triangulation system. For example, a user may be using their cell phone 710 and the triangulation system with cell towers 702A, 702B and 702C may locate and or track the position of the cell phone. The cell phone location may be mapped onto a roadway map to provide location, speed and or other travel information. In an embodiment, the cell phone 710 may be requested to make a transmission so the triangulation, or other locating system, can locate and or track the position of the cell phone or mapping on a roadway or route 704. The triangulation system may use a plurality of cell phone towers 702 and the plurality of towers may listen to a cell phone 710 transmissions 712. The transmissions 712 may be timed or power measured to determine the position of the cell phone. While many of the embodiments described herein refer to cell phones and cell phone triangulation techniques, the inventors envision many alternate transmission and location systems and the present invention encompasses such alternate transmission and location systems and methods. For example, a vehicle, cell phone or other device may be equipped with a gps locating facility and the device may transmit its location to another facility, or another facility may locate such device or transmission.

Figure 7A:
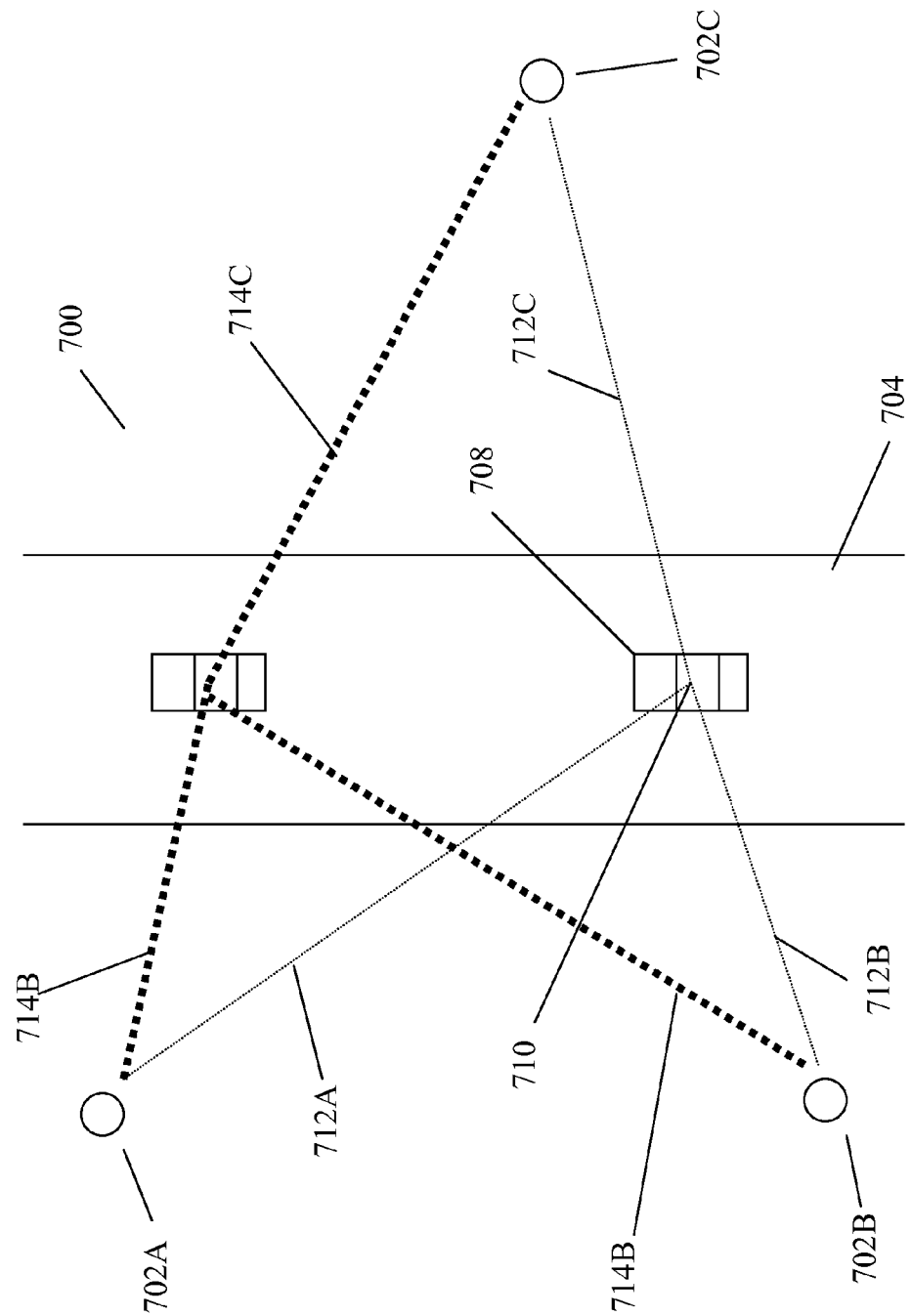
FIG. 7a illustrates a tracking multiple positions of a cell phone according to the principles of the present invention.

FIG. 7a illustrates the location system 700 according to the principles of the present invention tracking the position of a vehicle. The location system 800 includes a process for tracking the position of the cell phone 710 through second measurement of position 714. In an embodiment, the location system is used to track position and or estimate travel speed.

Figure 8:
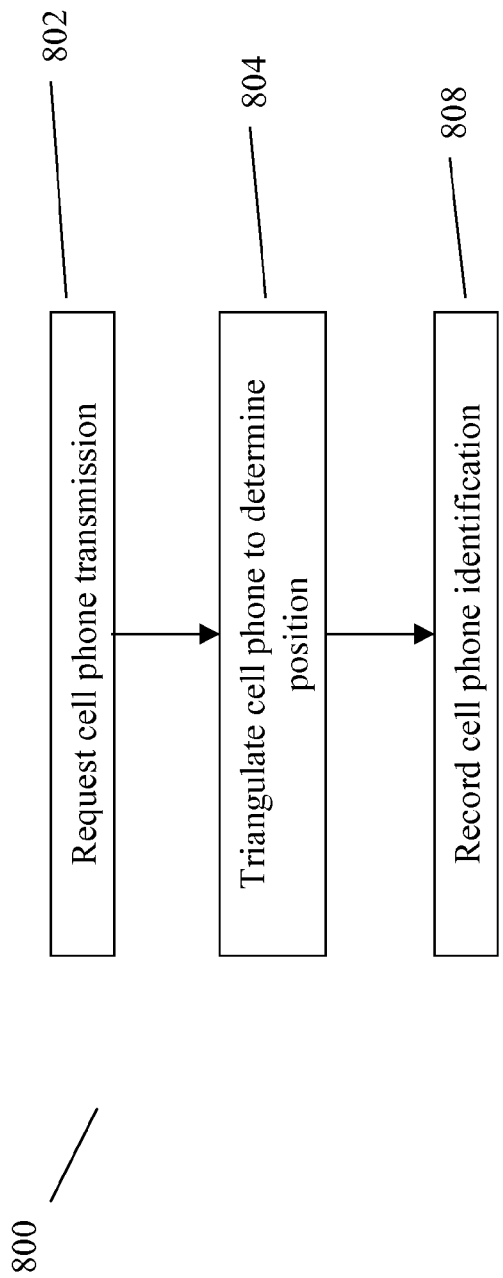
FIG. 8 illustrates a process for determining cell phone locations according to the principles of the present invention.

FIG. 8 illustrates a process for locating a cell phone or other transmitting device 800 according to the present invention. The process involves requesting a cell phone to make a transmission 802. In an embodiment, cell phones in an area may be requested to make a transmission. For example, a single cell tower may transmit a request to all cell phones within its reception area. In an embodiment, specific cell phone(s) may be requested to make transmissions. For example, known phone numbers (e.g. a block of known numbers) may be requested. In an embodiment, blocks of cell phones may be requested to make transmissions through staggered times to avoid an over-flow of information. The process of locating 800 further includes determining the cell phone(s) location through triangulation, or other means 804. The process also includes recording the cell phone locations 808. in an embodiment, recordation may be used to track the location and or determine the speed of the cell phone position change. In another embodiment, recordation 808 may not be accomplished. For example, a picture of cell phone locations may provide a congestion map whereby traffic conditions, or other parameters, are determined without needing an indication of speed.

Figure 9:
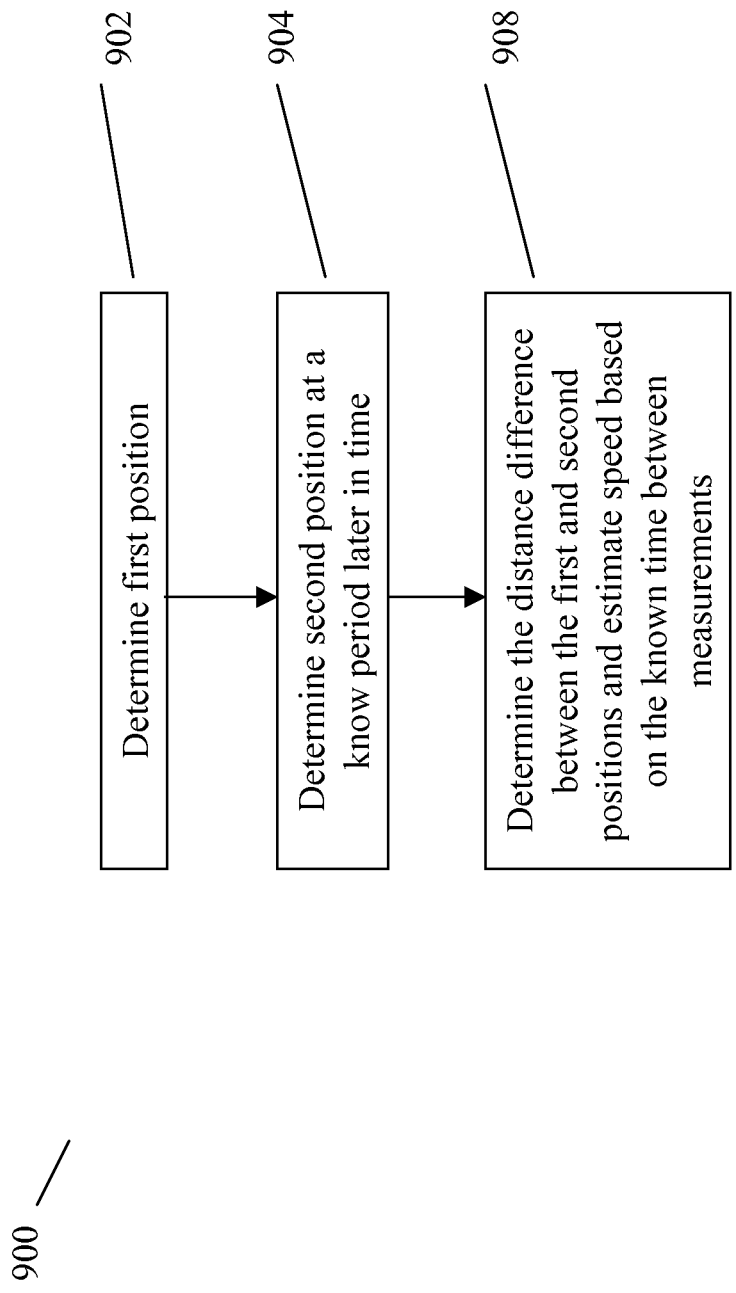
FIG. 9 illustrates a process for determining cell phone speed according to the principles of the present invention.

FIG. 9 illustrates a process for determining the speed, distance, direction, velocity or other parameter from a cell phone or other transmitting device according to the principles of the present invention. The process involves determining a first position of the cell phone 902, determining a second position of the cell phone 904, and determining the distance difference between the first and second positions and estimate the speed based on the known time between measurements 908.

Figure 10:
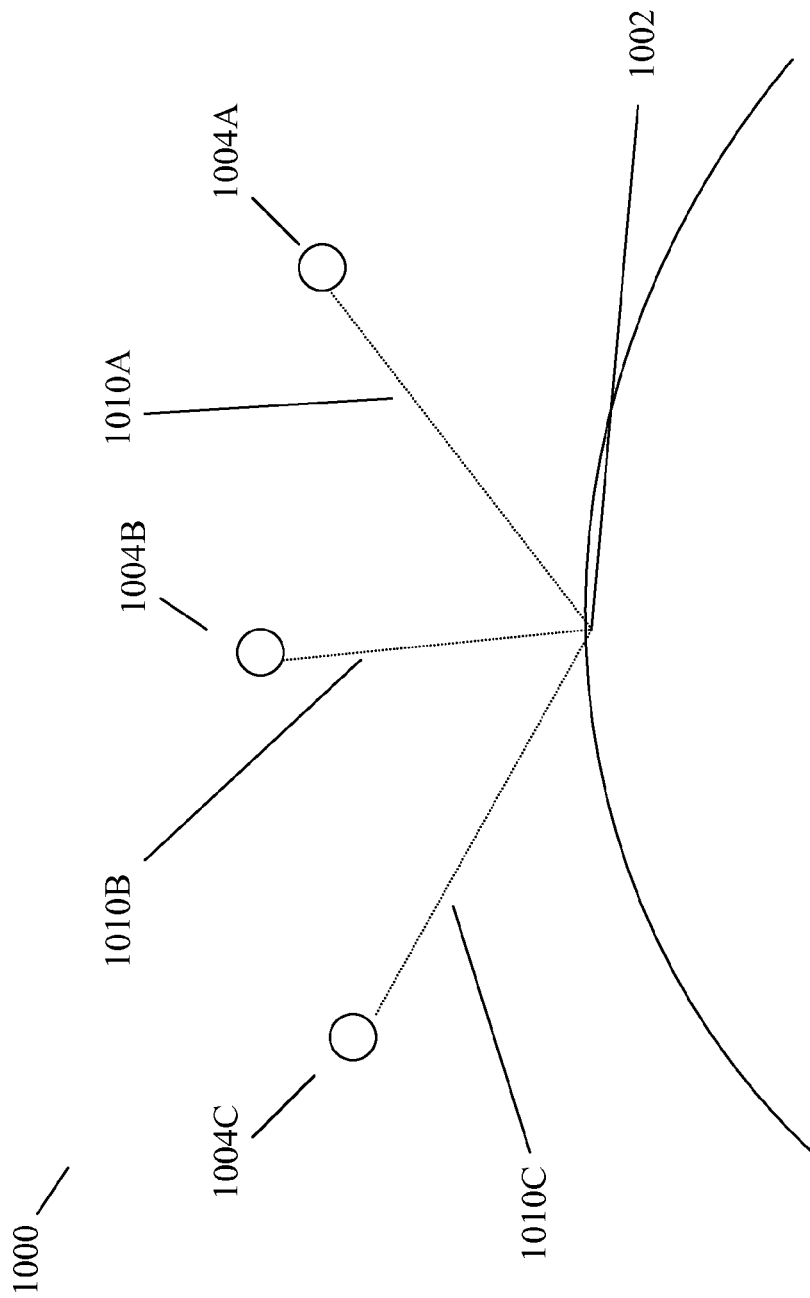
FIG. 10 illustrates a tracking position through gps location according to the principles of the present invention

FIG. 10 illustrates a process for locating global positioning devices (gps) according to the principles of the present invention. The process involves several satellites 1004 and transmissions 1010 between the satellites and the gps chip 1002.

Figure 11:
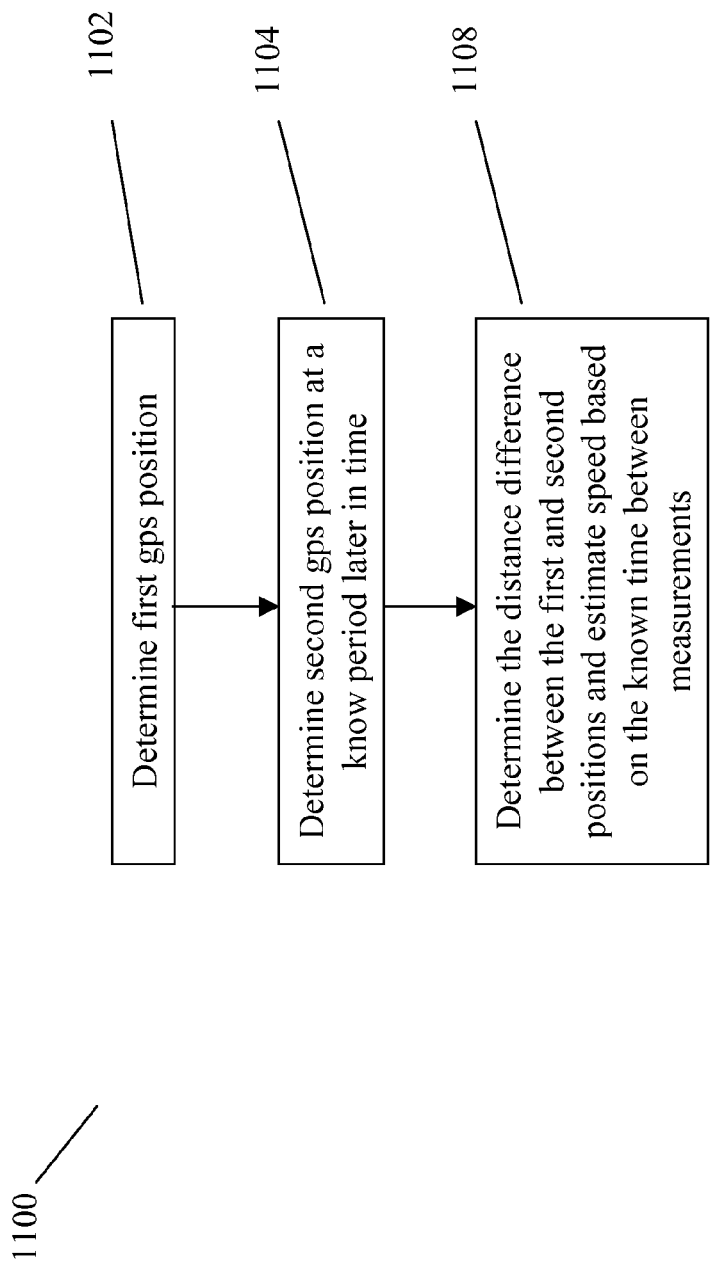
FIG. 11 illustrates a process for determining speed through gps locations according to the principles of the present invention.

FIG. 11 illustrates a process for determining the speed, distance, direction, velocity or other parameter from a gps device according to the principles of the present invention. The process involves determining a first position of the gps device 1102, determining a second position of the gps device 1104, and determining the distance difference between the first and second positions and estimate the speed based on the known time between measurements 1108.

Figure 12:
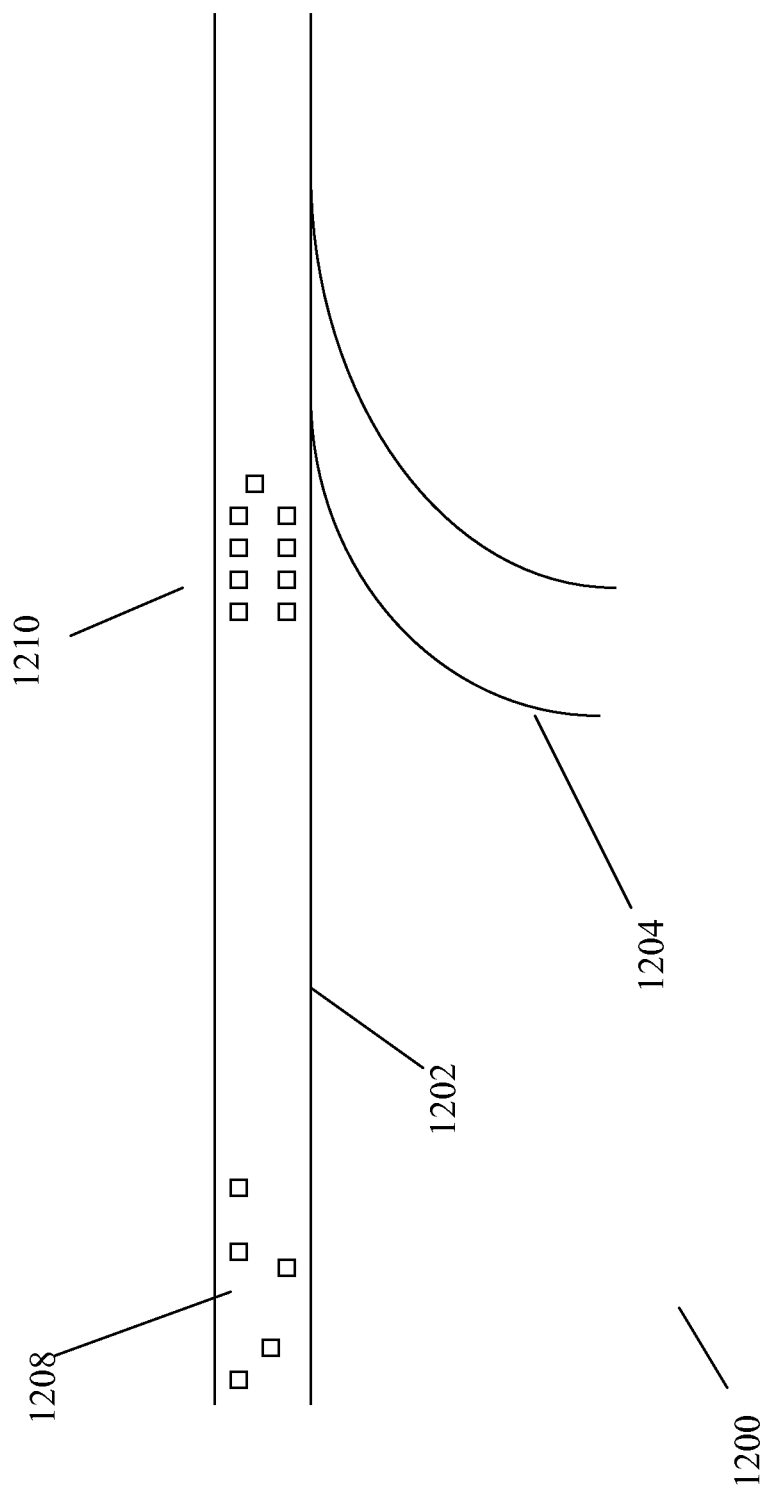
FIG. 12 illustrates tracking traffic patterns through mapped locations according to the principles of the present invention.

FIG. 12 illustrates a traffic pattern map 1200 according to the principles of the present invention. In this embodiment, the traffic map 1200 includes an indication of a roadway 1202 and on-ramp to the roadway 1204. The traffic map 1200 also includes an indication of traffic patterns where the congestion is light 1208 and relatively heavy 1210.

Figure 13:
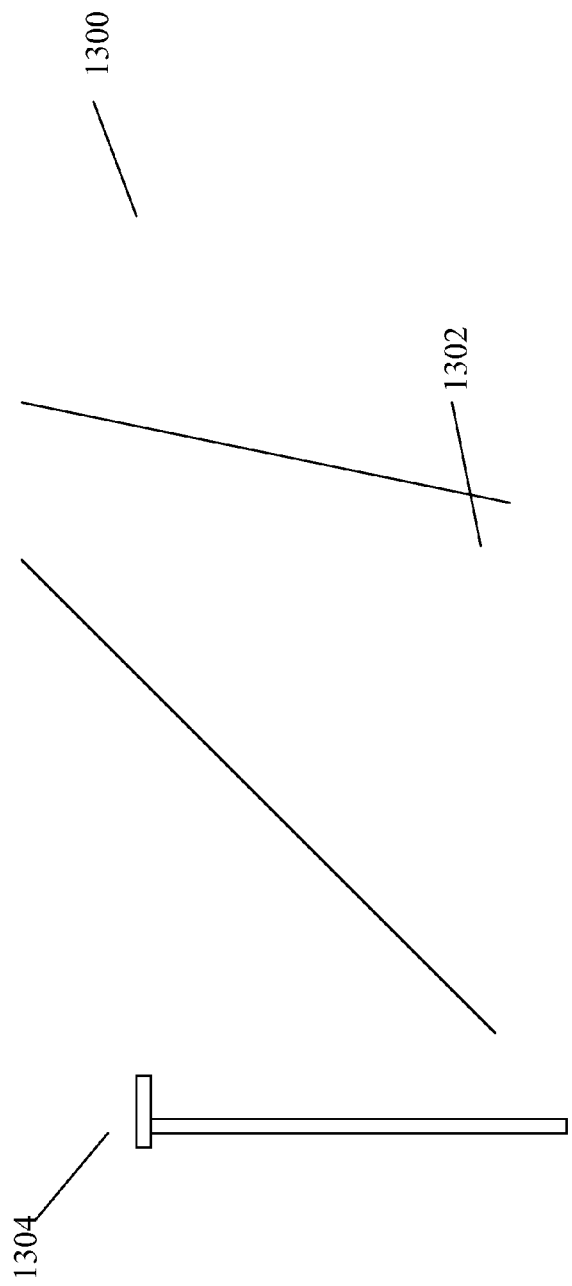
FIG. 13 illustrates tracking traffic patterns through cameras according to the principles of the present invention.

FIG. 13 illustrates a traffic monitoring system 1300 according to the principles of the present invention including a camera 1304. In an embodiment, the camera 1304 may be used to track traffic and or traffic patterns on a roadway 1302.

Figure 14:
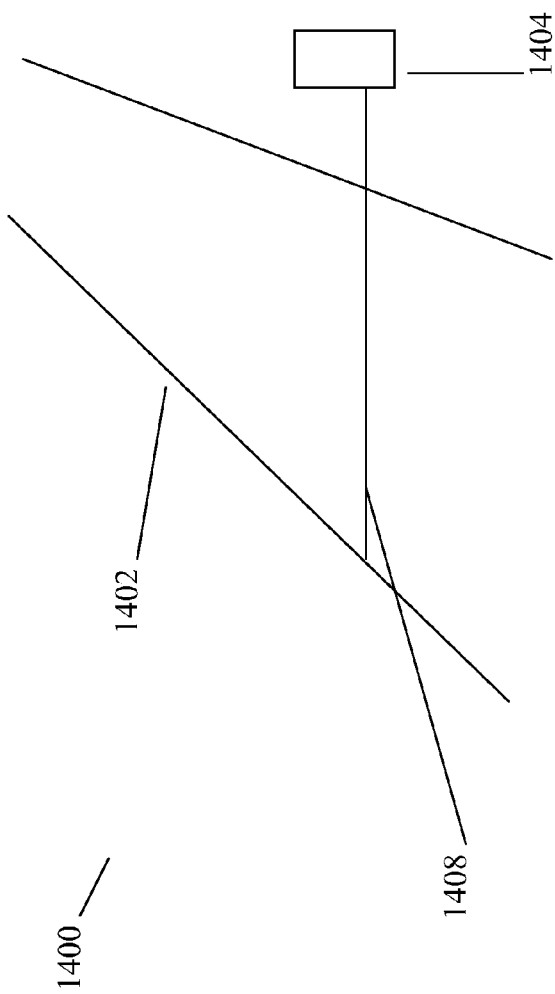
FIG. 14 illustrates tracking traffic patterns through manual measurement according to the principles of the present invention.

FIG. 14 illustrates a traffic monitoring system 1400 according to the principles of the present invention including a counting system 1404. In an embodiment, the counting system 1404 includes a counting facility 1408 that lays on, in, under, or over the roadway 1402 to track traffic.

Figure 15:
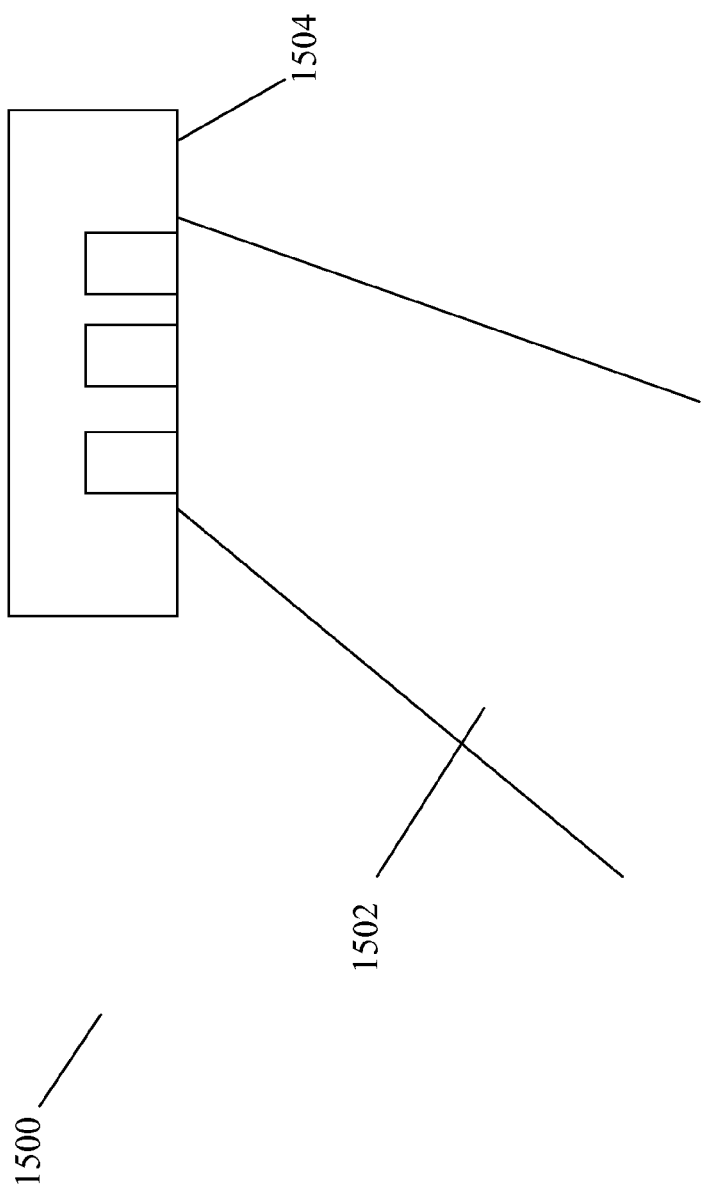
FIG. 15 illustrates tracking traffic flow through toll traffic according to the principles of the present invention.

FIG. 15 illustrates a traffic monitoring system 1500 according to the principles of the present invention, wherein the monitoring is accomplished through tollbooth monitors 1504. The tollbooth monitors 1504 may be people, transponders, transponders receivers or other devices to monitor the flow of traffic through the tollbooth.

Figure 16:
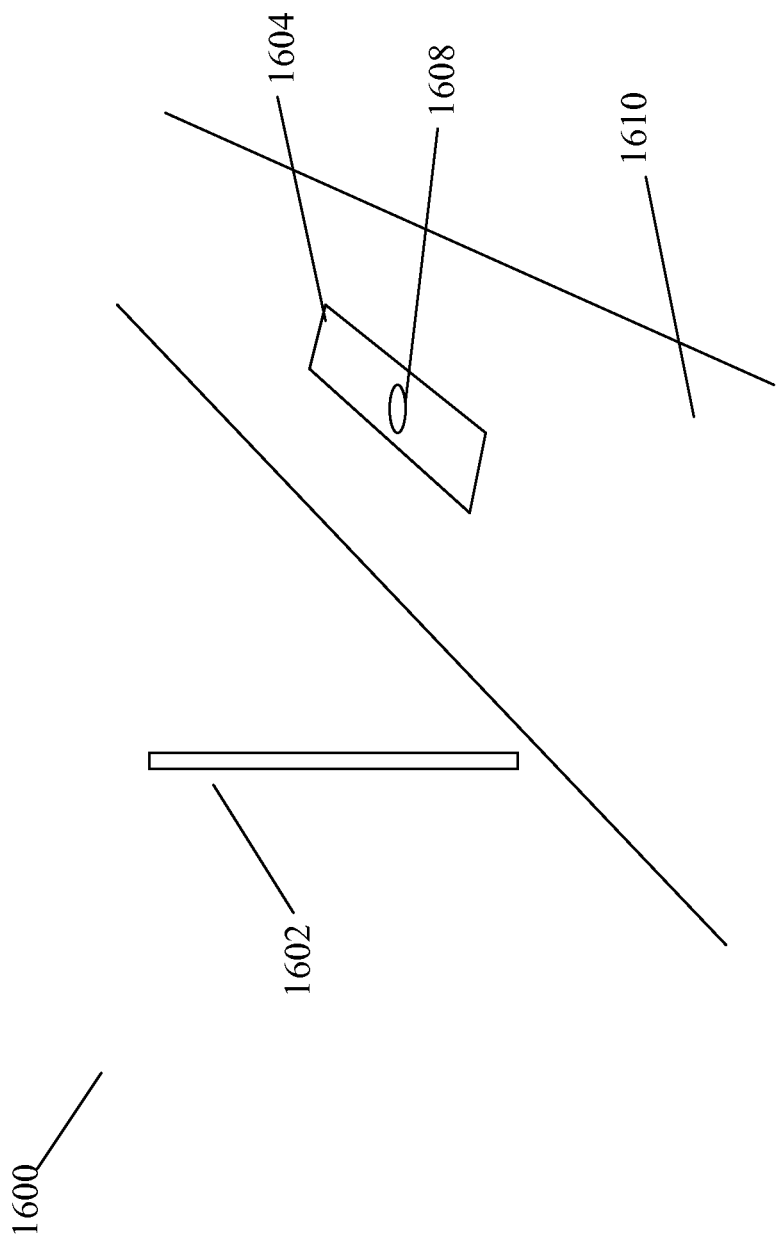
FIG. 16 illustrates tracking traffic flow through transponders according to the principles of the present invention.

FIG. 16 illustrates a traffic monitoring system 1600 according to the principles of the present invention, wherein the monitoring is accomplished through transponders 1608 which may be in a vehicle 1604 with readers 1602 associated with the roadway. In this example, the readers are mounted near the roadway.

Figure 17:
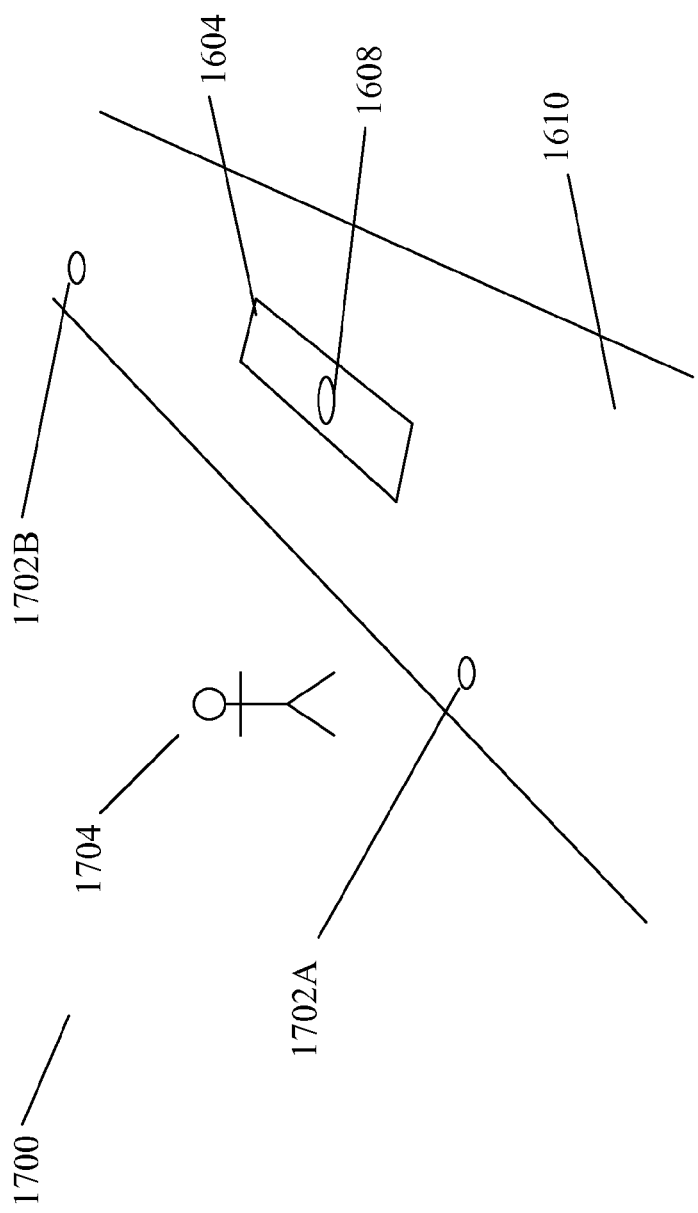
FIG. 17 illustrates tracking traffic flow through transponders, wherein the master is mounted on a non-toll facility according to the principles of the present invention.

FIG. 17 illustrates a traffic monitoring system 1700 according to the principles of the present invention, wherein the monitoring is accomplished through transponders 1608 which may be in a vehicle 1604 with readers 1702 associated with the roadway. In this example, the readers are mounted in the roadway. In an embodiment, traffic may be monitored through manual counting or other means controlled by a human's 1704 interactions.

Figure 18:
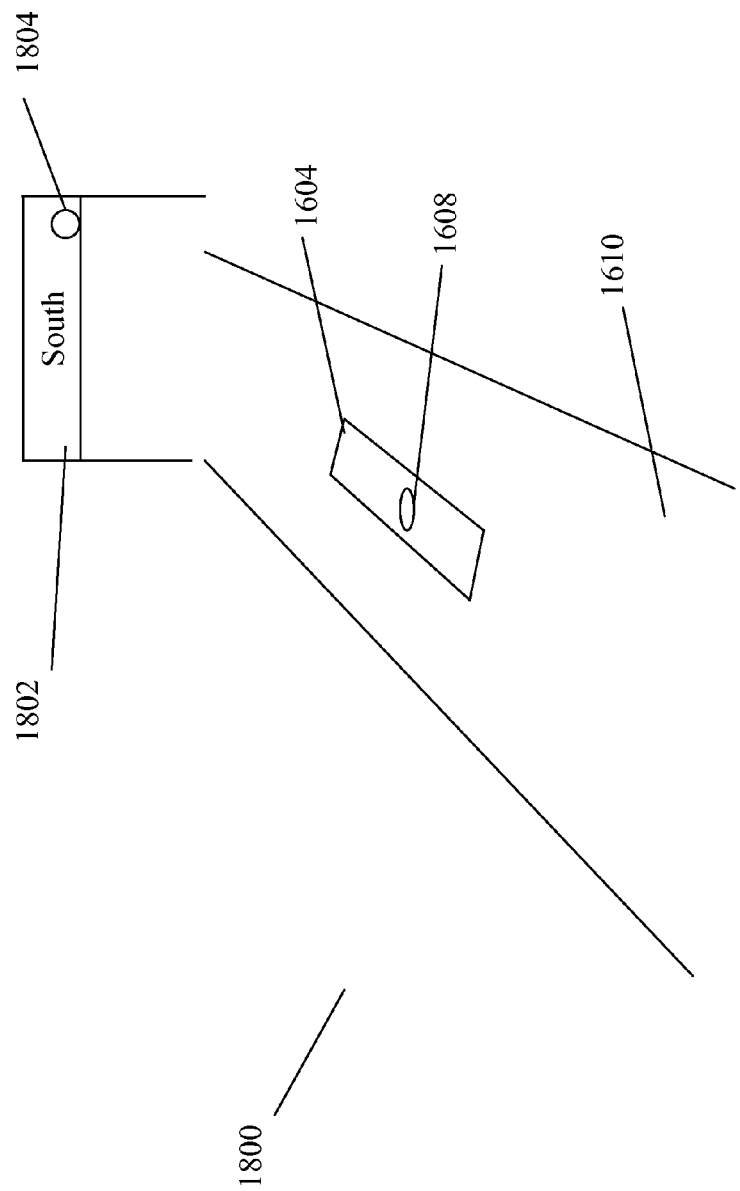
FIG. 18 illustrates tracking traffic flow through transponders, wherein the master is mounted on a sign according to the principles of the present invention.

FIG. 18 illustrates a traffic monitoring system 1800 according to the principles of the present invention, wherein the monitoring is accomplished through transponders 1608 which may be in a vehicle 1604 with a reader 1804 associated with a roadway sign 1802.

Figure 18A:
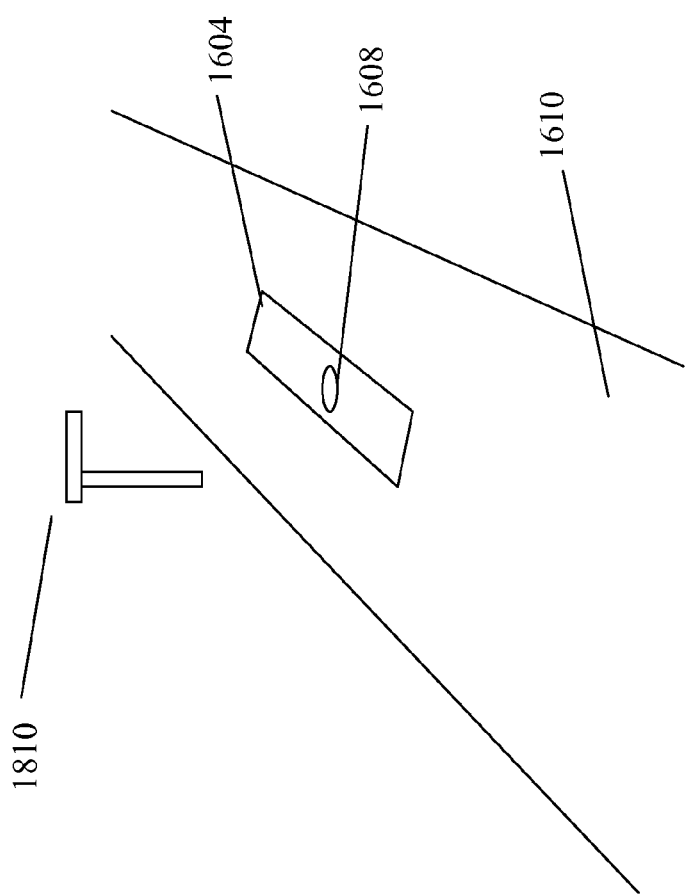
FIG. 18A illustrates tracking traffic with radar according to the principles of the present invention.

FIG. 18A illustrates a traffic monitoring system according to the principles of the present invention, wherein the monitoring is accomplished through a radar 1810 system.

FIG. 19 illustrates a map of traffic density 1900 according to the principles of the present invention. In an embodiment, various traffic patterns are represented by various symbols, lines, line widths, and the like. For example, a thick line 1908 may represent relatively heavy congestion, a thin line 1904 may represent light congestion, and a medium weight line 1902 may represent a typical congestion condition.

FIG. 20 illustrates a map of traffic flow 2000 according to the principles of the present invention. In an embodiment, various traffic flow patterns are represented by various symbols, lines, line widths, and the like. For example, a thick line 2008 may represent relatively slow traffic flow, a thin line 2004 may represent quick moving traffic, and a medium weight line 2002 may represent a typical flow pattern.

An aspect of the present invention relates to estimating travel time based on travel conditions. In an embodiment, the estimations are based on typical travel conditions. In an embodiment, the estimations are based on real time travel conditions.

Figure 21:
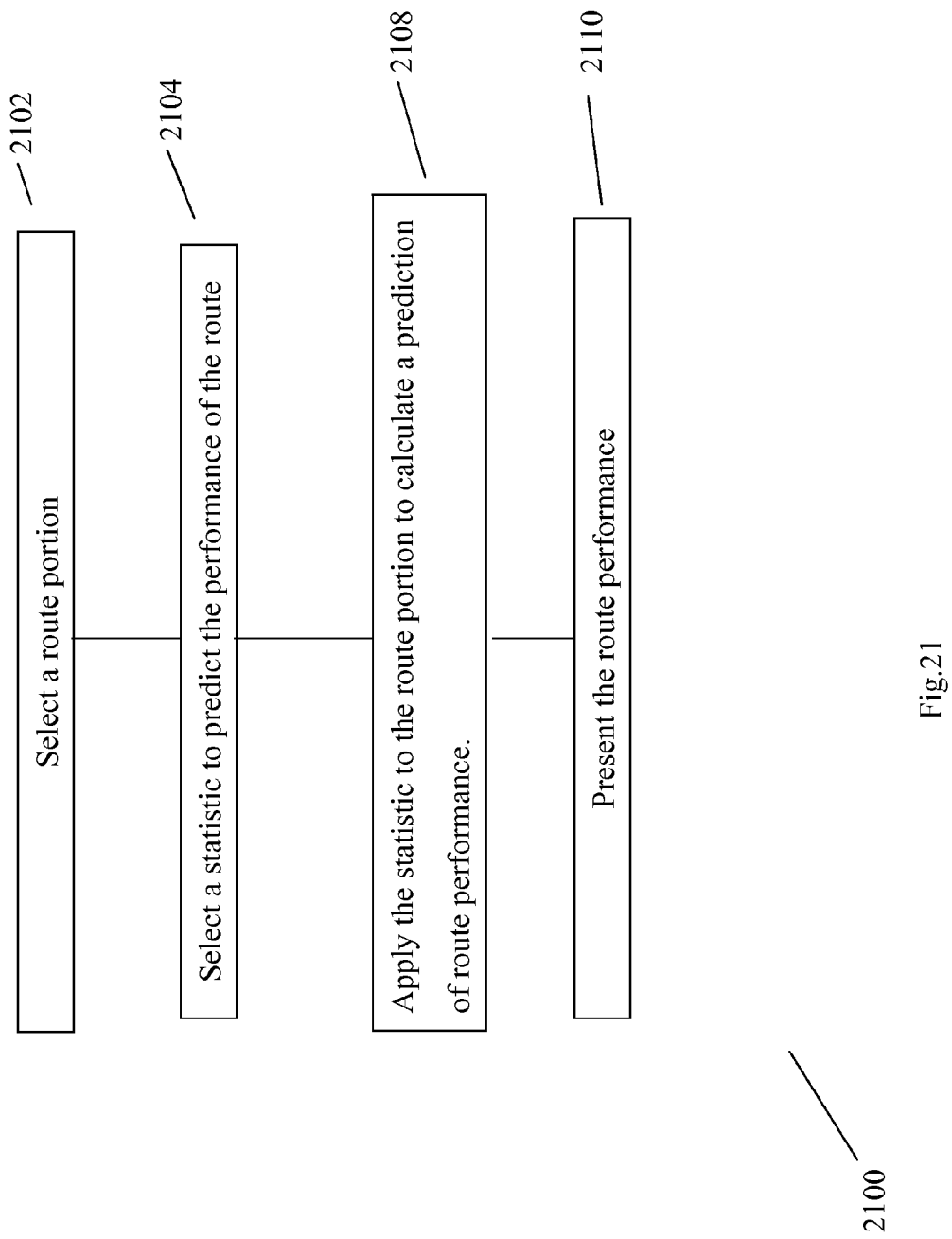
FIG. 21 illustrates a process for predicting traffic speed within a route according to the principles of the present invention.

FIG. 21 illustrates a process for predicting traffic performance within a route 2100. The process includes selecting a route portion 2102, selecting a statistic to predict route performance 2104, applying the statistic to route portion data to calculate a prediction of route performance 2108, and presenting the route performance to a user 2110. In an embodiment, the step of selecting a statistic 2104 may involve selecting any number of statistics such as average, mean, mode, median, standard deviation, or other statistic to be applied to the data associated with the traffic on the route. In an embodiment, the statistic may be applied to data over a given period. For example, the data for the route may be provided during the course of an hour in a given day and the statistic (e.g. median) may be applied to the hours worth of data to predict travel time during the hour.

Figure 22:
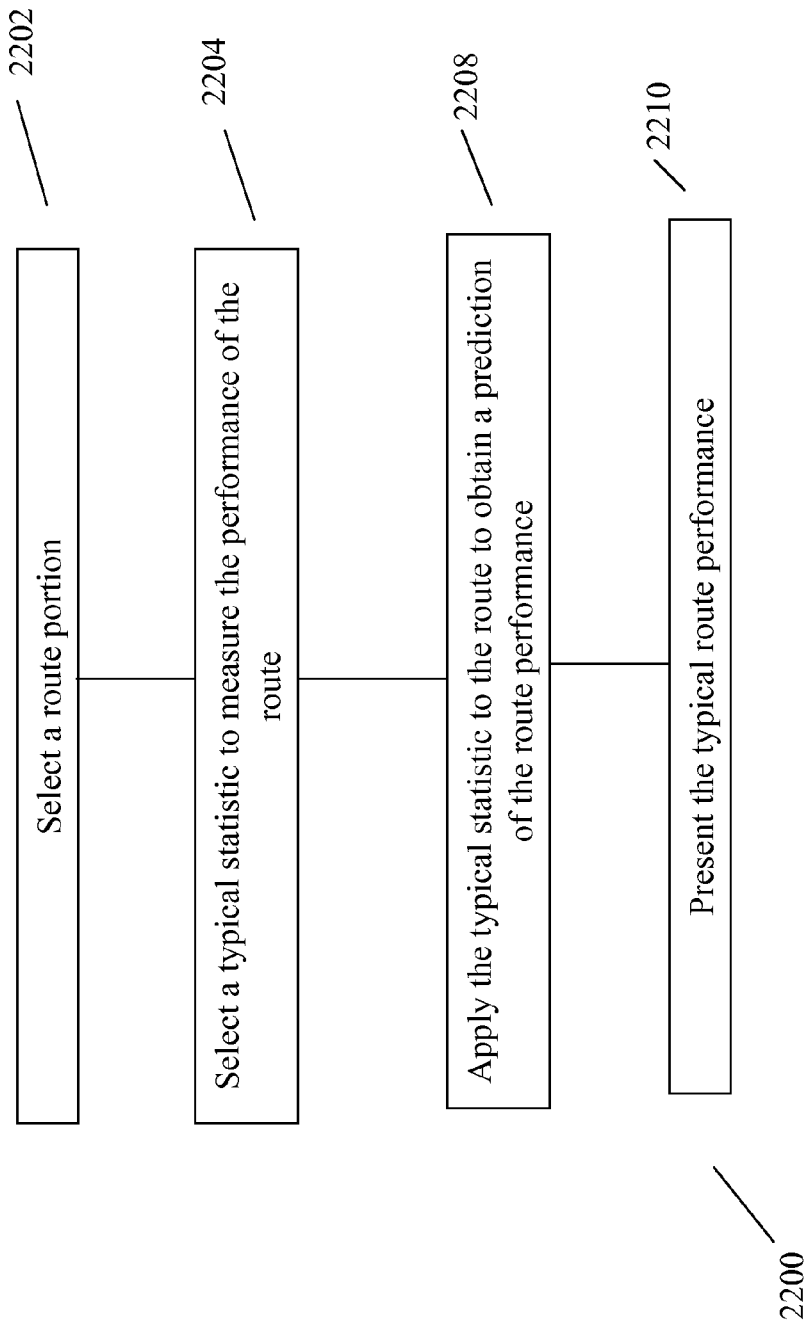
FIG. 22 illustrates a process for predicting typical route time according to the principles of the present invention.

FIG. 22 illustrates a process for predicting traffic performance within a route 2200. The process includes selecting a route portion 2202, selecting a typical statistic to predict route performance 2204, applying the typical statistic to route portion data to calculate a prediction of route performance 2208, and presenting the route performance to a user 2210. In an embodiment, the step of selecting a typical statistic 2104 may involve selecting any number of statistics such as average, mean, mode, median, standard deviation, or other statistic to be applied to the data associated with the traffic on the route. In an embodiment, the statistic may be applied to data over a given period. For example, the data for the route may be provided during the course of an hour in a given day and the statistic (e.g. median) may be applied to the hours worth of data to predict travel time during a like the hour.

Figure 23:
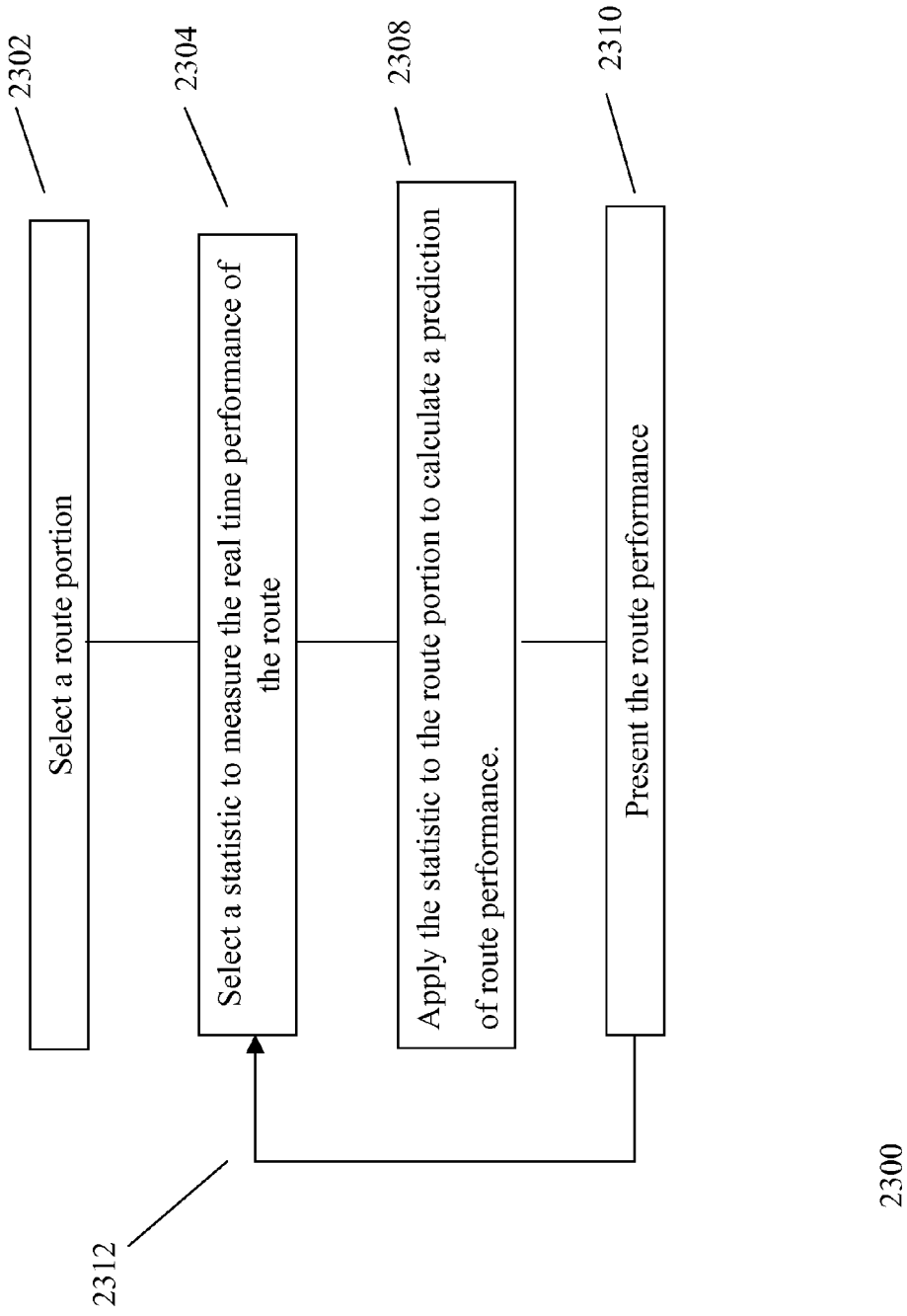
FIG. 23 illustrates a process for providing real time route time according to the principles of the present invention.

FIG. 23 illustrates a process for predicting traffic performance within a route 2300. The process includes selecting a route portion 2302, selecting a statistic to predict real time route performance 2304, applying the statistic to route portion data to calculate a prediction of route performance 2308, presenting the route performance to a user 2310, and repeating the steps 2304, 2308, and 2310 to update the information.

Figure 24:
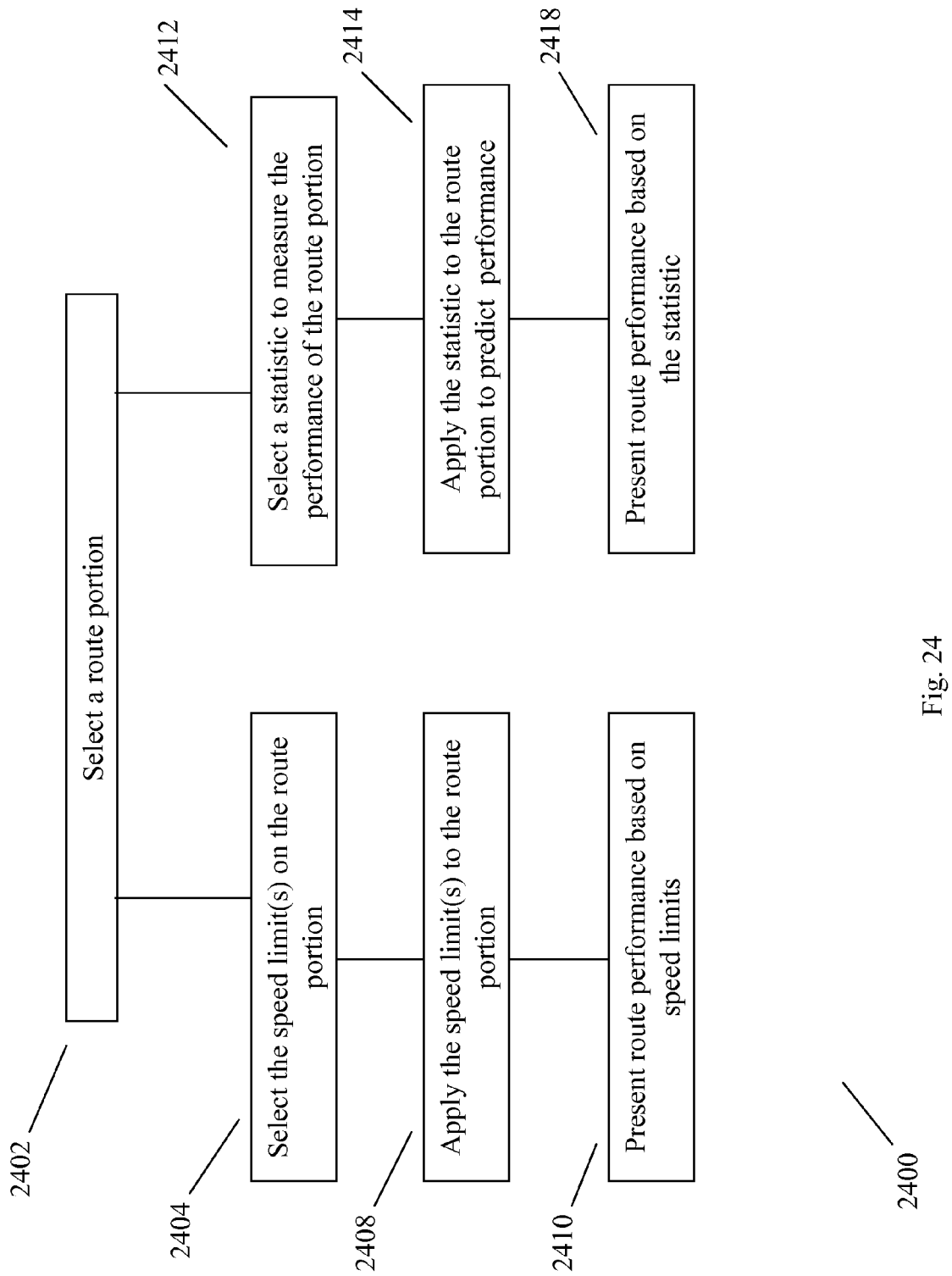
FIG. 24 illustrates a process for presenting shortest route using speed limits and shortest typical time route according to the principles of the present invention.

FIG. 24 illustrates a process for presenting a shortest route using speed limits and a shortest route using typical route conditions 2400. In an embodiment, the process involves selecting a route portion 2402, selecting speed limit(s) on the route portion 2404, applying the speed limit(s) to the route portion 2408, and presenting route performance (e.g. predicted route travel time) based on speed limits 2410. In an embodiment, the process also involves selecting a statistic to measure the performance of the route portion 2412, applying the statistic to the route portion to predict route performance 2414, and presenting route performance based on the statistic 2418. For example, a user may want to see information relating to a desired route regardless of the traffic conditions as well as seeing information relating to the shortest route given normal or typical route conditions.

Figure 25:
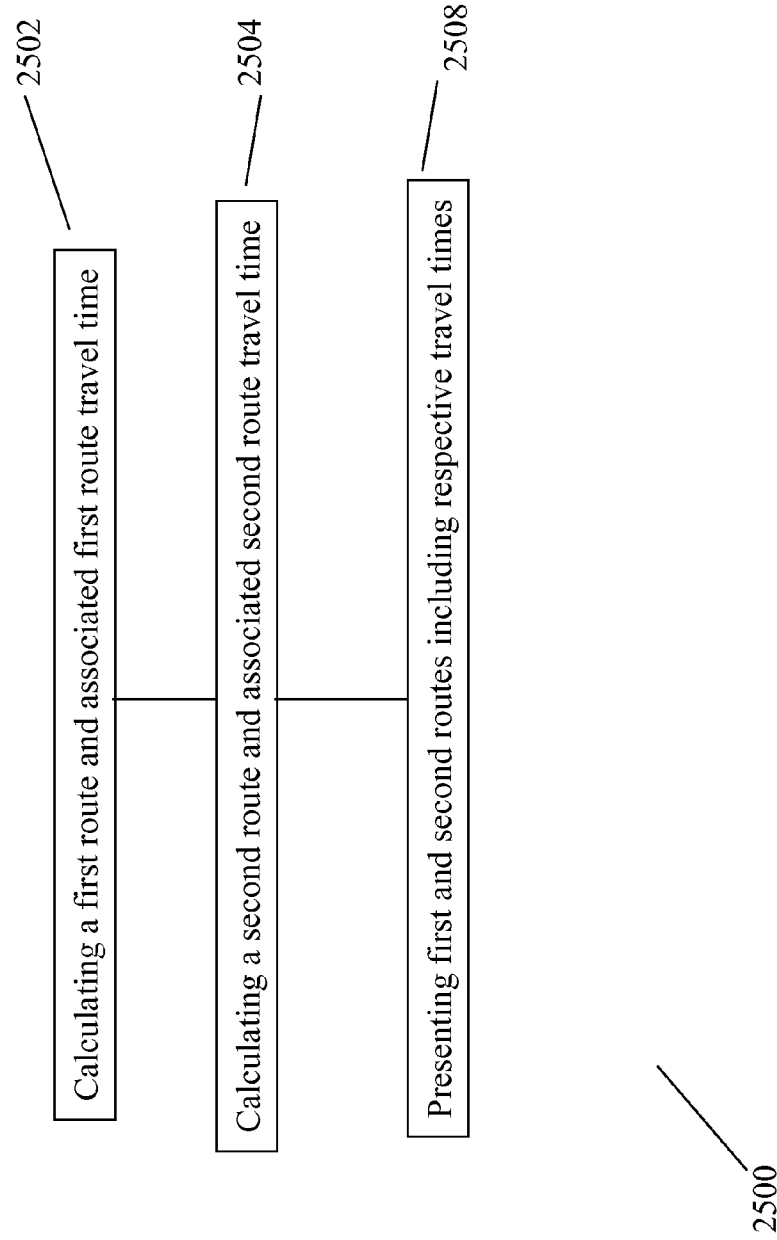
FIG. 25 illustrates a process for presenting a plurality of routes based on typical time according to the principles of the present invention.

FIG. 25 illustrates a process for presenting a plurality of routes based on typical times in each route 2500. In an embodiment, the process involves calculating a first route and associated first route travel time 2502, calculating a second route and associated second route travel time 2504, and presenting first and second routes including respective travel time 2508. For example, a user may want to see more than one suggested travel route based on typical travel conditions.

An aspect of the present invention relates to travel time prediction based on typical conditions. In an embodiment, the travel time prediction is based at least in part on a projected start time of the travel and or when a traveler will reach a particular point along a travel route. For example, travel conditions change through a day, depending on the day of the week, week of the month or whether the travel day lands on a holiday, typical vacation or light travel time or during a period where there is an event, sporting event or other condition that tends to increase travel time on a particular route. An embodiment of the present invention involves estimating travel time based on travel periods.

Figure 26:
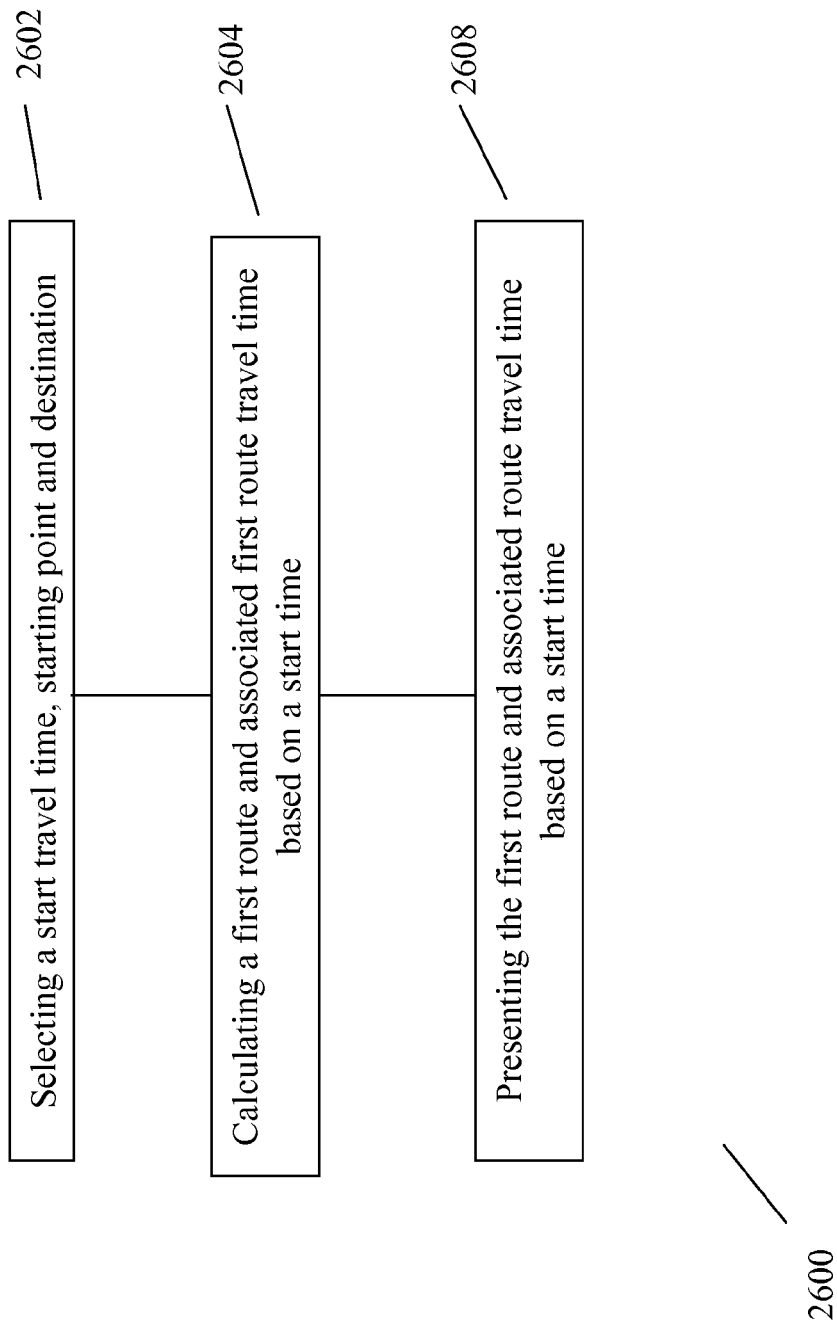
FIG. 26 illustrates a process for presenting a route based on starting time according to the principles of the present invention.

FIG. 26 illustrates a process for presenting a route based on starting time 2600. In an embodiment, the process involves selecting a start travel time, starting point and destination 2602, calculating a first route and associated first route travel time based on a start time 2604, and presenting the first route and associated route travel time based on a start time 2608. For example, a predicted route time may be dependant on when the travel is going to begin and or when the traveler is going to reach a certain portion of the route, so the user may be interested in route performance based on start time, end time, time of arrival at a particular point along the travel, day of the week, week of the year, holiday status, or the like.

Figure 27:
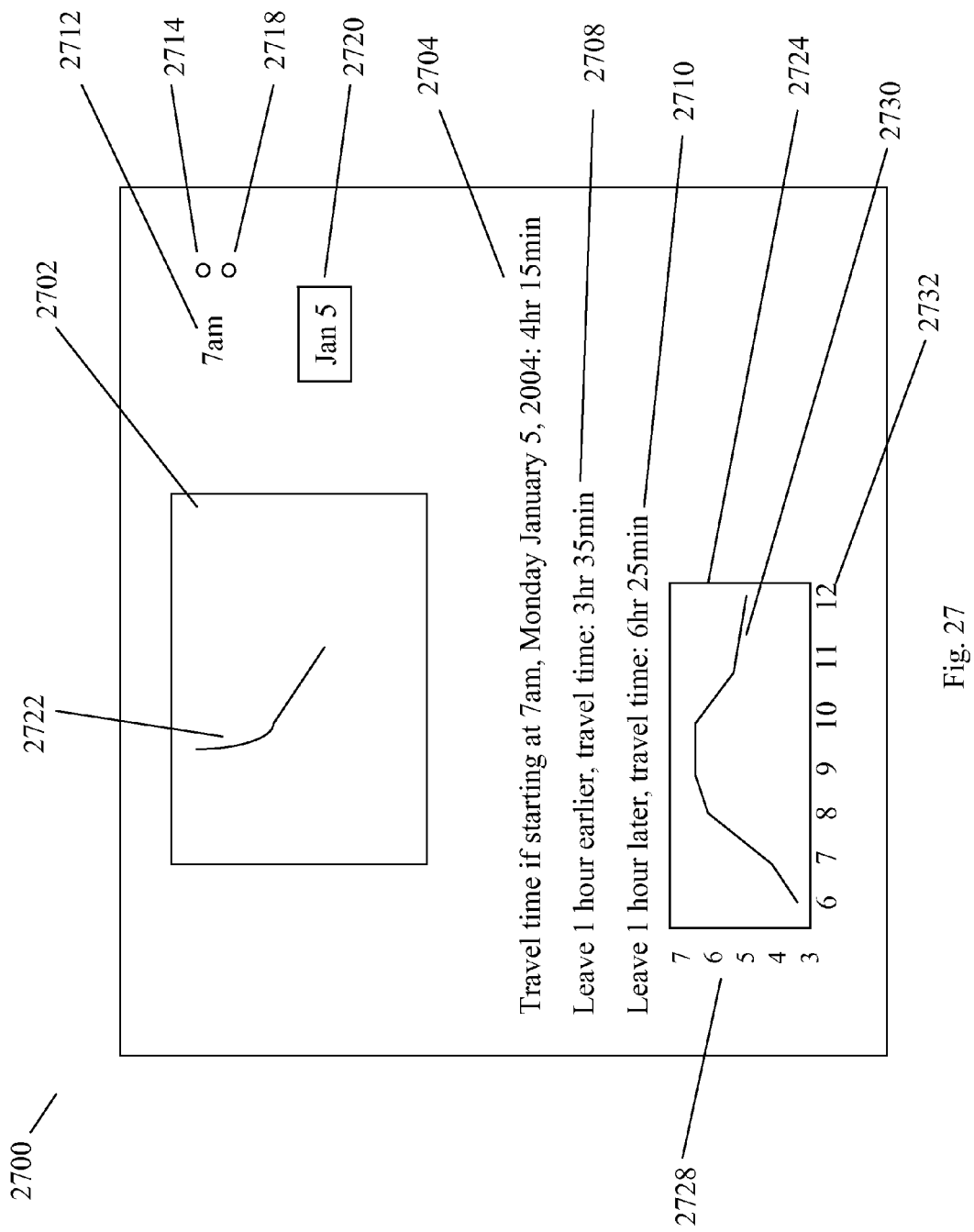
FIG. 27 illustrates a presenting information to guide start time according to the principles of the present invention.

FIG. 27 illustrates a display facility where information to guide travel is presented, including a provision of selecting start time 2700. In an embodiment, the information includes a map 2702 with a route 2722. In an embodiment, the information also includes an indication of travel time if started at a particular time, 7 am Monday, Jan. 5, 2003, 2704, an indication of travel time if started one hour earlier, and an indication of travel time if started one hour later. In an embodiment, the information presented also includes the travel start time 2712 along with a toggle up 2714 and toggle down 2718 to move the start time back or forward. In an embodiment, the information also includes an indication of the month and day 2720. In embodiments, a graph of estimated route travel time 2274 is presented. The graph may include the time of day the traveler intends to leave 2732, estimated travel time 2728, and an plot of travel time estimates 2730.

Figure 28:
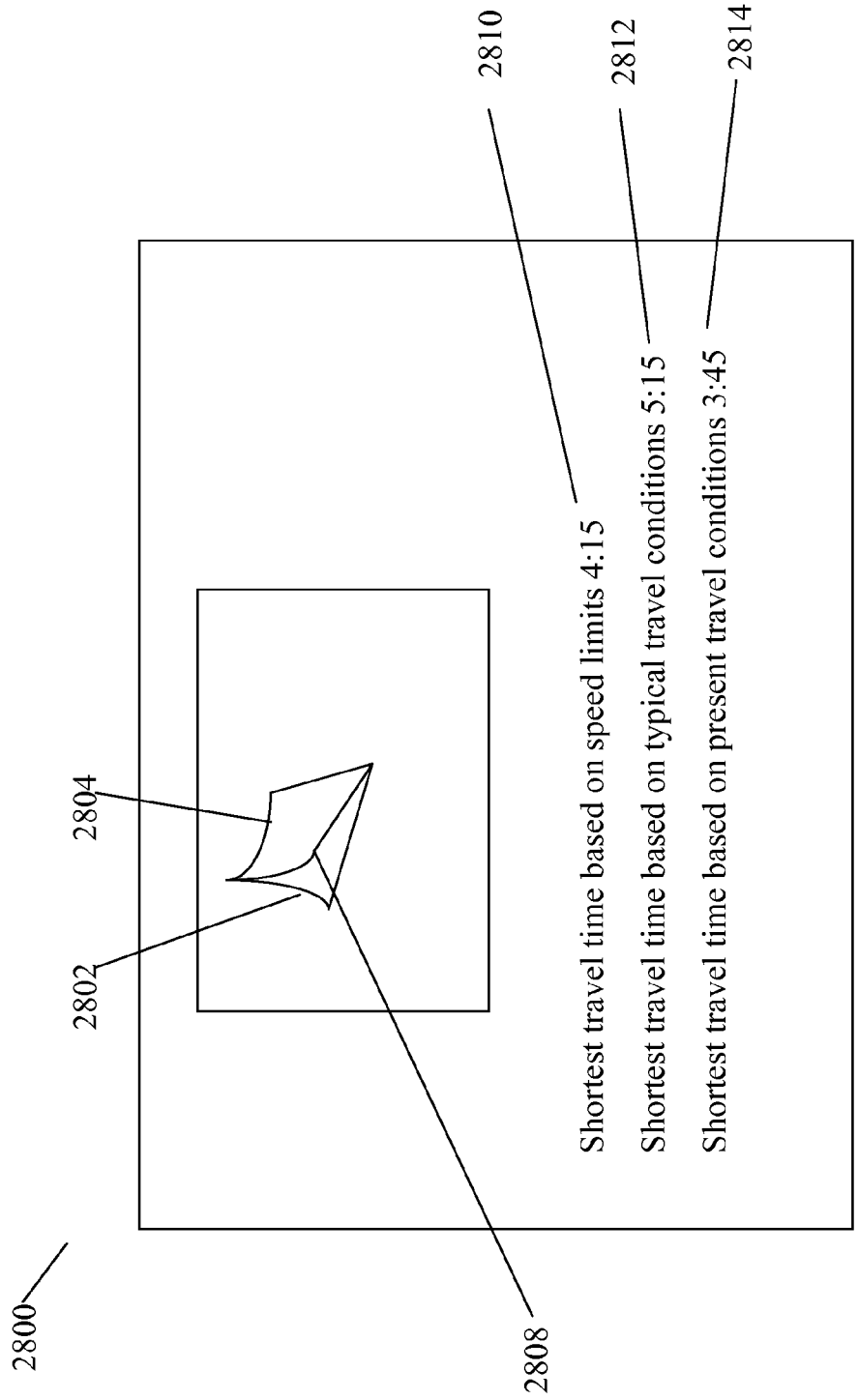
FIG. 28 illustrates a presenting a map with shortest travel time based on speed limits, shortest travel time based on typical travel conditions, and shortest travel time based on present travel conditions according to the principles of the present invention.

FIG. 28 illustrates a display facility where information to guide travel is presented, including information relating to the shortest travel time based on speed limits, shortest travel time based on typical travel conditions, and shortest travel time based on present travel conditions 2800. In an embodiment, the information includes a map with representations of the routes with the shortest travel time based on speed limits 2802, shortest travel time based on typical travel conditions 2804, and shortest travel time based on present travel conditions 2808. In an embodiment, the information also includes the predicted times associated with the shortest travel time based on speed limits 2810, shortest travel time based on typical travel conditions 2812, and shortest travel time based on present travel conditions 2814.

Figure 29:
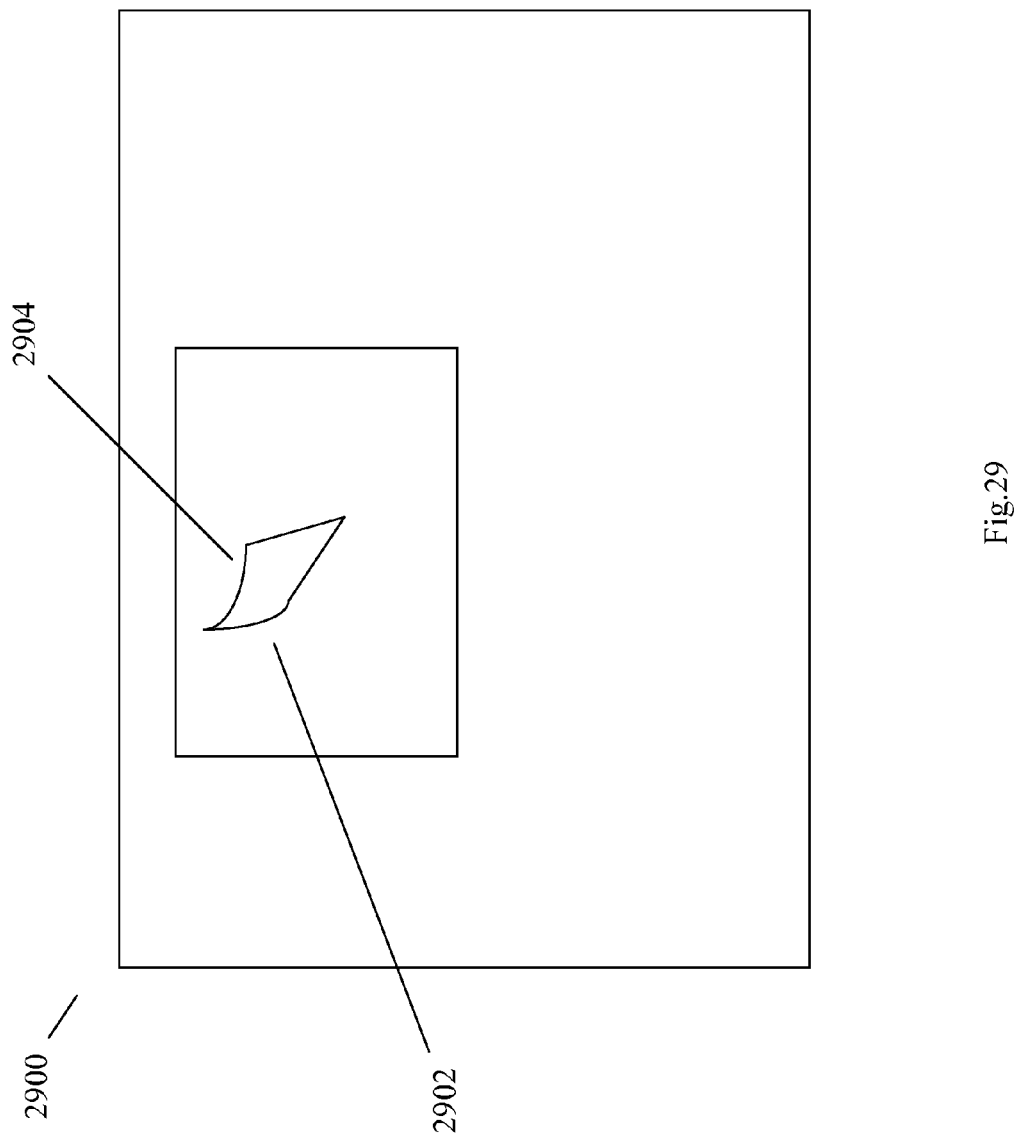
FIG. 29 illustrates a presenting alternate route based on traffic information according to the principles of the present invention.

FIG. 29 illustrates a display facility where information to guide travel is presented, including presenting alternate route based on traffic information 2900. In an embodiment, the information includes a map with a route 2902 and an alternate route based on traffic condition information 2904.

In embodiments, the systems and methods described in connection with FIGS. 21 through 29 may be deployed while using a mobile communication facility (e.g. cell phone, mobile phone, satellite phone, internet phone, network phone, portable communication facility, wireless phone, pda, combination pda/mobile phone, Palm® system, Blackberry® system, in-vehicle communication facility, in-vehicle navigation facility, in-vehicle information facility), desktop computing facility, laptop computing facility, portable computing facility, client-server facility, local computing facility, networked based computing facility, internet appliance, internet computing facility or other such system useful in displaying and or interacting with such information.

While many of the embodiments describe the use of transponders and or transmitters, the present invention is not limited to a particular device or method of communication. For example, a transmitter may be used in place of a transmitter in an embodiment.

An aspect of the present invention is a user alert system. In an embodiment, a user loads a route to be taken and an automated system provides information to the user to give the user an update as to travel conditions for the route. For example, the route of Rt. 95 south into NYC is loaded to be traveled, and or being traveled, on Wednesday. Congestion occurs (e.g. as a result of an accident or construction) in the route and the route information system sends a alert to the user. The alert may come in the form of calls, emails, text messages, voice messages, video messages or otherwise provides information to the user relating to the alert. The alert may be communicated to the users mobile communication facility (e.g. cell phone, mobile phone, satellite phone, internet phone, network phone, portable communication facility, wireless phone, pda, combination pda/mobile phone, Palm® system, Blackberry® system, in-vehicle communication facility, in-vehicle navigation facility, in-vehicle information facility), desktop computing facility, laptop computing facility, portable computing facility, client-server facility, local computing facility, networked based computing facility, internet appliance, internet computing facility or other such system useful in displaying and or interacting with such information. The alert may contain information to relating to identifying the accident and or congestion, time estimates for clearing the congestion, travel time estimates, alternate route information, alternate route suggestions, time estimates associated with alternate routes or other information related to the alert. In an embodiment, the alert system take the form of a call system that calls the user's mobile communication facility. In an embodiment, the user may use a web based routing system (e.g. mapquest.com) and load a mobile phone number into the web based routing system and the routing system may call the user with periodic updates as to the route conditions and or call the user with information relating to abnormal route conditions. In an embodiment, the call back system may suggest alternate routes and or predict the impact of abnormal conditions. For example, the call back system may call the user and inform the driver of a fifteen minute delay due to an accident and provide no alternate route or provide information indicating it is not worth seeking alternate routes. In an embodiment, the call back system may call the user with information relating to alternate routes. In embodiments, the user may preload route and or destination information, prior to or during travel, into a system and the user may be provided with information relating to the route and or destination prior to or during travel. For example, the user may be alerted through his mobile communication facility prior to leaving on the trip. For example, the user may have loaded a work destination into the system and the system may call him (email, or otherwise (e.g. an alert as described herein)) an hour prior to the trip to inform the user of travel conditions, alternate route suggestions or other information (e.g. route, direction, navigation information). The system may be programmed to send the alert, or update, only when problems, congestion, or other abnormalities occur, or the system may be programmed to provide information everyday, every workday, or periodically, or based on some other parameter.

Figure 29A:
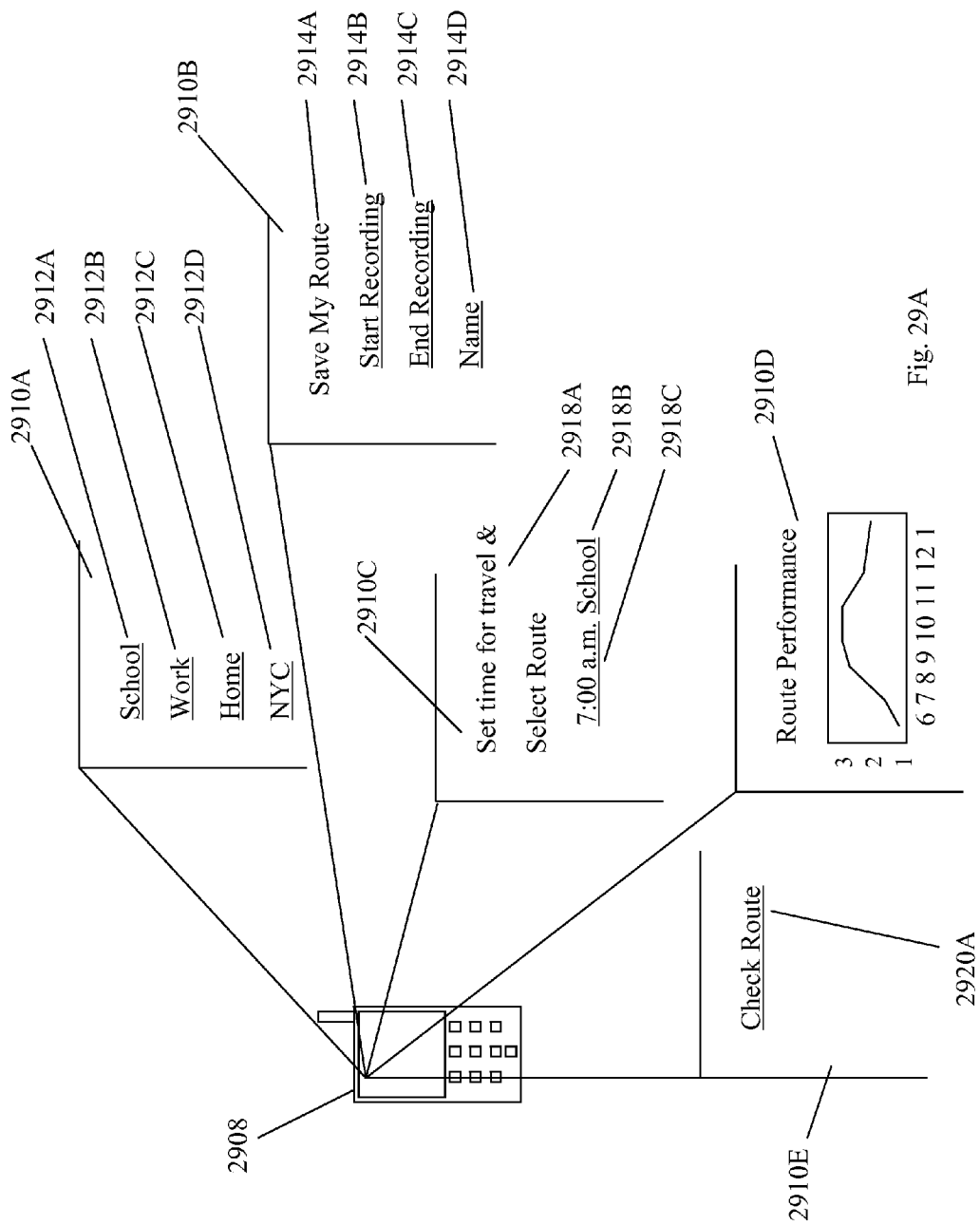
FIG. 29A illustrates systems and methods for communicating route information according to aspects of the present invention.

FIG. 29A illustrates systems and methods for communicating route information according to aspects of the present invention. In embodiments, a user may use a mobile communication facility (e.g. cell phone, mobile phone, satellite phone, internet phone, network phone, portable communication facility, wireless phone, pda, combination pda/mobile phone, Palm® system, Blackberry® system, in-vehicle communication facility, in-vehicle navigation facility, in-vehicle information facility) 2908 to access route, direction, navigation or other travel information. While these embodiments are described in connection with mobile communication facilities, it should be understood that other computing facilities, such as desktop, laptop, internet appliance, and others, are contemplated by the present invention and are encompassed by the present invention. Elements 2910A-2910E represent various screen shots according to the principles of the present invention from mobile communication facility 2908. Screen shot 2910A represents an embodiment where various routes, destinations, directions, traffic information, congestion information, route information, navigation information, or other information relating to travel may be stored. For example, the mobile communication facility may include links, buttons, connections or other such facilities 2912A-2912D. In this embodiment, connection 2912A may represent a menu connection to route information, traffic information, congestion information, directions, navigation information or other such information relating to a destination the user labeled or the system labeled "school," while 2912B may related to such information pertaining to a place of work, 2912C may be a connection to information pertaining to the user's home, and 2912D may relate to another destination of interest to the user "NYC." In embodiments, the user may load destinations, directions, route information, navigation information, and the like in connection with such menu items to make for convenient retrieval at a later time.

FIG. 29A illustrates a screen shot 2910B according to the principles of the present invention. Screen shot 2910B illustrates an embodiment where a user may track his route, route performance (e.g. speed, distance, time of day) or otherwise collect information relating to his route. In this embodiment, the user may have the option to choose a function (e.g. possibly from a menu) to start the recordation of the route and or route information 2914B. The user may also be presented with an option to end the recording 2914C. The user may also be presented with an option to name the recording 2914D.

FIG. 29A illustrates a screen shot 2910C according to the principles of the present invention. Screen shot 2910C illustrates an embodiment where a user may set a time when he expects to start on a route or head to a destination. For example, a user may set the time he expects to start his travel through a menu style option 2918C and select a route and or destination through a menu 2918B or other facility (e.g. typing in the destination, calling a voice recognition system to load the destination, using voice recognition in the phone to load the destination, receiving the destination from an automated telephone answering system as described below in connection with the principles of the present invention). In an embodiment, the user may set the time to begin travel to a destination at some time before travel begins (e.g. the night before going to work) and an alert notification system as described herein in connection with the principles of the present invention (e.g. a voice mail, email, text message, video message or the like) may provide traffic alerts, route information, alternate route suggestions, alternate route information, or other information pertaining to the trip the traveler has planned. In an embodiment, the user may be presented with options to save times and routes as recurring. For example, the user may set the time he normally travels to and or from work along with his work destination and or route as a recurring to be provided with recurring route information, before during or following his trip. The recurring stored information may relate to work, home, periodic travel plans, school, activities or other destinations, routes, directions, navigation, or other route information. In an embodiment, the recurring alert system may be set to provide alerts continually, at set times, recurring at set times everyday, during week days, during weekends, if the route conditions are not typical, if it is typical, if there are problems expected, at a specified time before travel is expected, or otherwise.

FIG. 29A illustrates a screen shot 2910D according to the principles of the present invention. Screen shot 2910D illustrates an embodiment where a user may display information pertaining to route performance, direction, navigation or other information relating to travel. In this embodiment, the screen shot contains a graph of route performance similar to that described in connection with FIGS. 27-29.

FIG. 29A illustrates a screen shot 2910E according to the principles of the present invention. Screen shot 2910E illustrates an embodiment where a user may select a link, button, menu selection, or other connection 2920A to obtain route and or navigation information. For example, the connection 2920A may be selected to check traffic on a given route and or the route the user is currently traveling. The user may be sitting in traffic and want to know how long the delay will be, what is causing the delay, alternative route information, number of miles until the congestion breaks up, or other information relating to the route. In another situation, the user may be moving along the route at expected speeds and want an update as to the route performance ahead, traffic ahead, alternative route, expected delays, or other information. In an embodiment, the phone may connect with a route information service upon selection of the connection 2920A. The route information service may already have the route information for the route or road the travel has chosen to check or the road the traveler is on. In another embodiment, the route information service may gather the information upon the request. For example, the route information service may monitor the traffic on main roads and highways in a real time or near real time manner, but the service may not track performance of smaller, less traveled, secondary or other roads or areas. Upon request, the route information service may 'ping' cell phones or other transmitters in the area of the user to assess the traffic condition and then report back to the user. In an embodiment, the service may provide updates on a periodic basis.

In embodiments, a data collection facility may be incorporated into a, or associated with a, mobile communication facility. The data collection facility may be adapted to collect information pertaining to the user's habits and apply the data collected through algorithms to help determine future performance. For example, the collection facility may collect information on the user's travel habits (e.g. how fast he typically drives as compared to speed limits and or other traffic) and this information may be used in the prediction or estimates of future travel times. For example, when predicting the travel time based on the time of day, or other parameter, the fact that the user normally exceeds speed limits by five to ten miles per hour may be factored into the travel estimate (e.g. applied to the sections of travel where light traffic is expected).

An aspect of the present invention relates to warning of traffic conditions. In an embodiment, a traffic tracking facility may be used to generate a warning signal and the warning signal may be transmitted to a vehicle in close proximity to a traffic condition. For example, a tracking facility may track traffic patterns and locate an abnormal traffic condition (e.g. an accident, construction, traffic congestion, or vehicles traveling a significantly slower rates than a speed limit or predicted speed) and a warning facility may be used to warn vehicles in close proximity to the abnormal traffic condition.

Figure 30:
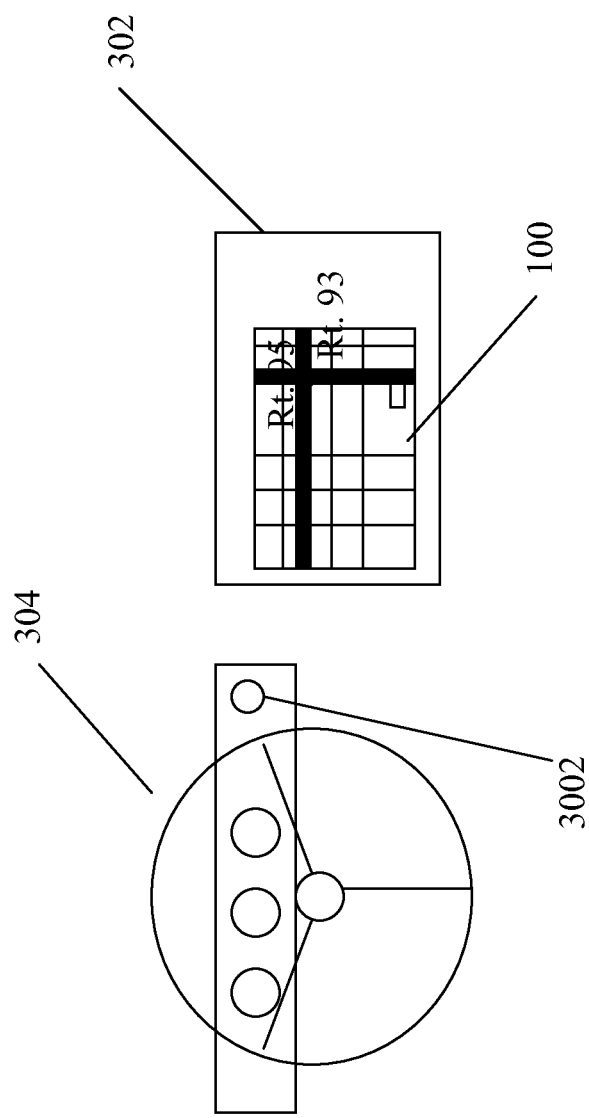
FIG. 30 illustrates warning through on dash signal according to the principles of the present invention.

FIG. 30 illustrates warning through an on-dash signal 3002 according to the principles of the present invention. In an embodiment, a driver may be warned of a traffic condition through the on-dash signal 3002. The on-dash placement of the signal is one example of a useful placement of a visual warning facility, the present invention encompasses other types and placements of visual warning facilities as well as audio facilities and warning through physical contact methods (e.g. vibration). For example, an external signal may be received by the warning facility in the vehicle and the external signal may provide warning information to alert the driver. In an embodiment, a traffic tracking system may monitor the traffic conditions in an area and the tracking system may generate warning signals to vehicles in close proximity to a particular traffic condition. For example, the tracking system may detect an unusual traffic condition indicating abnormally slow traffic in close proximity with traffic that is moving at significantly higher speeds. The tracking position system may ascertain information relating to the traffic in the higher speed portion (e.g. through cell phone identification, through on-board vehicle identification, through gps identification) and communicate to the vehicles in the higher speed traffic portion information indicating the abnormal traffic condition.

Figure 31:
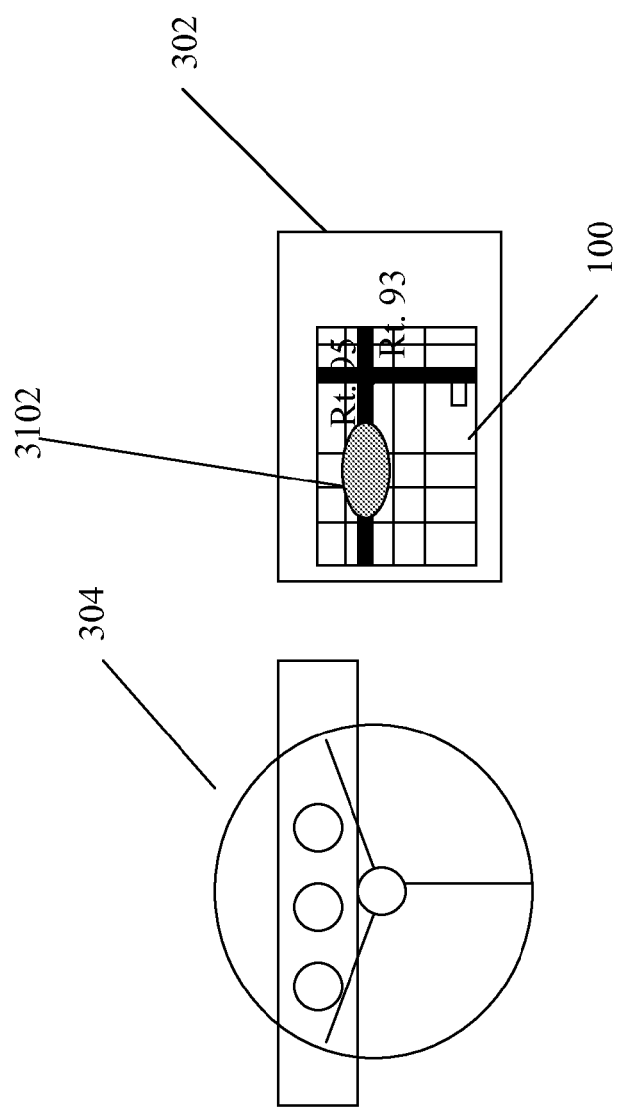
FIG. 31 illustrates warning through on board mapping system according to the principles of the present invention.

FIG. 31 illustrates warning facility 3102 through on board mapping system 302 according to the principles of the present invention. In an embodiment, the on board mapping system 302 may display a warning indication 3102 to provide a driver with information pertaining to traffic conditions. For example, the on board mapping system may receive information relating to slower traffic in the planned route or route currently traveling, and the mapping system may generate an indication on the map 100 indicating the slower traffic. In an embodiment, an audio warning may accompany a display indication.

Figure 32:
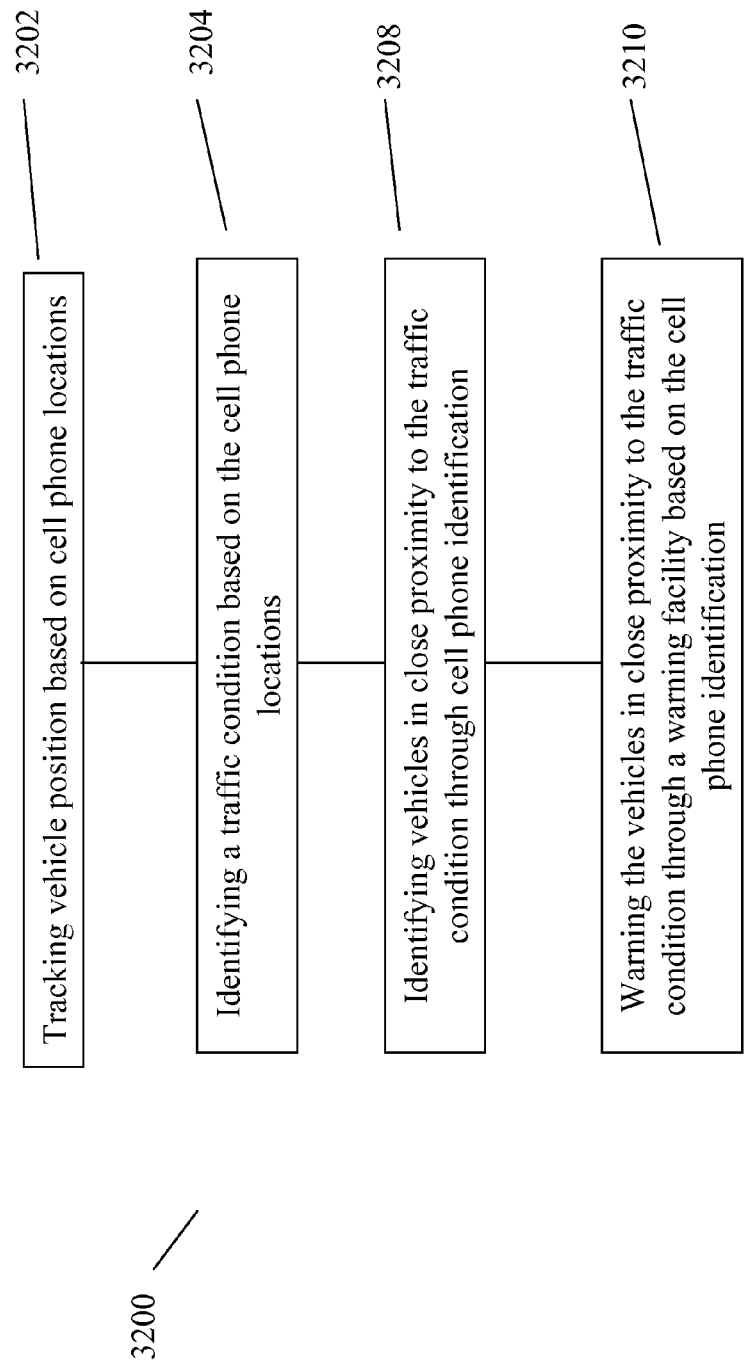
FIG. 32 illustrates a process for warning based on cell phone locations according to the principles of the present invention.

FIG. 32 illustrates a process for warning of traffic conditions based on cell phone locations 3200 according to the principles of the present invention. In an embodiment, the process involves tracking vehicle position based on cell phone locations 3202, identifying a traffic condition based on the cell phone locations 3204, identifying vehicles in close proximity to the traffic condition through cell phone identification 3208, and warning the vehicles in close proximity to the traffic condition through a warning facility based on the cell phone identification 3210.

Figure 33:
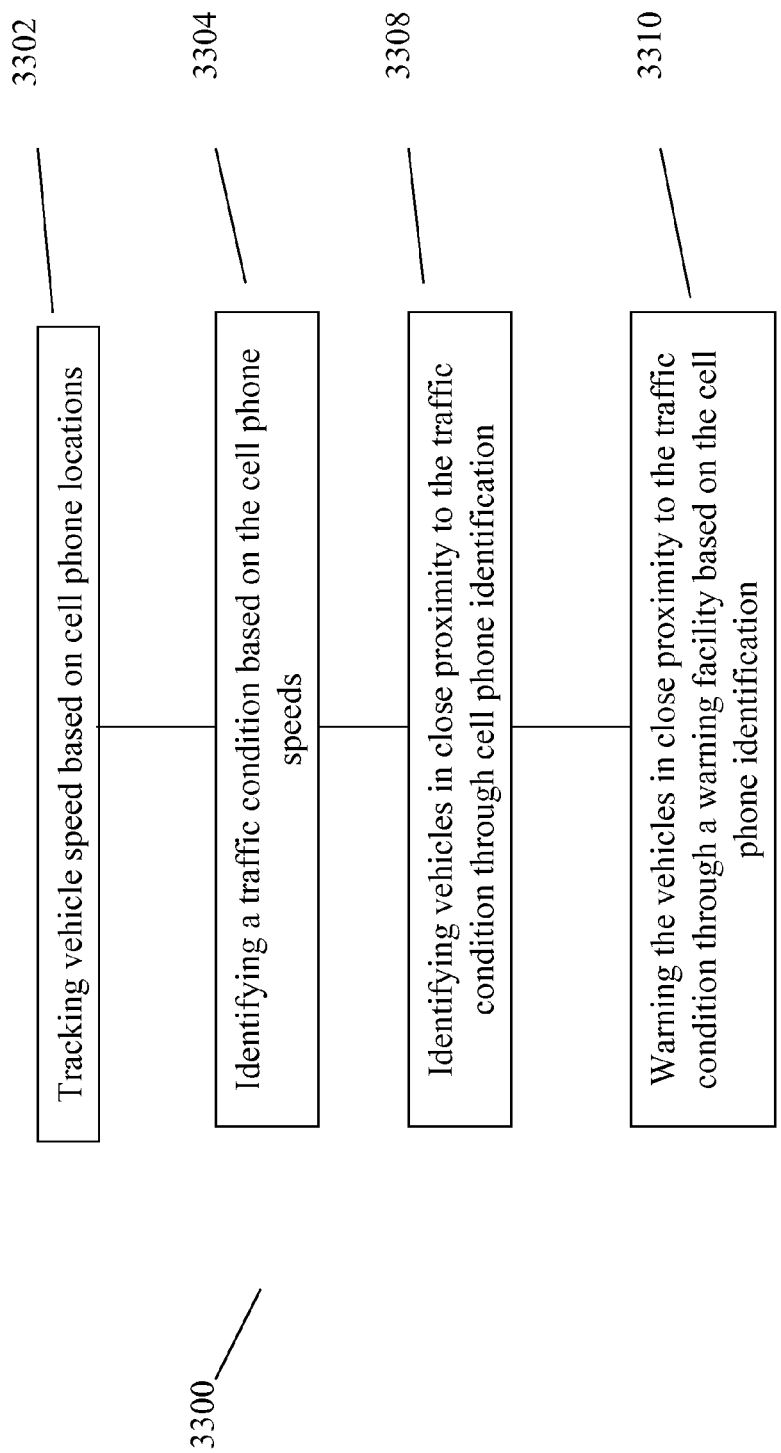
FIG. 33 illustrates a process for warning based on cell phone speed according to the principles of the present invention.

FIG. 33 illustrates a process for warning of traffic conditions based on cell phone speed 3300 according to the principles of the present invention. In an embodiment, the process involves tracking vehicle speed based on cell phone locations 3302, identifying a traffic condition based on the cell phone speeds 3204, identifying vehicles in close proximity to the traffic condition through cell phone identification 3208, and warning the vehicles in close proximity to the traffic condition through a warning facility based on the cell phone identification 3210.

Figure 34:
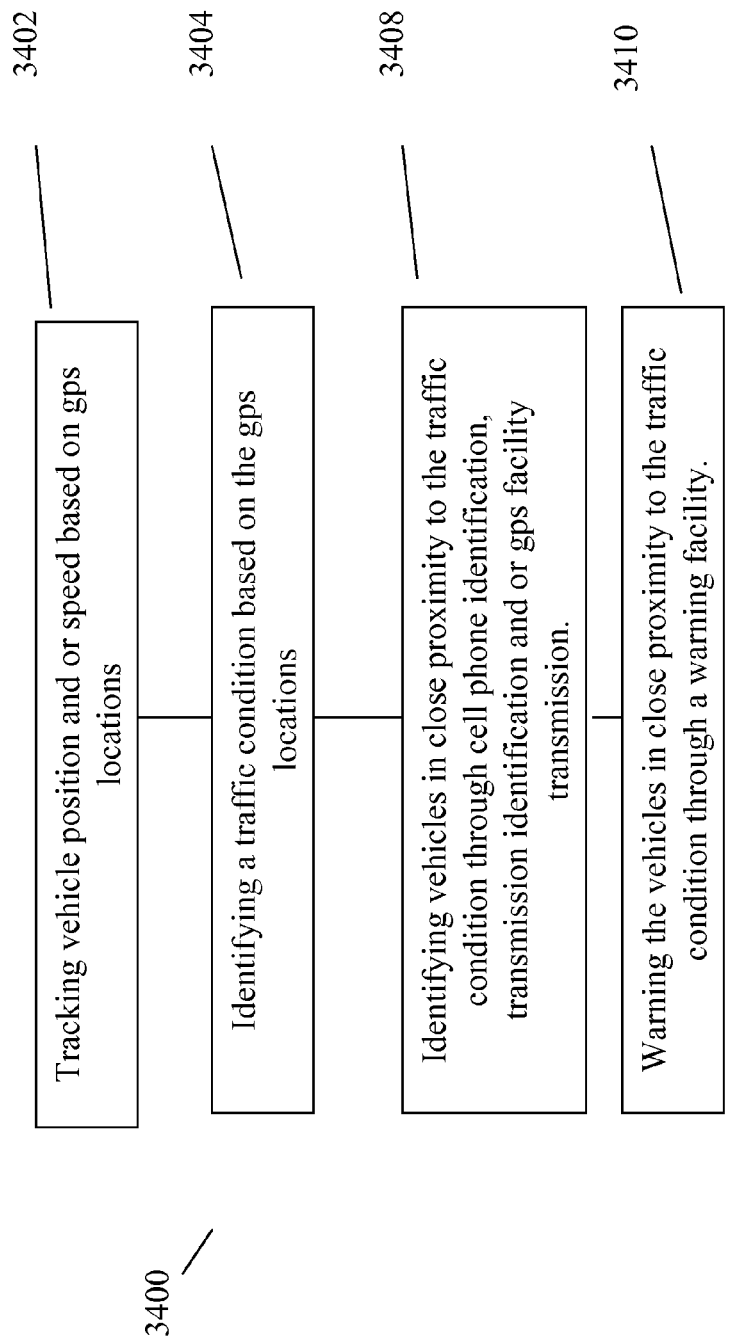
FIG. 34 illustrates a process for warning based on gps locations and or speeds according to the principles of the present invention.

FIG. 34 illustrates a process for warning based on gps locations and or speeds 3400 according to the principles of the present invention. In an embodiment, the process involves tracking vehicle position and or speed based on gps locations 3402, identifying a traffic condition based on the gps locations 3404, identifying vehicles in close proximity to the traffic condition through cell phone identification, transmission identification and or gps facility transmission 3408, and warning the vehicles in close proximity to the traffic condition through a warning facility 3410.

Figure 35:
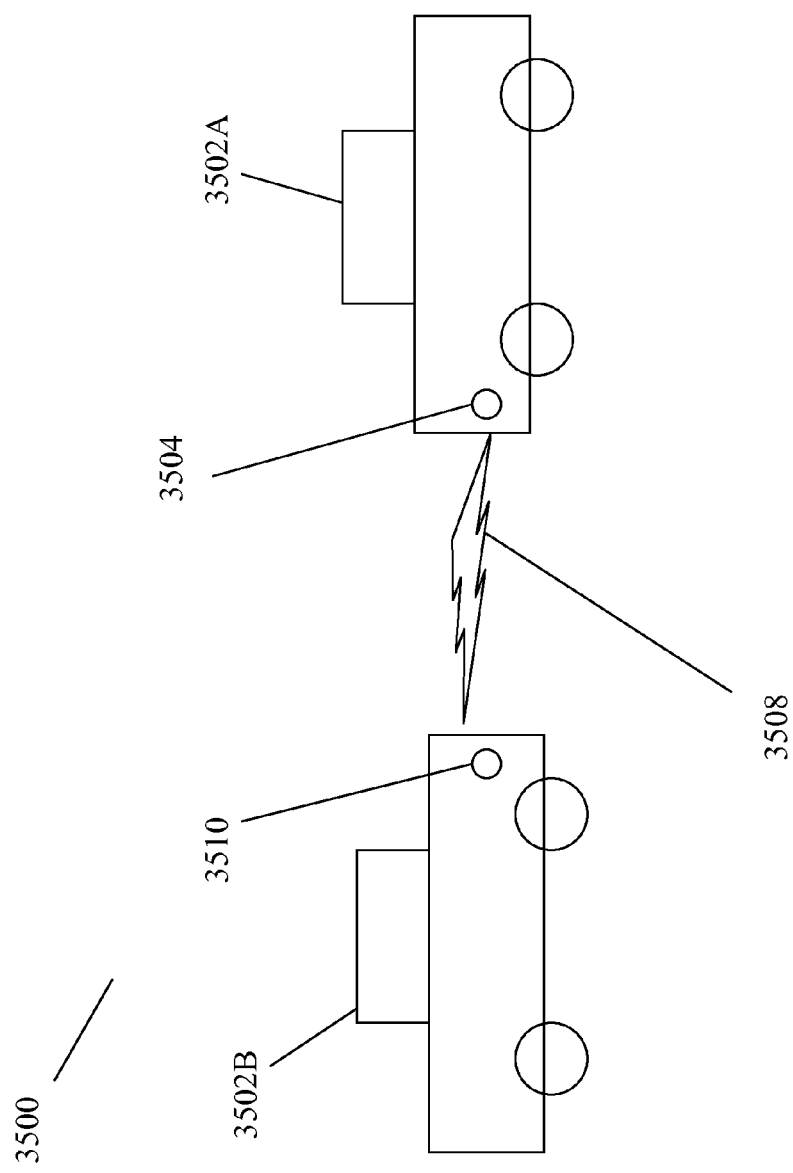
FIG. 35 illustrates a vehicle with transmitter and a vehicle with a receiver according to the principles of the present invention.

FIG. 35 illustrates a system and method for communicating from a vehicle with transmitter to a vehicle with a receiver according to the principles of the present invention 3500. In an embodiment, a first vehicle 3502A includes a transmitter 3504 and a second vehicle 3502B includes a receiver 3510. In an embodiment, the first vehicle 3502A may transmit information relating to its performance (e.g. speed, acceleration, deceleration, braking, temperature) to the second vehicle 3502B. For example, the transmission range of the transmitter 3504 may be short range (e.g. 100 yards) and the first vehicle may generate and communicate information relating to its speed or rate of change in speed through its transmitter 3504. A vehicle within the transmitter range, for example the second vehicle 3502B, may receive the information. In and embodiment, the second vehicle 3502B may automatically respond to the information (e.g. by decelerating if the indication is the first vehicle 3502A is decelerating) or a warning facility in the second vehicle 3502B may generate and communicate a warning or other indication to the driver of the second vehicle 3502B. In an embodiment, the transmitter 3504 may have a long range (e.g. one mile). The transmitter 3504 may transmit information relating to the performance of the vehicle and vehicles within the transmission range may receive the information. For example, the speed of the first vehicle 3502A may be abnormally slow, or significantly slower than the speed of a following second vehicle 3502B. The second vehicle may include a warning facility and the warning facility may generate a warning for the driver of the second vehicle of slower up coming traffic. A method of communicating information over a relatively long range may be useful to warn up coming traffic of abnormal traffic conditions such as an accident, construction, or other congestion. In an embodiment, construction equipment (e.g. machines, trucks, barriers, signs) are equipped with such transmitters to warn of construction activity.

Figure 36:
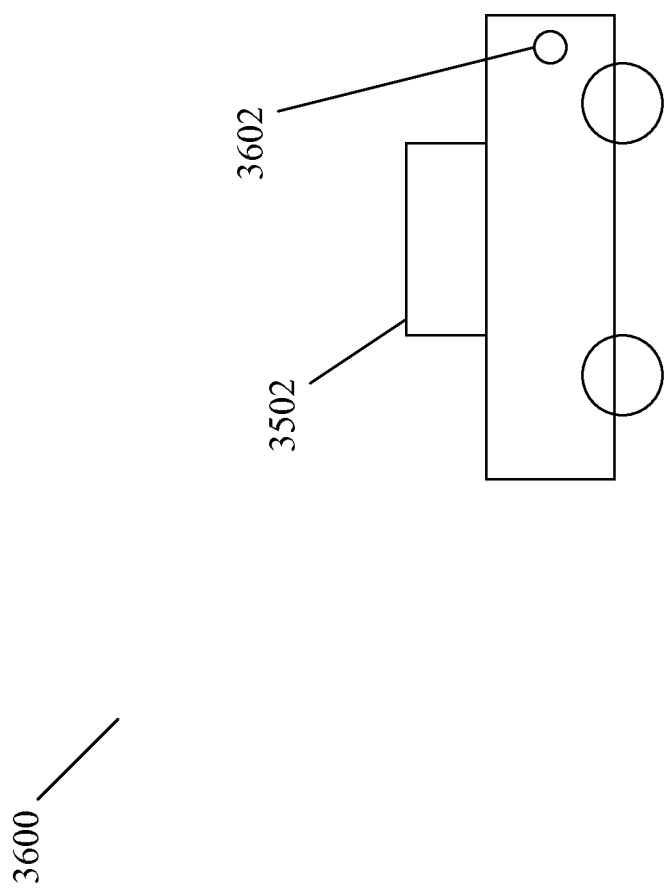
FIG. 36 illustrates a vehicle with transponder according to the principles of the present invention.

FIG. 36 illustrates a vehicle with transponder according to the principles of the present invention 3600. In an embodiment, a vehicle 3502 may include a transponder 3602 that may be activated by another vehicle in close proximity.

Figure 37:
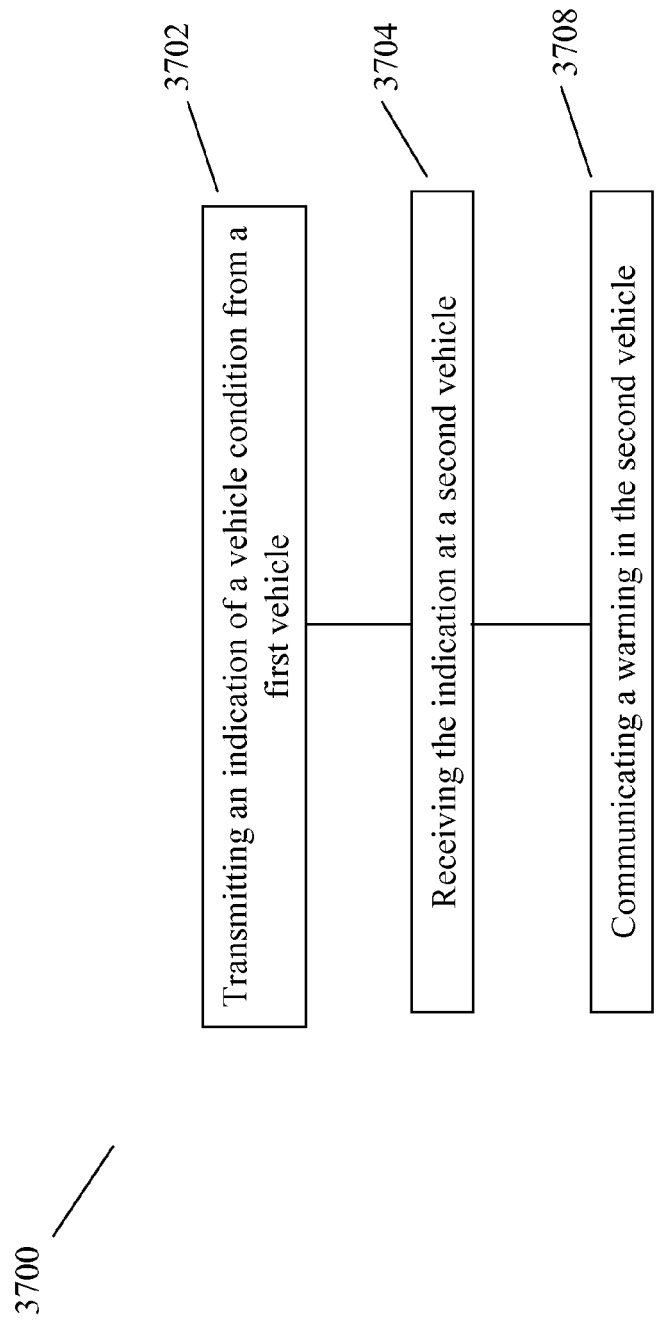
FIG. 37 illustrates a process flow diagram for determining warning based on received information according to the principles of the present invention.

FIG. 37 illustrates a process flow diagram for determining warning based on received information 3700 according to the principles of the present invention. In an embodiment, the process involves transmitting an indication of a vehicle condition from a first vehicle 3702, receiving the indication at a second vehicle 3704, and communicating a warning in the second vehicle 3708.

Figure 38:
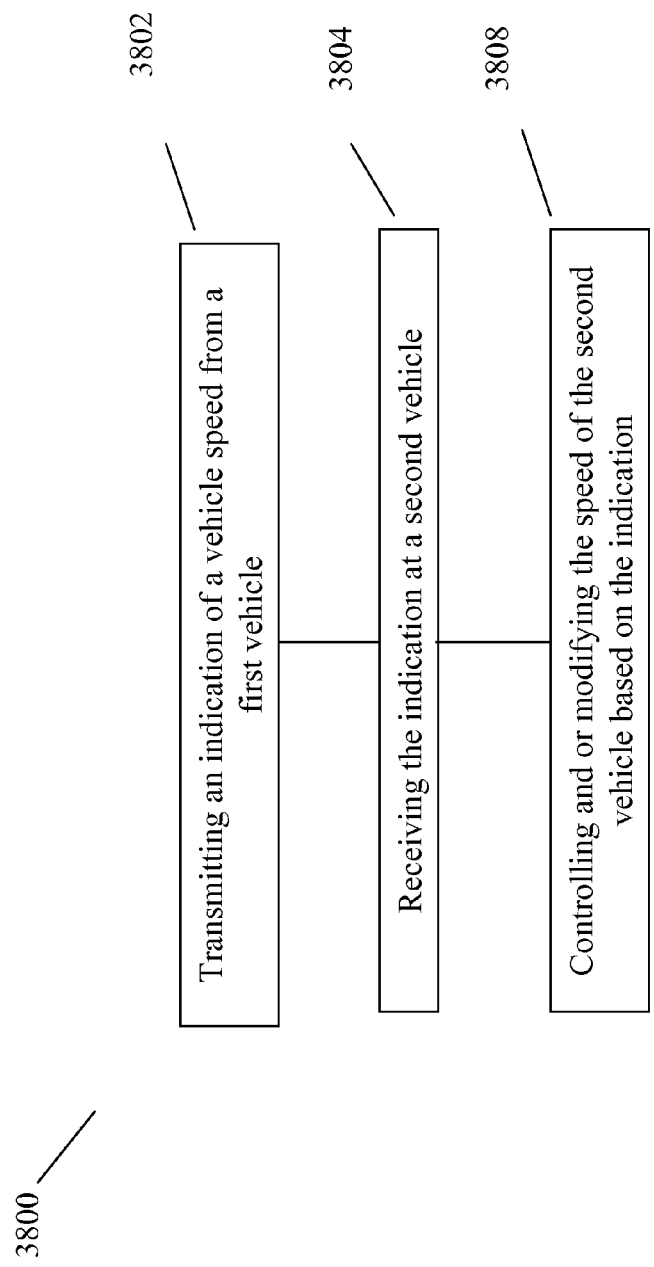
FIG. 38 illustrates a process flow diagram for maintaining vehicle speed based on received information according to the principles of the present invention.

FIG. 38 illustrates a process flow diagram for maintaining vehicle speed based on received information 3800 according to the principles of the present invention. In an embodiment, the process involves transmitting an indication of a vehicle speed from a first vehicle 3802, receiving the indication at a second vehicle 3804, and controlling and or modifying the speed of the second vehicle based on the indication 3808.

An aspect of the present invention relates to systems and methods of providing route information, navigation, and or directions. In embodiments, a traveler may use a mobile communication facility, cell phone, or other communication facility to connect with a route information system. The route information system may locate the traveler through a location facility in coordination with route or mapping information. The traveler may request information relating to routes and or directions from the route information facility, for example through cell phone interaction. The traveler may request information relating to a preloaded route for example. In embodiments, the route information system may automatically provide route information pertaining to the apparent route the traveler is on. The traveler may be provided with an opportunity to select route options or alternatives. In an embodiment, the traveler may activate the route information facility through use of a cell phone. Similar to the cell phone activated 411 telephone information system (where phone number information is provided), the traveler may dial an access code (e.g. 411, 511, *71, etc.) to be connected with the system. Once connected, the traveler may request direction and or route information relating to a destination. For example, he may request directions to the "YMCA in Danvers, Mass.". The route information system may then look up, or be used to look up, the destination address, locate the traveler (e.g. through cell phone triangulation), and provide the traveler directions to the destination. In embodiments, the traveler may request directions to a type of destination (e.g. gas station, hotel, ATM) or landmark (e.g. State House) or activity (e.g. arcade).

Figure 39:
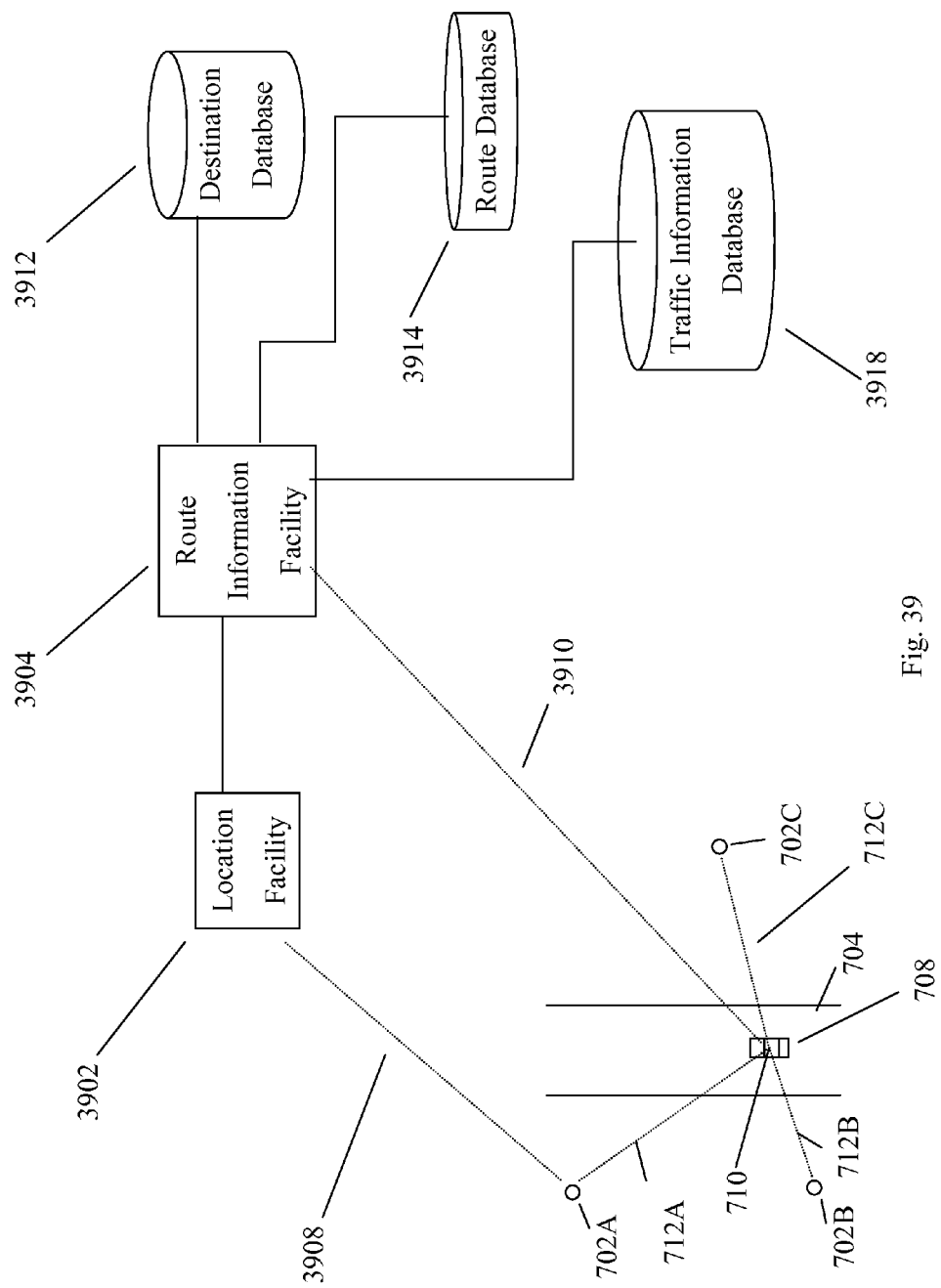
FIG. 39 illustrates a traffic information facility according to the principles of the present invention.

FIG. 39 illustrates a travel information system 3900 according to the principles of the present invention. As described herein in connection with FIG. 7, a cellular tower system may be associated with a location facility 3902. The location facility 3902 may provide location, speed, or other information relating to a transmitter (e.g. cell phone). The travel information system 3900 may also include a route information facility 3904. The route information facility 3904 may be associated with a destination database 3912, a route database 3914 and a traffic information database 3918. In an embodiment, the destination database 3912 may include information relating to destination locations. For example, it may be a database with associations between phone numbers, street addresses, towns, states, countries, type of destination, type of landmark, type of activity or other information relating to destinations. The destination database may also include information relating to preloaded destination(s). For example, a traveler may load information relating to a destination to be later retrieved.

In an embodiment, the route information database 3914 may include information relating to travel routes. For example, it may include maps, map information, traffic information, travel condition information, travel times, travel time predictions, or other information regarding to routes, navigation, and or directions. In an embodiment, the traffic information database 3918 may include information relating to route traffic, alternate routes, route times, route time predictions, typical route performance or other information relating to routes and or directions.

While the destination database 3912, route database 3914, and traffic information databases are illustrated as separate databases, it should be understood that these and other databases may be combined or further separated, and associations may be made between the data in the databases.

The route information facility 3904 may use information in the databases (e.g. databases 3912, 3914, 3918) as well as information from the location facility 3902 to provide information to the traveler. In embodiments, a traveler connects with the route information facility 3904 through a cell phone, or other communication facility, transmission 3910. For example, the traveler may initiate a connection by dialing an access code (e.g. 411 or *73). Once connected, the route information facility 3904 may gather information from the location facility 3902 or databases 3912, 3914, and 3918 to provide information to the traveler.

In an embodiment, route information may be preloaded into a route information facility 3904, or associated facility or database, and the route information facility 3904 may provide traffic information pertaining to the route given a travelers location. For example, a traveler may dial a specific phone number or code (e.g. *73) on his cell phone to access the route information facility 3904. The route information facility 3904 may then locate the traveler's position (e.g. using cell phone triangulation, or gps location) and associate the position with the preloaded route information. The traveler may then be provided with route specific travel conditions (e.g. congestion, travel time estimates or predictions).

In an embodiment, the traveler may also be informed about alternate routes or alternate route performance. For example, the traveler may be traveling on I-93S towards Boston when initiating the call. The route information facility 3904 may recognize his position as being close to the Sullivan Square exit. The traffic conditions on the highway to downtown may be such that taking the Sullivan Square exit and corresponding alternative route to downtown may cut time off the traveler's trip. The traveler may be informed of the route performance, comparison of times estimated, predicted times, or the like.

In an embodiment, the traveler may take the alternate route and make an indication (e.g. key stroke) telling the route information facility 3904 of his decision. In an embodiment, the traveler stays engaged with the route information facility 3904, the system monitors his position and recognizes the new route. The route information facility 3904 may then communicate new route instructions. The new route instructions may be provided as complete instructions, stepwise, or otherwise.

In an embodiment, a route information facility 3904 identifies a traveler's position (e.g. through cell phone triangulation), associates the position with a roadway, and predicts the route the traveler is taking For example, the traveler may initiate a call to the route information facility 3904 while traveling on I-93S towards Boston. The route information facility 3904 may recognize the traveler's position, associate a roadway with the traveler's position and predict he is traveling I-93 S to Boston or some destination before or after Boston. In an embodiment, traveler would then be informed of traffic conditions on I-93S ahead of the traveler. For example, the traveler may be informed of traffic conditions up to and or through Boston.

In an embodiment, a traveler may select route options to instruct the route information facility 3904 of the travelers route intentions. For example, the route information facility 3904 may identify the traveler as traveling on I-93S towards Boston (e.g. through cell phone triangulation) and provide route options to the traveler to select a route other than continuing on I-93S towards Boston. The options may be menu driven (e.g. select one for I-495S, two for I-495N), exit driven (e.g. type in your exit number), or otherwise driven for indicating a desired or intended route (e.g. voice recognition indications). In an embodiment, the traveler may be provided information relating to the selected route.

In an embodiment, a traveler may load route and or destination information into a route information facility 3904 and later activate a direction system through his mobile communicator (e.g. cell phone, on-board transmitter). For example, the traveler may load destination and or route information into a computing system via the internet or other means. The traveler may then connect with the route information facility 3904 to obtain directions. The monitoring system may locate the traveler through triangulation or other means and provide directions per the preloaded route information and or preloaded destination information. The information may be provided in a stepwise, complete or other fashion.

In an embodiment, voice recognition software may be employed to provide the traveler with a convenient way of loading route and or destination information. For example, a traveler may be on the road and call into a monitoring system to load a destination facilitated by voice activation. The destination may include a street address, phone number or other indication of the destination. In an embodiment, the traveler may use a phone keyboard to load the phone number of the desired destination. The monitoring system may then look up the corresponding address to provide route and or destination information. Once the route and or destination information are loaded, the traveler may connect with the monitoring system for directions, time estimations, traffic conditions or other information.

In an embodiment, a traveler may request directions to a type of destination (e.g. gas station, coffee shop, Dunkin Donuts, Star Bucks, shopping center, Hotel) to a monitoring system. The system may locate the traveler and provide directions to the destination chosen. For example, the system may accept voice commands to identify the destination type. The voice commands may direct a menu and or be recognized as types of destinations. In another example, keys of a phone may be used to select types of destinations from a menu.

In an embodiment, a user may call into a information system, identify a destination, and provided directions or other route information. For example, the user may use a cell phone to call an information system (e.g. 411), identify a business or residence along with approximate location (e.g. state and town), and then be provided directions to the specific location. In an embodiment, the directions may be provided from the user's cell phones location. For example, a traveler may be traveling to the YMCA in Danvers, Mass. and require assistance in getting to the location. The traveler may use his cell phone to call 'information' asking for directions to the YMCA in Danvers, Mass. The system may be used to look up the street address of the YMCA, identify the travelers location (e.g. through cell phone triangulation or gps) and provide directions from the travelers present location to the YMCA destination. In an embodiment, the directions may be provided in total so the traveler can disconnect from the system. In an embodiment, the directions may be provided in stepwise fashion, guiding each sep of the traveler's route (e.g. "take next right at Main St."). In an embodiment, the direction instructions may be altered to accommodate unforeseen obstacles (e.g. the traveler misses a turn, encounters construction, or detours).

While many of the embodiments illustrate direct communication with the route information facility (e.g. cell phone communication to the route information facility) embodiments may include communication through other facilities. For example, the cell phone communication may occur through the location facility and the location facility may be associated with the route information facility. There are many such variations envisioned by the inventors and such variations are included in various embodiments.

In embodiments, the route information facility may be associated with a route prediction facility. A route prediction facility may be a facility used to predict route performance based on current and or past route and or associated route performance.

Figure 40:
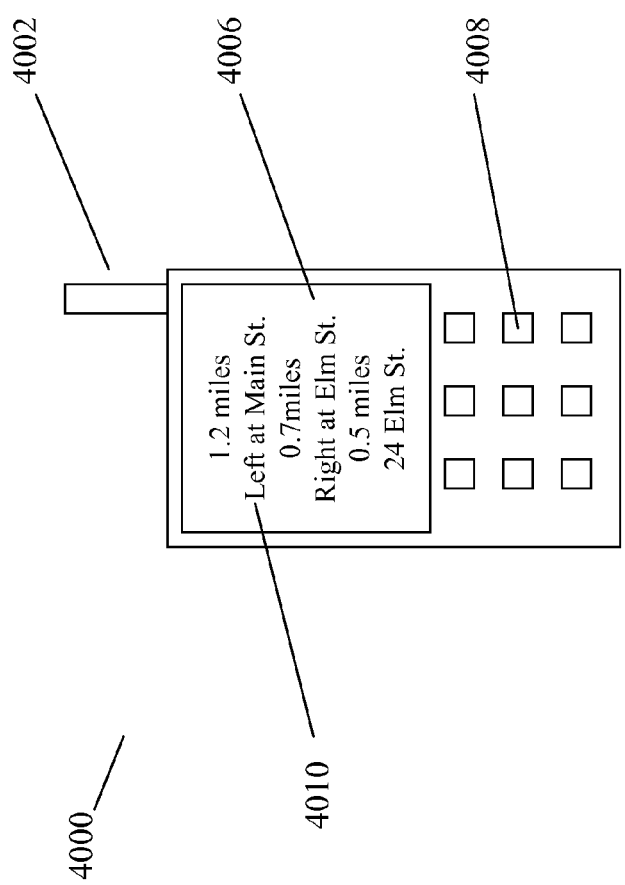
FIG. 40 illustrates a portable communication facility 4000 according to the principles of the present invention.

FIG. 40 illustrates a portable communication facility 4000 according to the principles of the present invention. In embodiments, a portable communication facility 4000 may be a cell phone, mobile phone, walkie talkie, satellite phone, pda, web device, Blackberry device, email device, web browsing facility, in-vehicle communication facility, in-vehicle navigation facility, in-vehicle information facility or other facility used for mobile and or portable communication. In embodiments, the portable communication facility may include a display facility 4006, a keyboard 4008 (e.g. numbered key on a phone, or alpha-numeric keys of a pda), and an antenna 4002 to facilitate communications with other facilities using wireless communication techniques.

In embodiments, a portable communication facility 4000 may be used to communicate with a route information facility 3904. For example, a cell phone may be used in one or two-way communication with the route information facility 3904. An example of two-way communication may be when the cell phone is used to connect with the route information facility and facilitate communication of a query (e.g. dialing 411 and requesting information pertaining to a location) and the phone is also be used to receive information pertaining to the query. For example, the route information facility may communicate directions to a location from a present location of the traveler through audio communication (e.g. directions the traveler can listen to on his cell phone). The route information system may also communicate directions, or other route information, through display signals. For example, the directions 4010 information may be communicated to be displayed on the display facility 4006 of the cell phone or pda or other facility. This way the traveler has a visual indication of the directions.

In embodiments, the cell phone, or other portable communication facility, may be used in one-way communications, either sending or receiving. For example, the cell phone may be used to facilitate an initial query (e.g. get me directions to the location) but the directions may be sent to another facility. For example, a vehicle may be equipped with a travel information system, LCD screen, or other facility with a display facility and the direction information may be sent to the vehicles display. In an embodiment, an association between a users cell phone and vehicle system may be made to facilitate communications to the vehicle following a cell phone initiated communication. In an embodiment, the receiving facility may be another portable communication facility (e.g. pda). Again, an association may be made between portable communication facilities to facilitate the directions of the communications.

In an embodiment, a traveler may request directions or other route information from a route information facility without the assistance of an automatic location facility. For example, a traveler may connect to the route information facility via a portable communication facility (e.g. a cell phone) and request directions or route information from a location the traveler identifies to the route information facility. For example, the traveler may know his location (e.g. corner of Main St. and Elm St., in Danvers, Mass.) and instruct the route information facility of his present location along with his desired destination. In embodiments, the traveler may speak this information, write, type, key or other communicate the information. In embodiments, the route information facility may receive the information via human interaction, automatically or semi-automatically. For example, a human may receive the information, or a voice recognition facility may be used. The route information facility may be manual, automatic or semi-automatic itself in an embodiment. For example, it may receive information through human interaction, the person may look up travel, route, or direction information on a computer facility (e.g. www.mapquest.com) for directions per the given location and destination, and the person may communicate the information back to the traveler.

Figure 41:
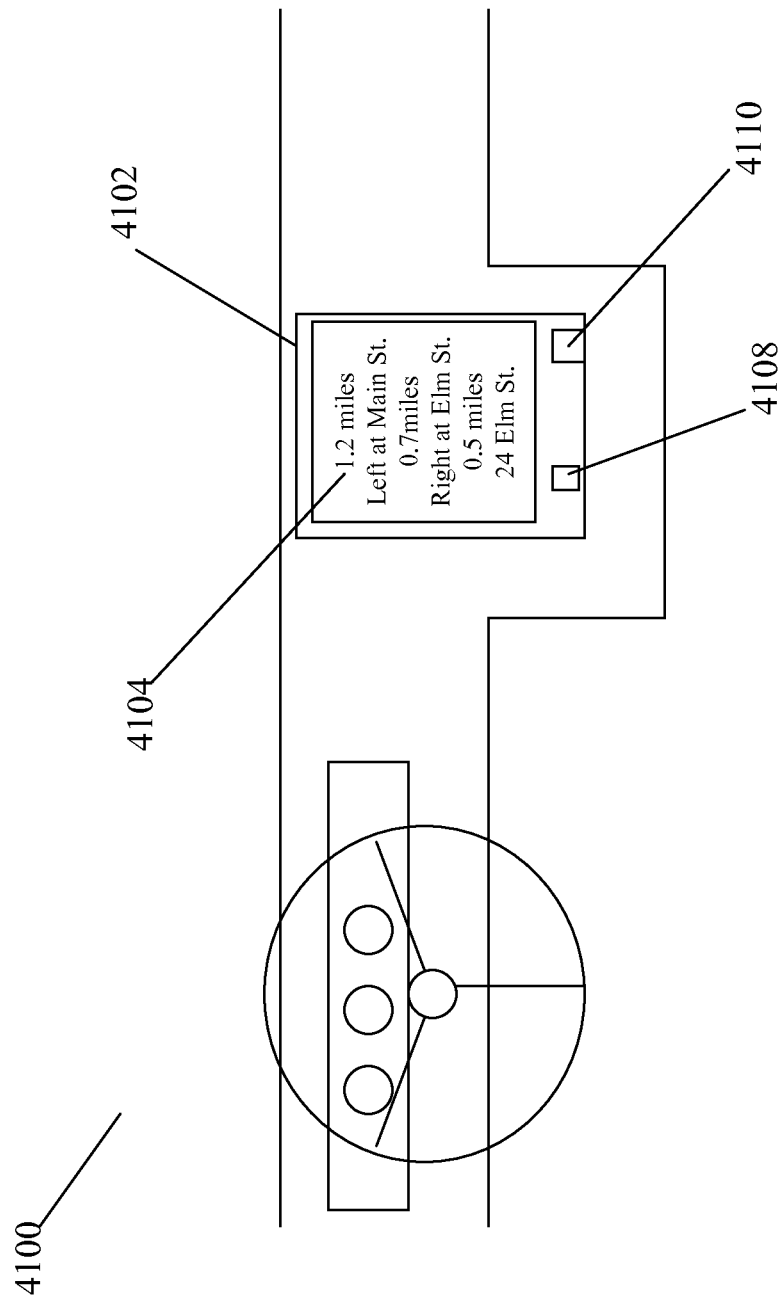
FIG. 41 illustrates an in-vehicle communication facility according to the principles of the present invention.

FIG. 41 illustrates an in-vehicle communication facility 4102 according to the principles of the present invention. In embodiments, the in-vehicle communication facility 4102 is mounted on or in the vehicle, 4100. The in-vehicle communication facility 4102 may include a display facility 4104 where route information and or directions may be displayed. The in-vehicle communication facility 4104 may also include a user interface 4108. For example, the user interface 4108 may be used to initiate contact with a location facility and or a route information facility. The in-vehicle communication facility 4104 may also include an audio system 4110 adapted to receive (e.g. a microphone) and or transmit (e.g. a speaker) audio information.

An aspect of the present invention relates to systems and methods used to communicate information from a telephone answering facility. In embodiments, information from a telephone answering facility is communicated (e.g. as a result of a user prompt or call) through digital data that can be received and viewed as text, image, and or other visual content through the use of a communication platform (e.g. a mobile communication facility, a cell phone, pda, BlackBerry®, PalmPilot®, remote communication facility, landline communication facility, wireless communication facility, in-vehicle communication facility, in-vehicle navigation facility, in-vehicle information facility, or desktop communication facility.). In embodiments, the information may contain and be formatted to be received and retrievable through an audio reproduction facility (e.g. a cell phone). For example, a user may use a cell phone to call an answering facility to request information. Information may then be communicated by the answering facility to the cell phone. The information received by the cell phone may include text, image and or sound information. The information may then be stored in the cell phone, or in another associated facility (e.g. remote memory location accessible by the cell phone). The user of the cell phone may than be able to retrieve the information and read the text, view the image, and listen to the audio information provided.

In embodiments, the information communicated from the telephone answering facility to the communication platform may include information pertaining to a business, retailer, residence, home, or other establishment associated with the telephone answering facility. For example, the information may include information pertaining to the location of a store, directions to a location, sale information, coupon information, hours of operation, inventory, item selection, movie times, cost information or other desired information. For example, a user may call a store to get directions and an answering facility may respond (e.g. automatically or through a user prompt) by sending information to the user's cell phone for user viewing. The user can then view the information and or store the information for later viewing. The user may open a message or file to retrieve the information. In embodiments, directions provided may be generic directions (e.g. from a known landmark, roadway or highway), user location specific directions (e.g. based on the triangulation or gps coordinates of the cell phone), navigation, user specific directions based on typical route conditions, based on current route conditions, based on the telephone answering facilities desired route conditions (e.g. to avoid sending the user on routes that include certain competitors or other undesirable or desirable landmarks), and or based on other relevant information. In embodiments, the information includes links to webpages and or other information pages. In embodiments, the information includes forms, selectors, or other areas where user provided information can be loaded and or selected in order to be communicated back to the telephone answering facility or other facility. For example, a user may call the theater and the answering facility may respond by sending information to the users cell phone. The information may include information pertaining to currently running shows. The user may view and or listen to the stored information and decide to purchase tickets for this evening's show. The user then makes the appropriate selection on his cell phone and transmits his ticket request back to the answering facility or to another facility he is directed to. In response, the user may receive information pertaining to his ticket purchase on his cell phone or at another facility.

Figure 42:
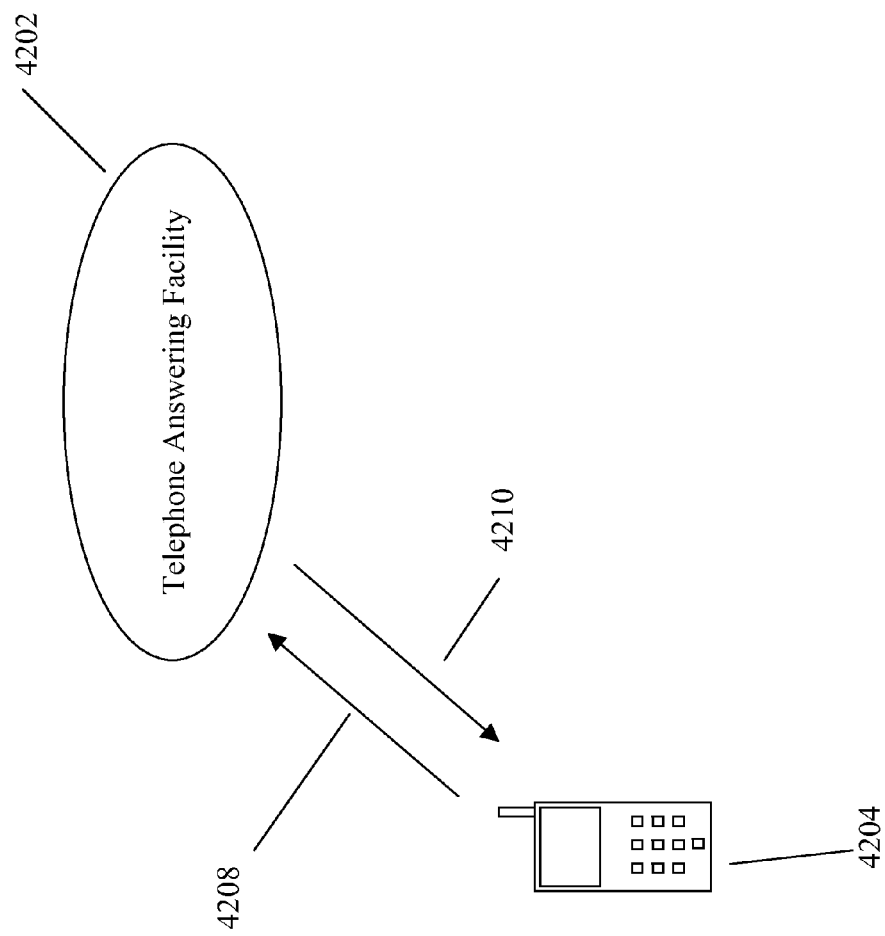
FIG. 42 illustrates a system for communicating with a telephone answering facility wherein information is communicated in a format to be viewed and or listened to through the communication platform according to the principles of the present invention.

FIG. 42 illustrates a system for communicating with a telephone answering facility 4202 wherein information 4210 is communicated in a format to be viewed and or listened to through the communication platform 4204 (e.g. a cell phone) according to the principles of the present invention. In this embodiment, a user may use the communication platform 4204 to call or otherwise initiate or establish communication with the telephone answering facility 4202. The telephone answering facility 4202 may communicate information to the user through real-time voice communication. The real-time voice communication may include the presentation of menu options (e.g "say or press one for store information) or through an automated information response (e.g. provided information without prompt). For example, the answering facility may respond to the call with a menu indicating the user should press one in order to receive an information download to his cell phone or other communication facility. The user may then communicate the selection of the digit one 4208 to the telephone answering facility 4202. The telephone answering facility 4202 may then communicate information to be received and stored on the cell phone or other facility 4210. This communication may be take place while the user continues on the voice call or at some time following the call. The communication 4210 from the answering facility may be in a form to be received and viewed on the cell phone. For example, it may be a text message, a short message, an email message, a webpost message or other format intended to be viewed through a viewing facility. The information 4210 may also include images (e.g. a .jpeg file), pictures, video, or other image information. The information 4210 may also include audio information (e.g. an mp3 file). In embodiments, the audio information may be associated with the text and or image information provided.

In embodiments, once the information 4210 is received by the cell phone 4204, the information may be stored in the cell phone for later retrieval. For example, the information may be stored and associated with the address book or other list in the phone. The information may pertain to a store (e.g. a bike store, grocery store) and the user may store the information in a file associated with the cell phone contact list. When the user wants information pertaining to the bike store, he calls it up through the name associated in the contacts list. He may then be able to view all or a portion of the information associated with the name listed in the contact list.

In embodiments, the information stored on the cell phone may also include a feature for updating the information. For example, the information may include an 'update' button (e.g. a software generated icon) and the user may update the information through a click or otherwise activate the update button. Once activated, the phone may initiate communication with the original answering facility or other update facility to retrieve update information. In embodiments, the information provided may include direction information and the directions may be provided from the cell phones location (e.g. through gps coordinates and map comparison). The user may choose to update the information based on his new location. For example, the user may want to receive written or audio directions to a store or other location, so he calls the answering facility and downloads direction information based on his present location (e.g. based on his cell phone location). Once he is underway, he may review the downloaded information. If he gets lost, runs into traffic or otherwise wants updated information he may select an update feature or call the answering facility again to receive updated directions from his new location.

In an embodiment, the information may contain sale or coupon information and the user may choose to get updated information pertaining to sales or new coupons from time to time.

In an embodiment, the telephone answering facility may retain information pertaining to what devices or what persons it has delivered information to and the telephone answering facility or other update facility may communicate updated information to the previously contacted devices with updated information. In embodiments, this update procedure may occur automatically, at predetermined time(s), when information is updated, when there is new sale or coupon information, or at other times determined by either the operators of the answering facility or the user. For example, the telephone answering facility may automatically (e.g. non-caller prompted) communicate updated sale, coupon, direction, phone number or other information to a cell phone that was once used to collect information. In an embodiment, the information may be delivered without notification to the cell phone user. In an embodiment, the information may be delivered along with an alert to the user that new sale information has been loaded. In an embodiment, the new information may be displayed on the screen of the users communication facility and or stored in the facility for later viewing. By way of example, information pertaining to a sale may be communicated to a users cell phone. Information pertaining to the sale may be displayed, in either summary form or in its entirety, on the cell phone display. The information may also be stored on the cell phone and associated with the information or replace the information already in the cell phone. The information displayed on the screen may also include a link to further information stored on the cell phone or information stored in a remote location. For example, the information may contain a hyper link to the store's website or to a file on the cell phone.

Figure 43:
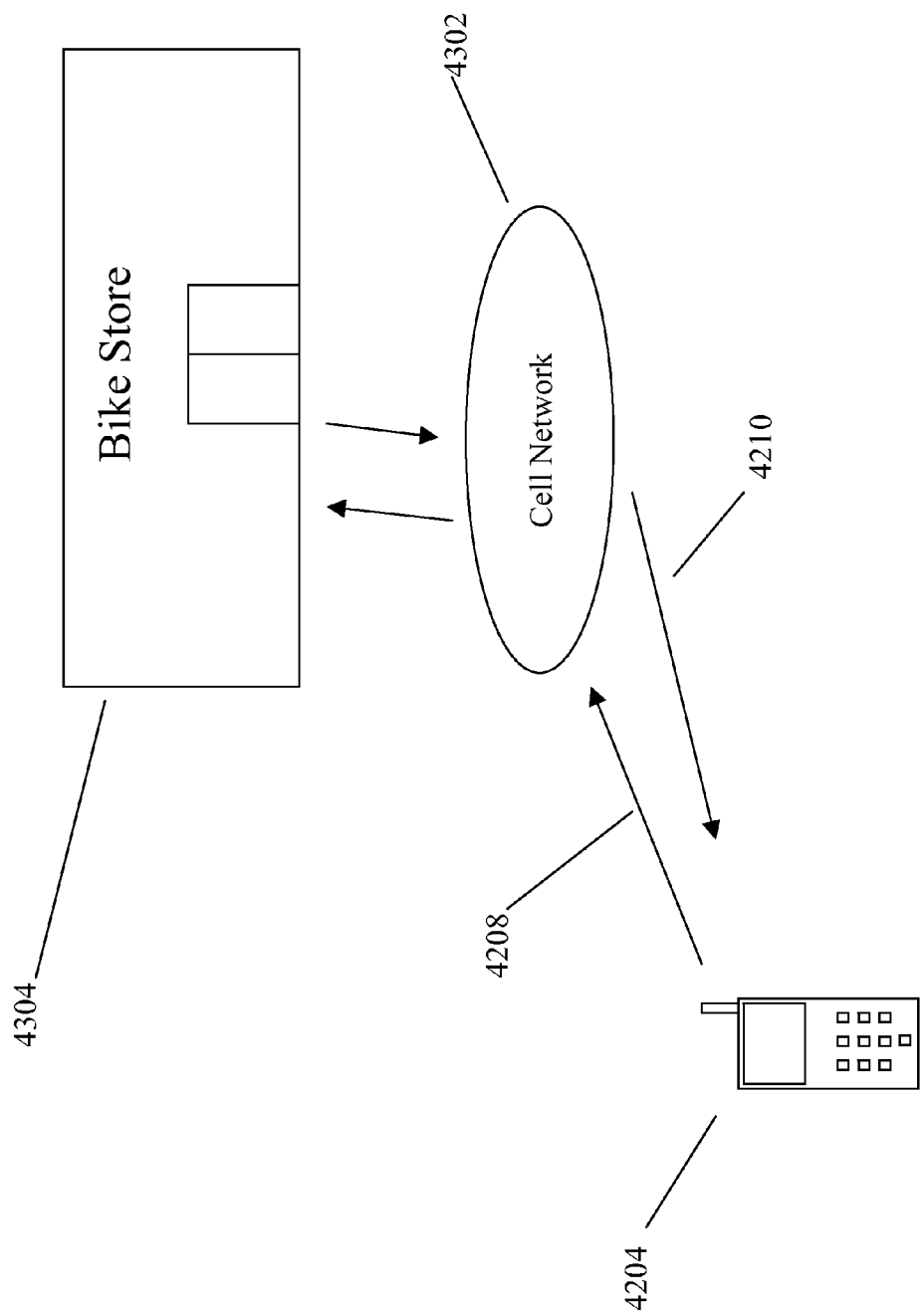
FIG. 43 illustrates a method of retrieving information from a communication answering facility wherein the download of information is facilitated by a cell network according to the principles of the present invention.

FIG. 43 illustrates a method of retrieving information from a communication answering facility wherein the download of information is facilitated by a cell network 4302 according to the principles of the present invention. In this embodiment, a communication platform 4204 may be used to communicate a request 4208 through a cell network 4302 to a communication answering facility associated with a business, residence, office, or other such establishment (e.g. a bike store) 4304. The information request 4208 may be communicated through the cell network 4302 and transmitted to the answering facility associated with the bike store 4304. In response to the request, the answering facility may download or otherwise communicate information through the cell network 4302 back to the mobile communication facility (e.g. cell phone) 4204. As previously described, and by way of example, the downloaded information may be in a format to be viewed through the cell phone.

Figure 44:
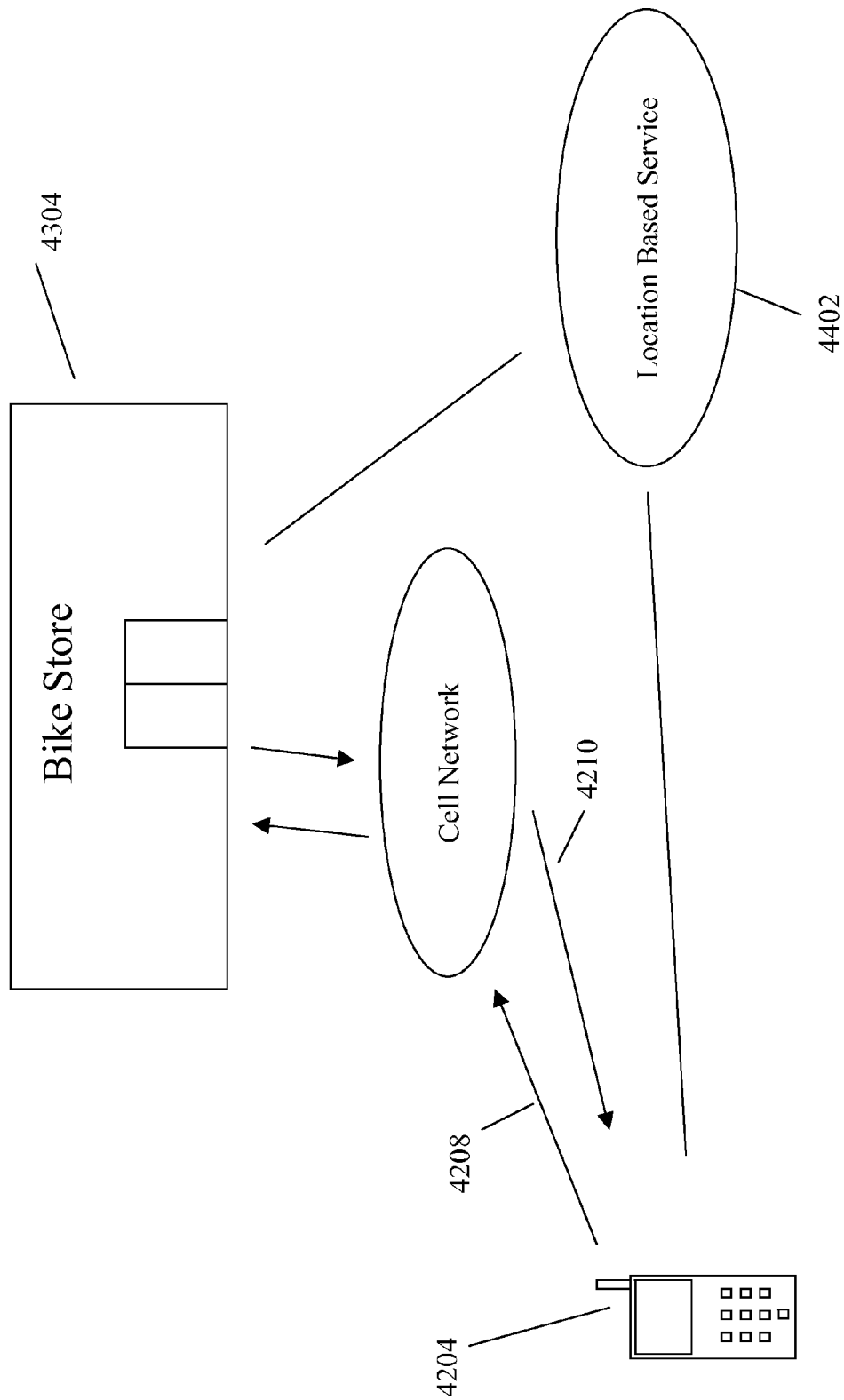
FIG. 44 illustrates a method of retrieving information from a communication answering facility wherein the information request is fulfilled in coordination with a location-based service according to the principles of the present invention.

FIG. 44 illustrates a method of retrieving information from a communication answering facility wherein the information request is fulfilled in coordination with a location-based service 4402 (e.g. a cell phone location triangulation facility, gps location facility) according to the principles of the present invention. In this embodiment, a user uses his cell phone, or other communication platform 4204, to communicate through the cell phone network 4302 to an answering facility associated with the bike store 4304. The ownership of the bike store would like to provide location and direction information to the user, so the answering facility is configured to communicate location and direction information to the users cell phone. The information is formatted to be received and stored and or viewed by the user through the cell phone. In an embodiment, the location and direction information may be provided in a generic form. For example, the location and direction information may include an address, phone number and directions from a local landmark, roadway or highway (e.g. "when coming from Boston . . . " or "when coming from the north . . . " or "when coming from Route 95 . . . "). In an embodiment, the location and direction information may be provided from a specific location. For example, the location of the cell phone may be determined through a location-based service 4402 (e.g. gps location service, or cell phone triangulation location service) and the directions from the cell phones present location may be determined and provided through a text message or the like. The text message may read like a set of instructions from the users present location. For example, "go straight on Elm St for 1.8 miles, turn right on Main St. for 0.4 miles, take Route 95 north to Exit 38 . . . " The user may store these directions and call them up to read while in transit. In an embodiment, the cell phone is equipped with an audio system adapted to read the directions back in either complete or stepwise fashion. In an embodiment, the direction page, or associated page, may be equipped with an update facility wherein the user can update the directions. For example, the user may now be in a location in-route, be lost, or coming from another location and want updated information. The user could call the answering facility for updated directions, or activate the update facility to automatically update the directions from the users present location.

In an embodiment, the location and direction information may be provided from a user specified location. For example, the user may type, speak, or otherwise load a starting location (e.g. 11 Market St., Frenchtown, Mich.) into the system and the telephone answering facility may send directions based on the loaded location.

In embodiments, the directions communicated to the cell phone 4204 in coordination with the location based service 4402 are provided in such a way as to provide real-time directions. For example, once the location and destination are determined the location-based service 4402 stays in communication with the cell phone, either directly or in-directly, to provide real-time direction information. The information may be provided in a stepwise fashion to provide real-time directions from street to street for example.

In an embodiment, the directions may be provided from the users present location (e.g. as determined through cell phone location services) and the directions may be based on route specific information. For example, the route specific information may include real-time route conditions, quasi real-time route conditions, typical route conditions, fastest route, shortest route, route based on competition's location, route based on the most attractive route or other information. In an embodiment, the destination and origin of the route are determined and the route conditions are determined through the systems and methods described in the present disclosure. The user may be provided with a menu to determine how he would like the direction information presented (e.g. based on typical traffic versus generic directions) or the system may make the determination (e.g. with the intention of driving the customer in a path away from his competitor).

Figure 45:
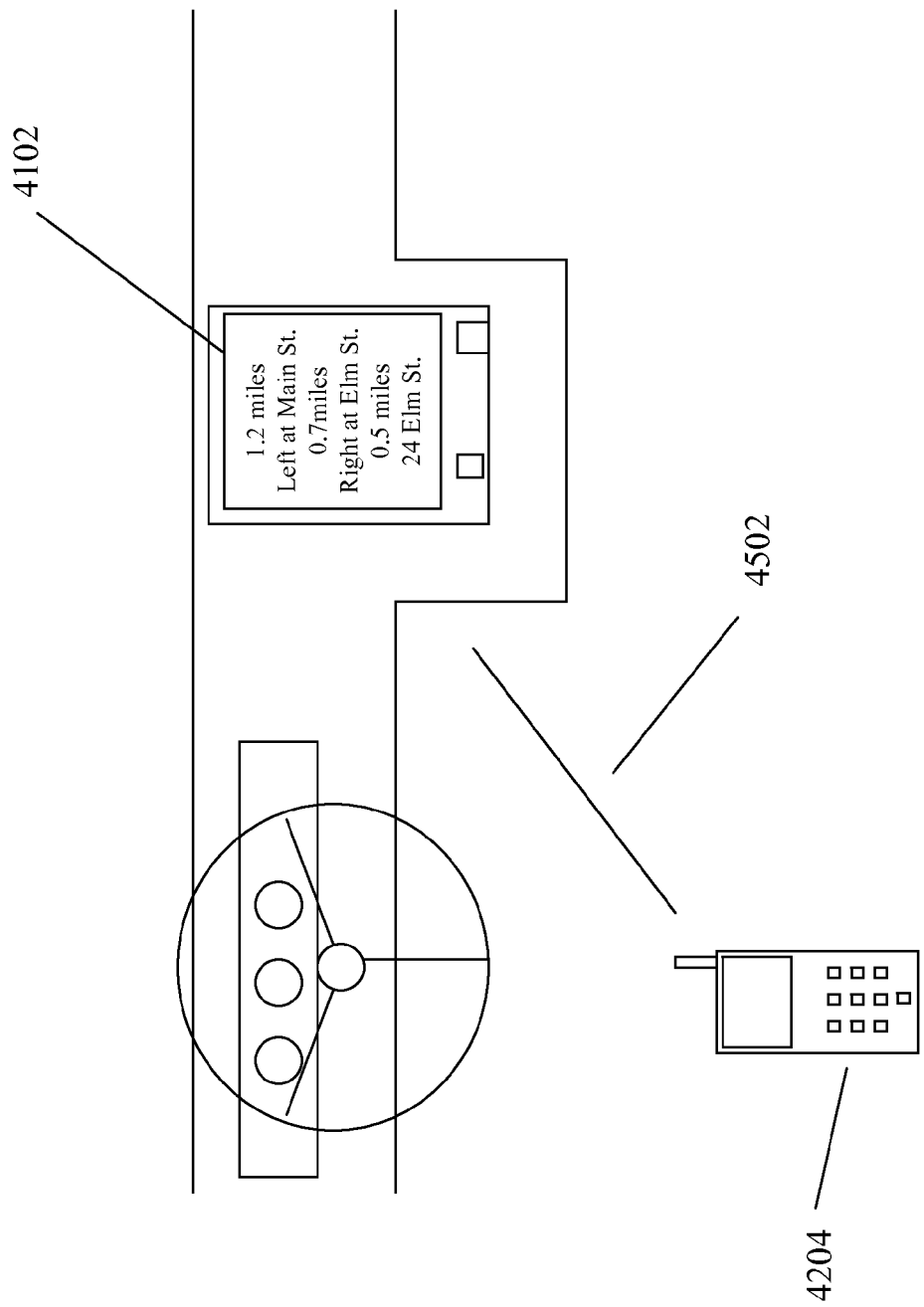
FIG. 45 illustrates a method of downloading information from a portable communication facility to an in-vehicle location facility according to the principles of the present invention.

FIG. 45 illustrates a method of downloading information from a portable communication facility 4204 to an in-vehicle location facility 4102 according to the principles of the present invention. In an embodiment, a user may use his cell phone to download direction, location, map, or other information from a remote source and then download 4502 the information, of part of the information, to an in-vehicle location facility 4102. For example, the user may use his phone to communicate with an answering service to download stored location information pertaining to a store, office, or residence. The user may then want to use that information in his in-vehicle location and mapping facility. The user then downloads 4502 the stored information from the cell phone to the in-vehicle system such that the in-vehicle system can use the information. In an embodiment, a user may also download maps, map files, or other map information to be communicated to the in-vehicle system.

Figure 46:
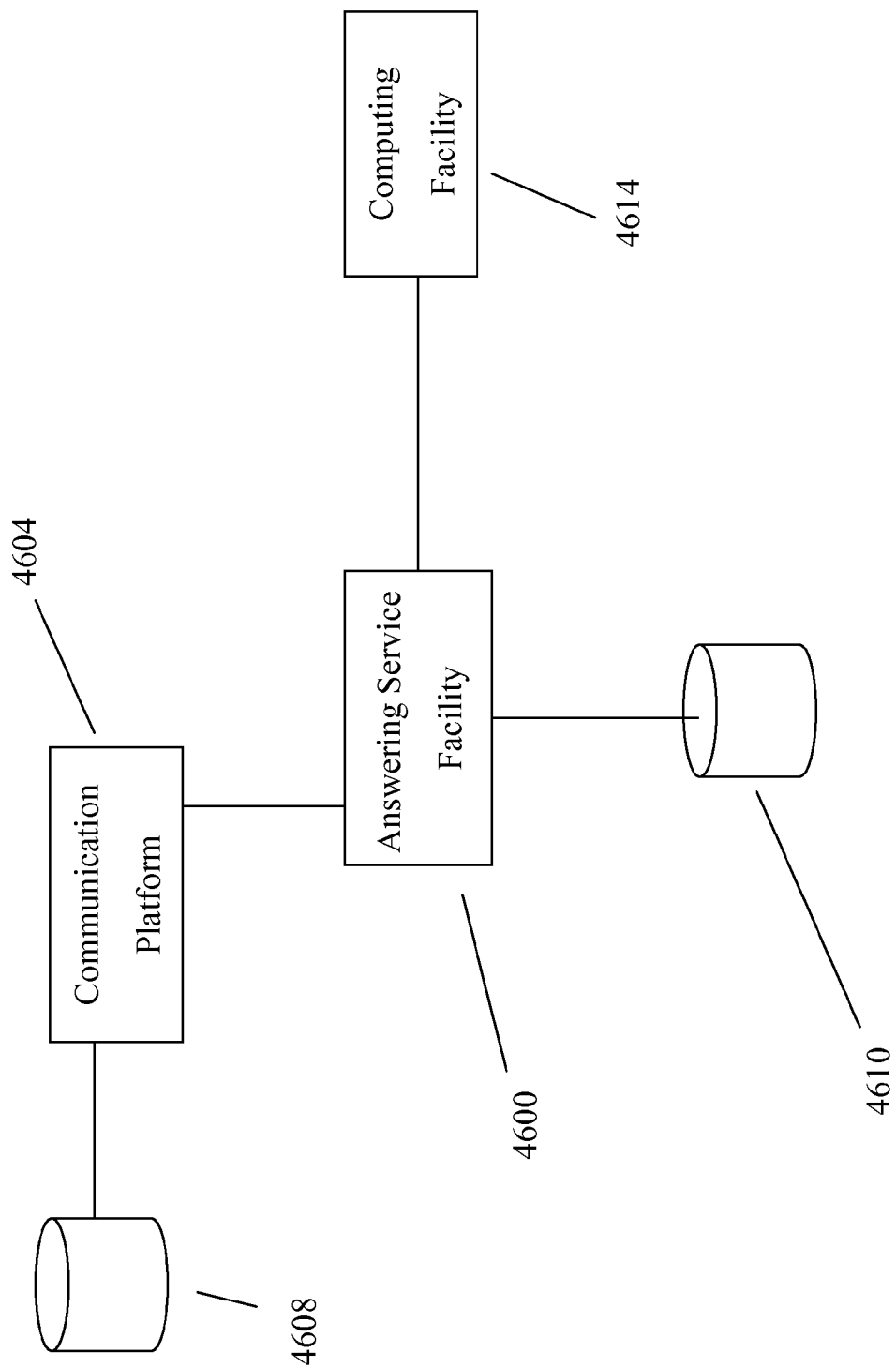
FIG. 46 illustrates an answering service facility according to the principles of the present invention.

FIG. 46 illustrates an answering service facility 4600 according to the principles of the present invention. In an embodiment, the answering service facility 4600 includes a facility for receiving calls from a communication platform 4604 (e.g. a cell phone). For example, the answering service facility 4600 may include a receiving facility for receiving calls through a cell phone network facility, land-line facility, computer network facility, voice-over-IP facility, or other facility designed to provided connectivity between the answering service facility and a communication platform 4604. The communication platform 4604 may include a database 4608. In embodiments, the answering service facility 4600 may in a database 4610. In embodiments, the answering service facility 4600 may be associated with a network and or other computer system 4614.

In embodiments, a user may use a communication platform 4604 (e.g. a cell phone) to communicate with an answering service facility 4600. The user may initiate communication with the answering service facility 4600 by calling an access number (e.g. phone number of a store) and the answering service facility may respond by presenting an automated menu of options to be listened to and or selected. One such menu option may be to download information. For example, the option number one may be to download information relating to the dialed number (e.g. store information, business information, or residence information). The user may select this menu option and the information may be downloaded to the cell phone. The information may be downloaded as a text file, email file, short message file, voice file, image file, picture file, cookie or other file or message. The information may pertain to store information, residential information, business information, corporate information, sale information, weather information, show information, time information, distance information, location information, direction information, congestion information, airport information, wait time information, security information, advertisement information, phone number information, web information, map information, closest store information, inventory informa-tion, store item information, price information, coupon information, coupon with expiration information, or other information.

In embodiments, the communication platform 4604 is associated with a sensor or location based facility (e.g. a gps location system, cell phone triangulation system). The location based facility may provide information pertaining to the location of the communication platform and or information pertaining to another facility's location. The location based facility may also provide information pertaining to routes, directions, route conditions, map information, or other information desirable by the user.

In embodiments, the communication platform 4604 includes a database 4608. The database 4608 may be an internal or external database adapted to store and retrieve information. For example, the user may download certain information (e.g. directions) from an answering service facility 4600 and store the information on the database 4608. The user may also later retrieve the information stored on the database 4608. In embodiments, the data stored on the database 4608 may be text, image, picture, voice, or other data.

In embodiments, the answering service facility 4600 includes a database 4610. The database 4610 may be used to store and or retrieve information. For example, the database 4610 may be used to store and retrieve information pertaining to competitors locations, traffic congestion, roadwork information, web information, customer information, customer purchasing habit information, wealth information, personal preference information, store preference information, advertisement information, coupon information, sale information, inventory information, item information, hours of operation, location information, general information, ticket information, event information, residence information, office information, emergency information, weather information, attendance information, crowd information, delay information, menu information, option information, financial information, text information, visual information, audio information, or other information.

In embodiments, the answering service facility 4600 communicates to another computing facility 4614. The communication to the other computing facility 4614 may be through wired, wireless, networked, direct connection or other method of communication. The other computing facility 4614 may be used to calculate, process, derive or otherwise manipulate data. For example, the other computing facility 4614 may be used to process information retrieved from the answering service facility's 4600 database 4610 or from the communication platform 4604 or other facility.

In embodiments, communication between the communication platform 4604 and the answering service facility 4600 may include data over voice communication. For example, a user may be communicating with the answering service facility 4600 via voice communication while at the same time receiving, or transmitting, data from (or to) the answering service facility 4600. This technique may be used to facilitate perceived quick downloads. In embodiments, the information download may start automatically such that even prior to the request for information, information is being downloaded.

In embodiments, the answering service facility 4600 communicates via a separate data transfer or file transfer. In embodiments, the transfer may follow the termination of the voice call. For example, a user calls the answering service facility 4600, requests information, and then terminates the call. The answering service facility 4600 may then follow with a separate text message, or some other form of message, to the phone that was used to make the request (or to another facility if so directed).

An aspect of the present invention relates to an answering service facility adapted to respond in a pre-configured manor upon recognition of a caller identification. In embodiments, an answering service facility is adapted to recognize certain callers through their caller id number (e.g. their phone number). Once an answering service facility recognizes the caller id, it may react in certain pre-loaded ways. For example, a user may use his cell phone to call his home answering service facility and the home answering facility may recognize the phone number as the home owner. The answering service facility may then communicate with the user as the homeowner by, among other things, presenting the user with a menu of items or actions that can be performed. For example, the provided menu may allow the playback of messages, personal messages, record a message, receive a data download, receive location information, associate the answering service facility with another facility, direct calls, forward calls, direct saved messages, re-direct saved messages or provide for other actions.

In embodiments, an answering service facility is configured to download information to a users portable communication facility upon the recognition of an access code. In embodiments, the access code is determined through caller id, or other automatic recognition methods. In embodiments, the access code is entered by a user. For example, the user may speak, type, or otherwise enter an access code that the answering service facility is adapted to recognize.

In embodiments, the answering service facility is adapted to access another computing facility and download information from the other computing facility. For example, a person may load information on his home computer and want to access it at a later time. By calling the answering service facility and entering the access code, or having it automatically recognized, the user may be able to instruct the answering service facility to access the information and have it downloaded. A user may store a packing list, grocery list, personal list, word file, text file, excel file, data file, image, picture, graphics, or other information on the second computing system for retrieval through the answering service facility. In embodiments, such information may be stored directly on the answering service facility or a database associated with it.

Referring again to FIG. 46, the communication platform 4604 may communicate with the answering service facility 4600 and access information from the computing facility 4614. In an embodiment, the computing facility 4614 may be integrated into the answering service facility. A user may use this communication method to access, review, send, redirect or otherwise use the information on the computing facility. For example, the user may access the computing facility and send a file (e.g. shopping list) to another facility (e.g. store, ordering facility or website).

An aspect of the present invention relates to systems and methods of communicating digital information associated with print advertisements and other print material. In embodiments, a communication platform is used to receive digital information from another communication facility associated with the print material. For example, a print advertisement (e.g. a magazine advertisement) may include an RFID transmitting facility and a portable communication facility (e.g. a cell phone) may be used to interrogate the RFID transmitting facility to receive information stored in the RFID transmitting facility.

Figure 47:
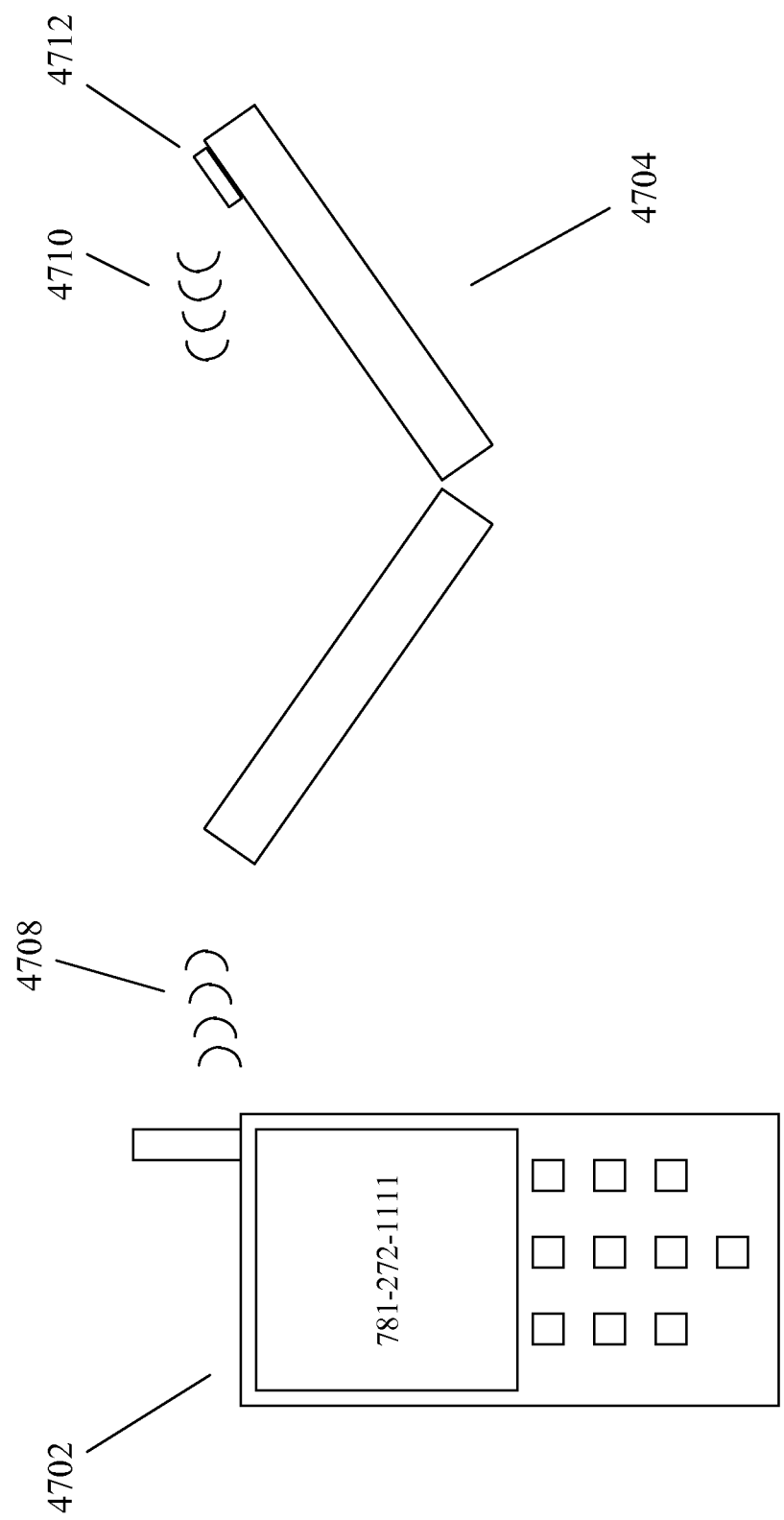
FIG. 47 illustrates a communication platform that includes an RFID interrogation facility to communicate an interrogation signal according to the principles of the present invention.

FIG. 47 illustrates a communication platform 4702 that includes an RFID interrogation facility to communicate an interrogation signal 4708 according to the principles of the present invention. The interrogation signal 4708 may be directed to activate an RFID tag 4712 associated with a print advertisement 4704. The print advertisement 4704 may be an advertisement, or other information, in a newspaper, magazine, book, paper, or other print. The information stored in the RFID tag may include advertising information, location information, coupon information, store information, access information, ticket information, phone information, direction information, web information, instruction information, or other information. For example, a user may open a phone book and find a business he is looking for. He uses the interrogation facility in his cell phone to extract information from the RFID tag associated with the business' advertisement and store it on his phone. The information may then be associated with the address book in the phone and retrieval of the information may be obtained through the address book. In another example, a person may be reading a magazine or newspaper and he may see some information he would like to save or otherwise use. He then uses his interrogation facility to extract the information stored on an associated RFID tag for use and or later retrieval.

Figure 48:
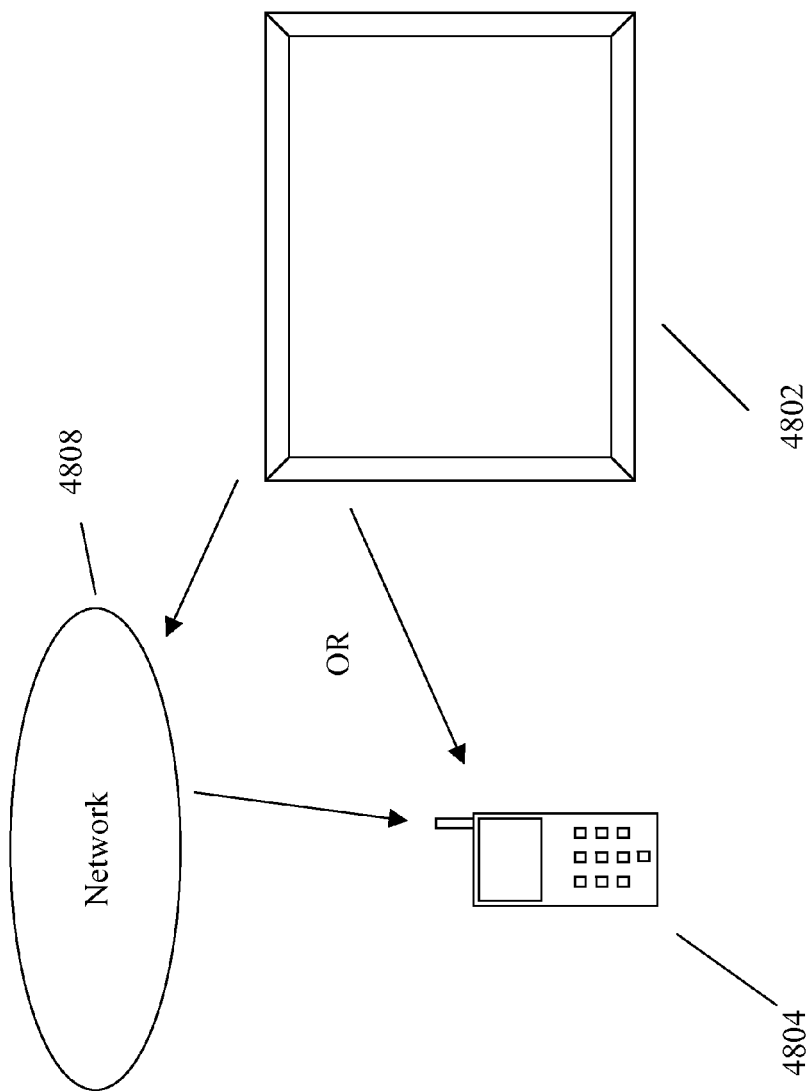
FIG. 48 illustrates an electronic information repository with a display and a communication platform adapted to communicate with the information repository according to the principles of the present invention.

FIG. 48 illustrates an electronic information repository with a display 4802 and a communication platform 4804 adapted to communicate with the information repository 4802 according to the principles of the present invention. In embodiments, the communication platform 4804 may communicate directly with the information repository (e.g. through wireless, IR, RF, flashing sequences on the display). In embodiments, the communication platform 4804 may communicate in-directly with the information repository (e.g. through a computer network or cell network). The information repository may include information pertaining to advertisements, locations, directions, or other information.

Figure 49:
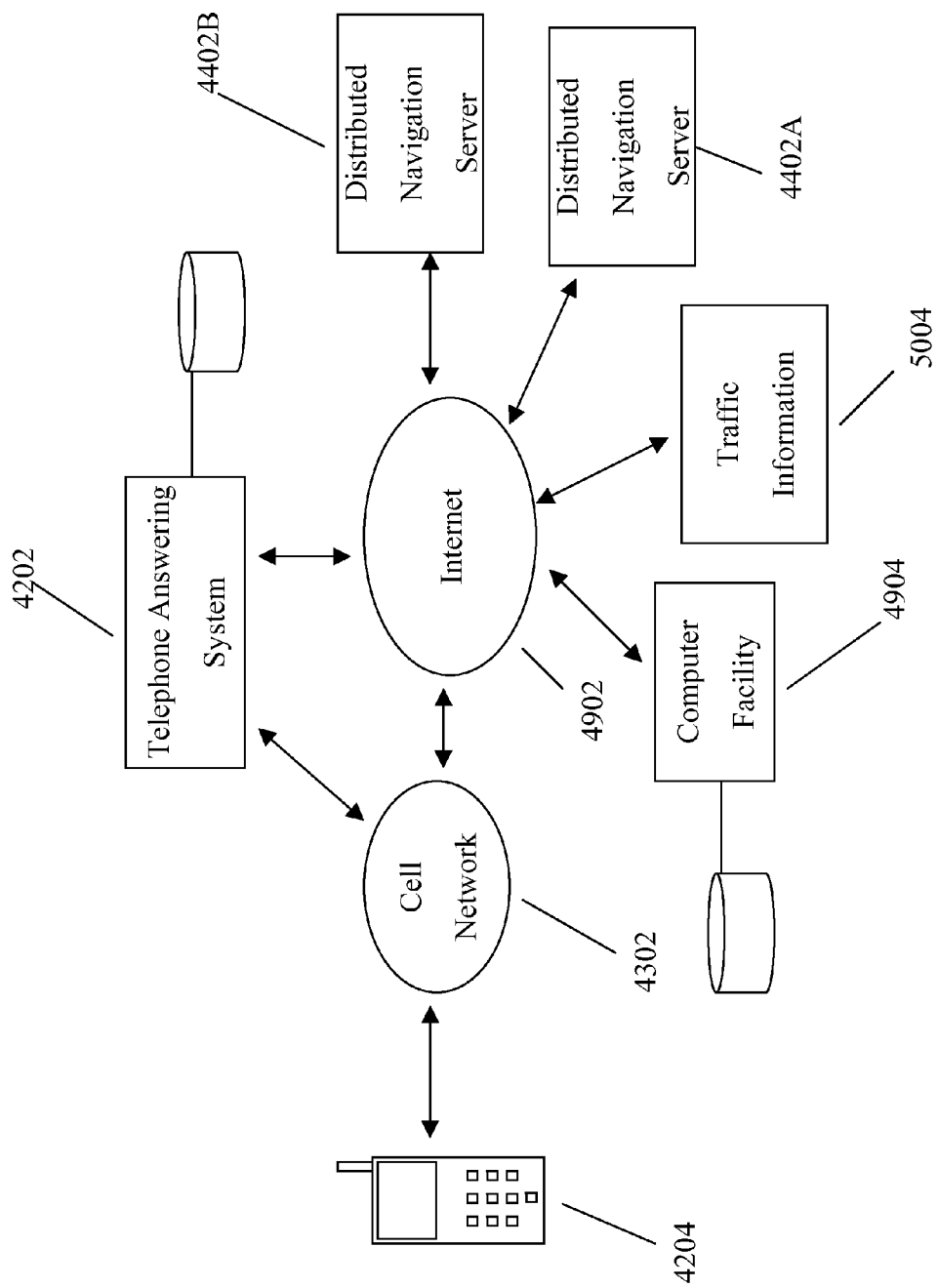
FIG. 49 illustrates an embodiment where a telephone answering service facility 4202 is in combination with other systems to facilitate the communication of information.

FIG. 49 illustrates an embodiment where a telephone answering service facility 4202 is in communication with other systems to facilitate the communication of information. For example, the telephone answering facility 4202 may be associated with the internet 4902 or other network. The telephone answering service facility may access information or provide information to a number of other facilities associated with the internet 4902. For example, one or more distributed navigation servers 4402 (e.g similar to that disclosed in connection with U.S. Pat. Nos. 6,615,131 and or 6,405,123, both of shich are incorporated by reference herein) may be associated with the internet and may provide and or receive information from the telephone answering service facility 4202. One or more other computing facilities 4904 may be associated with the internet and provide or receive information from the telephone answering service facility 4202. In embodiments, a mobile communications network 4302 may be associated with the telephone answering service facility directly and or through the internet 4902. While this embodiment is described in connection with communications facilitated through the internet, or network in general, it should be appreciated that one or more or all of the described facilities may be combined and or directly associated in an embodiment and such variants are encompassed by the present invention.

Continuing the discussion related to FIG. 49, by way of example, a user may use his mobile communication facility 4204 (e.g. cell phone, mobile phone, satellite phone, internet phone, network phone, portable communication facility, wireless phone, pda, combination pda/mobile phone, Palm® system, Blackberry® system, in-vehicle communication facility, in-vehicle navigation facility, in-vehicle information facility) to call a store, company, residence or the like and the automated telephone answering service facility 4202 may respond to the call. In embodiments, the mobile communication facility may be adapted with navigation software and interact with external computing systems to provide the user with navigation and or directions (e.g. similar to that disclosed in connection with U.S. Pat. Nos. 6,615,131 and or 6,405,123, or similar to the mobile Navigation products offered through Nextel®) The user may then be presented with a menu of options, asked for voice prompts, or otherwise engage in a interaction with the automated telephone answering service facility 4202. One such interaction may be to provide the user with directions, navigation, route information, store information, traffic, inventory or the like (e.g. such as that described herein). Upon request, or through automatic download, the telephone answering service facility 4202 may provide the information in a number of ways. In embodiments, the telephone answering service facility responds by communicating the information directly to the cell phone user (e.g. through text messages, route information, navigation instructions). In embodiments, the telephone answering service facility 4202 may operate locally or within an intranet to collect and communicate the information. In another embodiment, the telephone answering facility 4202 may communicate through the internet 4902, or other network, to gain information from one or more of the distributed navigation servers 4402 and or another computing facility 4902. In another embodiment, the telephone answering service facility 4202 may receive the call from the user's mobile communication facility 4204 and then send the call and or call information, possibly along with other store information, to one or more of the distributed navigation servers 4402. The distributed navigation servers 4402 may then communicate directly with the user through the mobile communication facility 4204. In an embodiment, a traffic information facility may be associated with the network of devices to provide or receive traffic information.

Figure 49A:
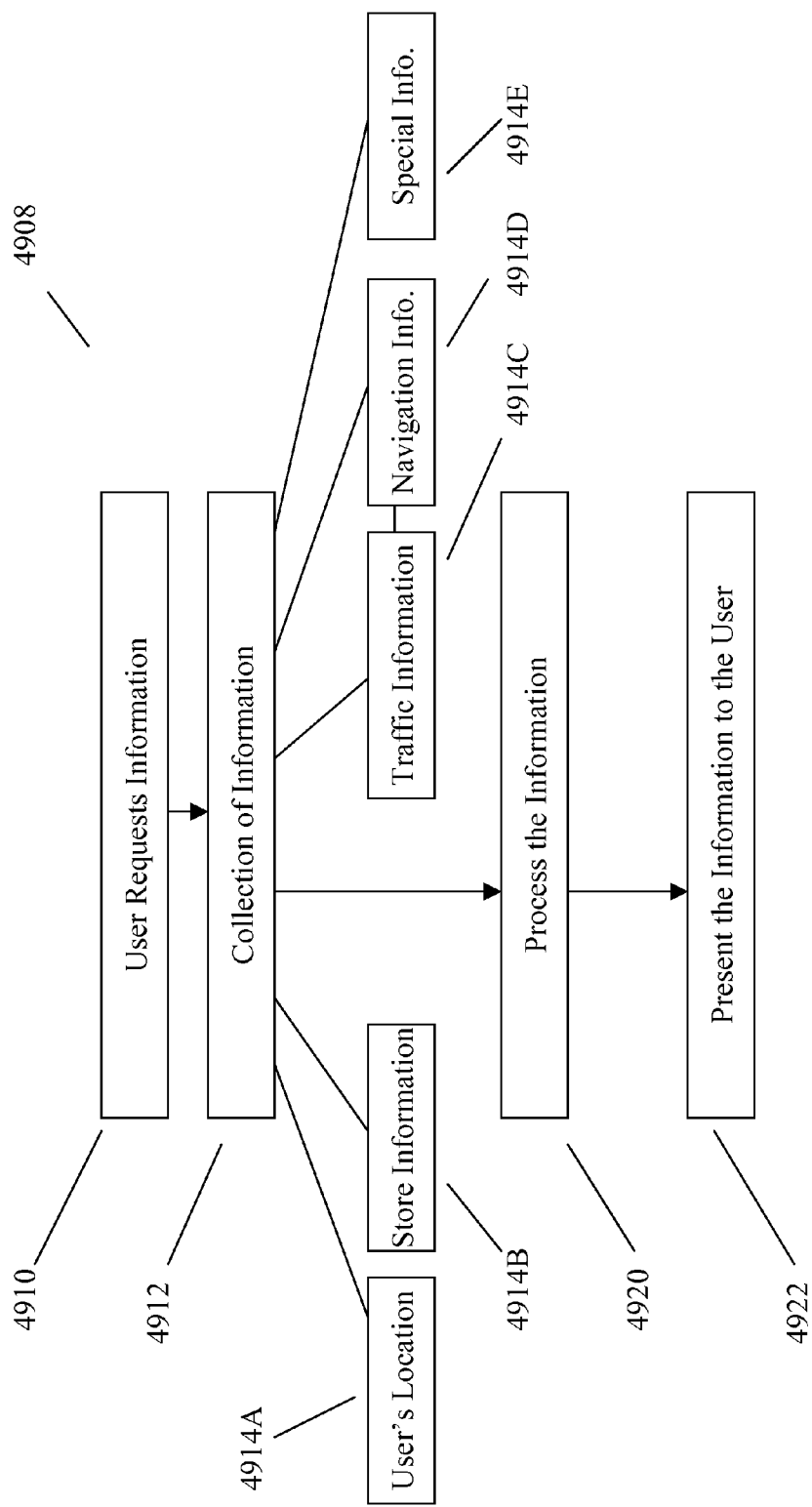

FIG. 49A illustrates a process for presenting a mobile communication facility user with information 4908. In this embodiment, the process begins with a user requesting information 4910. For example, the user may use his mobile communication facility to connect with a navigation facility, other route information facility, telephone answering service facility, or other computer facility. Once the user has requested information (e.g. navigation, route or store information), relevant information is collected 4912. For example, information maybe collected from several sources 4914, such as collecting the user's location (e.g. through a gps location facility) 4914A, collecting store, corporate, or residential information 4914B, route and or traffic information 4914C, navigation information 4914D (which may be interrelated with the traffic and or route information 4914C), and or special information relating to the user's request (e.g. special local navigation instructions, special local information). Once the information is collected, the information may be processed to create a format presentable to the user 4920. Then, the information may be presented to the user 4922. In the presentation of the information, real-time navigation may be presented and or other route information, directions, store information, sale information, contact information, or other desirable information.

Figure 50:
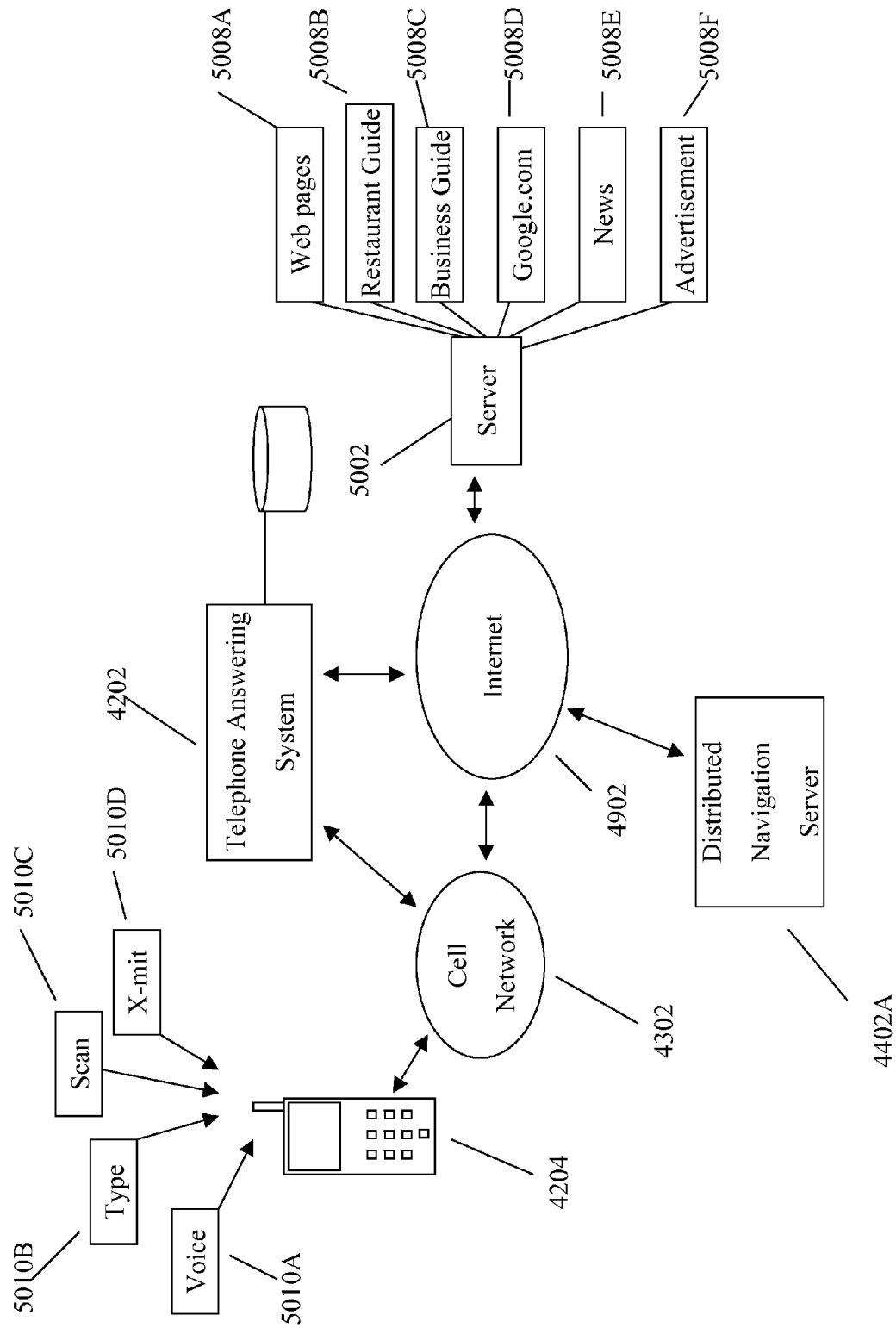
FIG. 50 illustrate several systems and methods for loading destination information into such systems.

An aspect of the present invention relates to systems and methods of providing navigation systems, route information systems, and the like with destination information. In embodiments, the destination information may be provided through various sources to make it convenient for a user of such route and navigation systems to load the desired destination. In embodiments, these systems and methods maybe useful in providing customers, friends, business colleagues, or others with information pertaining to the destination. For example, FIG. 50 illustrate several systems and methods for loading destination information into such systems. In this embodiment, the user may call a telephone answering service facility 4202 and the telephone answering service facility 4202 may provide destination information to a navigation or route information facility 4402 (e.g. as described herein above). The information may contain the location of the store, company, residence or the like that the telephone answering service facility 4202 is associated with. In embodiments, the information provided by the answering facility 4202 may include information unrelated to directions, route information, or navigation information. For example, the answering facility 4202 may provide information relating to the business or residence the answering facility 4202 is associated with (e.g. sales information, inventory, special directions, hours of operation). In embodiments, the user may use his mobile communication facility 4204 to receive a transmission 5010D from another source, scan information 5010C, type or key in information 5010B, and or speak information 5010A and then transmit this information to a navigation and or other route information facility 4402. The information may come from books, print ads, other mobile communication facilities or other sources external to the communication device that contains the desired information.

In embodiments, a user may use his mobile communication facility 4204 to communicate with websites 5008 and gain information from the websites that can be used by the navigation and or other route information facilities. For example, a user may gain access to websites relating to a restaurant guide, business guide, google.com (or other search engine), a news site, an advertisement, a corporate site, retail site, restaurant site, or other websites that contain destination information. In embodiments, once the site is accessed, the relevant information may be extracted and communicated to the navigation and or other route information facility 4402. The information may flow back to the phone and then to the navigation facility or it may flow without the aid of the phone. Once the destination information is loaded into navigation facility, the navigation facility may assess the location of the cell phone (e.g. through gps and or cell phone triangulation techniques) to then calculate a route, provide navigation, provide traffic information, alternative route information or other information described and or encompassed by the present invention.

In embodiments, a user may enter location/destination information into an address book in the user's mobile communication facility and the information from the address book may be communicated to a navigation facility and or other route information facility. For example, the user may receive a transmission including the location information from an external source and load it into his address book for later submission to a navigation and or other route information service. In embodiments, the transmission may come from another mobile communication facility, an RFID tag (e.g. an RFID tag associated with a product, advertisement, sales information) or other source of transmitted information. In an embodiment, the user may use a voice recognition system in the mobile communication facility to recognize the location and or destination information. In embodiments, this information may then be directly transmitted to a navigation and or other route information facility. For example, the information may be recognized and organized in a format compatible with the navigation/route information facility and the navigation/route information facility may provide the user with navigation and or other route information through a transmission to the mobile communication facility. In embodiments, the user may be using a mobile communication facility that is associated with a scanner (e.g. incorporated into the mobile communication facility, or separate from but associated with the mobile communication facility) and the user may use the scanner to scan and load location/destination information into the mobile communication facility for transmission to a navigation and or other route information facility. In embodiments, the scanned information may be loaded into an address book in the mobile communication facility for later transmission to a navigation and or other route information facility.

Figure 51:
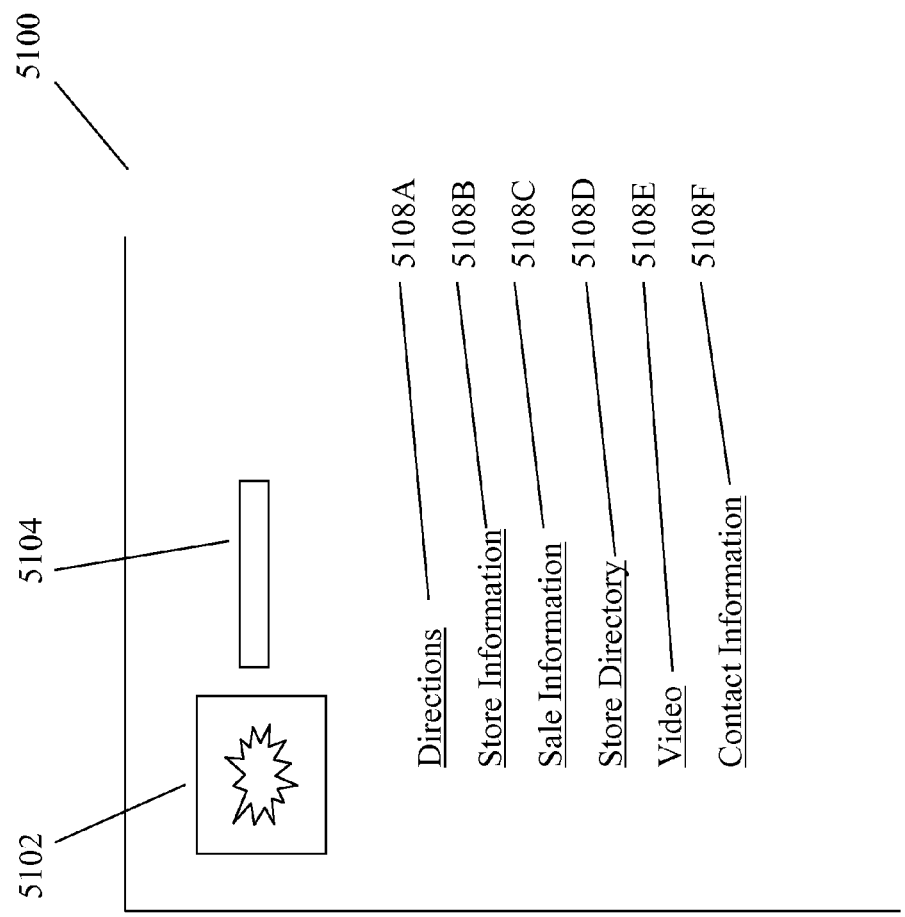
FIG. 51 illustrates a screen shot from a mobile communication facility according to the principles of the present invention.

FIG. 51 illustrates a screen shot 5100 from a mobile communication facility according to the principles of the present invention. In embodiments, a user may use a mobile communication facility to access information from a telephone answering service facility (e.g. as described in connection with other embodiments herein) to download information relating to navigation, route, store, business or other information related to the business, residence, corporation, and or location with which the telephone answering service facility is associated. As described herein above, in embodiments, the telephone answering service facility may then communicate information to the user directly, through a route information and or navigation facility, or in coordination with another facility, such as a route information and or navigation facility. In embodiments, the information provided to the user may include a corporate logo 5102, trademark, service mark and or other tag line 5104, and or a menu of options 5108. In embodiments, the menu of options may be links to websites and or connections to information stored locally (e.g. connections to information that has been downloaded). For example, the menu may include connections to directions/navigation/route information 5108A, store and or corporate or residential information 5108B, sale/inventory information 5108C, store or corporate directory (e.g. names, departments, contact information) 5108D, video information (e.g. corporate video, retail video, home video, advertisement, sales video) 5108E, contact information 5108F and or other connections to useful information.

Figure 52:
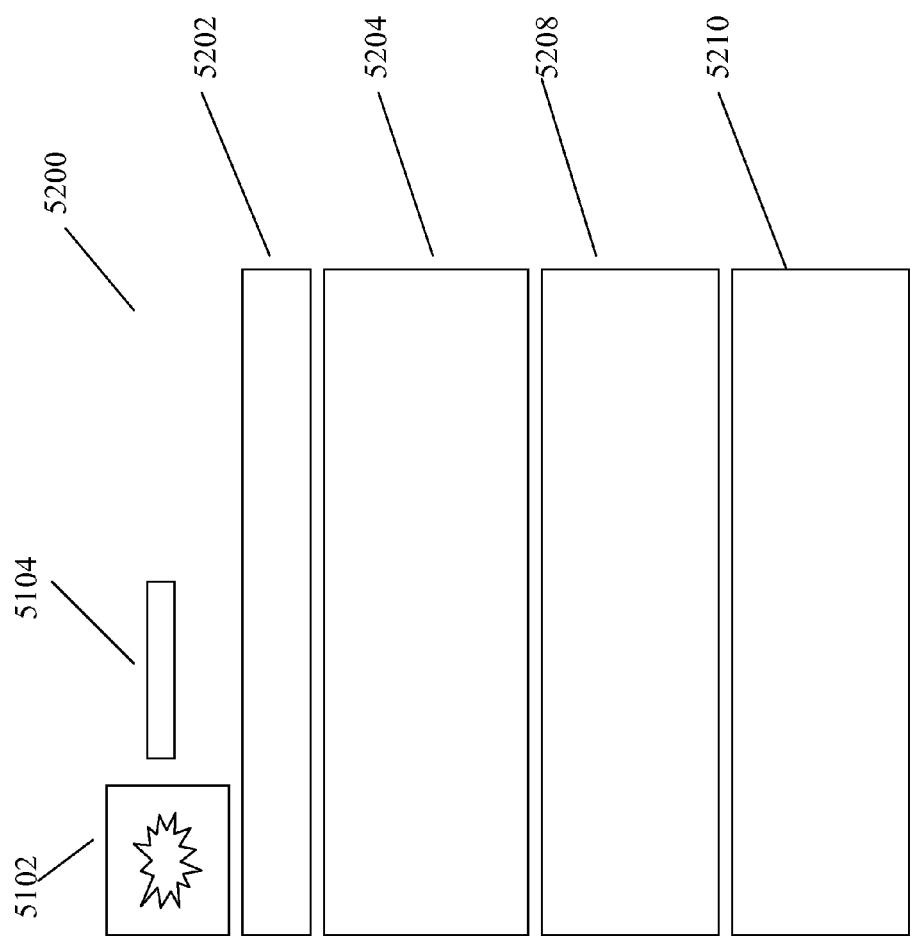
FIG. 52 illustrates a screen shot from a mobile communication facility according to the principles of the present invention.

FIG. 52 illustrates a screen shot 5200 from a mobile communication facility according to the principles of the present invention. In an embodiment, the content provided may be separated into more then one screen, page, or display. In other embodiments, the content may be provided, or substantially provided, on a single screen, page, or display. In an embodiment, a scrolling facility may be available to allow the user to scroll through the content. In the embodiment illustrated in FIG. 52, the screen shot contains a logo 5102, trademark, service mark or other tag line 5104, header information 5202, directions, route information, and or navigation information 5204, special local directions, information and or navigation information (e.g. parking garage is located behind the building, enter and go to elevators on right, there is construction on the main road, so enter via secondary route on first avenue) 5208, and store, corporate, residential or other information relating to the location (e.g. sale information, advertisements, store directory, corporate directory, custom information for user) 5210.

In embodiments, the screen shot 5200 includes special local information 5208. This information may be collected and presented in a many ways, each of which is encompassed by the present invention. For example, a user may call a telephone answering service facility to obtain automated navigation and or other route information and the telephone answering service facility may collect and process the information to be provided to the user and then transmit the information to the user via his mobile communication facility. In embodiments, the telephone answering service facility coordinates the collection process and transmission through other facilities, such as those embodiments described in connection FIGS. 49 and 50. For example, once the call is received by the telephone answering service facility, the telephone answering service facility may communicate the local information 5208, and the other location specific information (e.g. logo, trademark, header, special directions, store information), to the navigation facility and the navigation facility may present all of the information to the user such that it appears presented from a single source, possibly approved by the location he originally called. In another embodiment, the user may call, or otherwise connect with, the navigation facility to request information on a store, business, residence, landmark or other location and the navigation facility may collect the local information discussed in connection with the embodiment of FIGS. 51 and 52 to present it to the user.

An aspect of the present invention relates to systems and methods for providing secure location based services. In embodiments, location based services are provided through a mobile communication facility, such as a mobile cell phone or personal digital assistant. The mobile communication facility may be used to provide location information to another facility to complete a transaction, navigate, obtain location information, and or to perform other functions, for example. In embodiments, the mobile communication facility may be adapted with a security facility to provide secure and or limited access to the location information that may be obtained from the mobile communication facility. For example, the security facility may provide the user with a user interface that provides one or more selections of what other facilities, businesses, groups of businesses, people, groups of people, or otherwise identified or unidentified facilities are permitted to access the location information. In embodiments, the user is presented with a menu style option list. In embodiments, the security facility is presented as a spam filter or other similar screening facility. In embodiments, the security facility is implemented through an encryption facility, using, for example, a key system and or public/private key system or other key or permission style facility.

Figure 53:
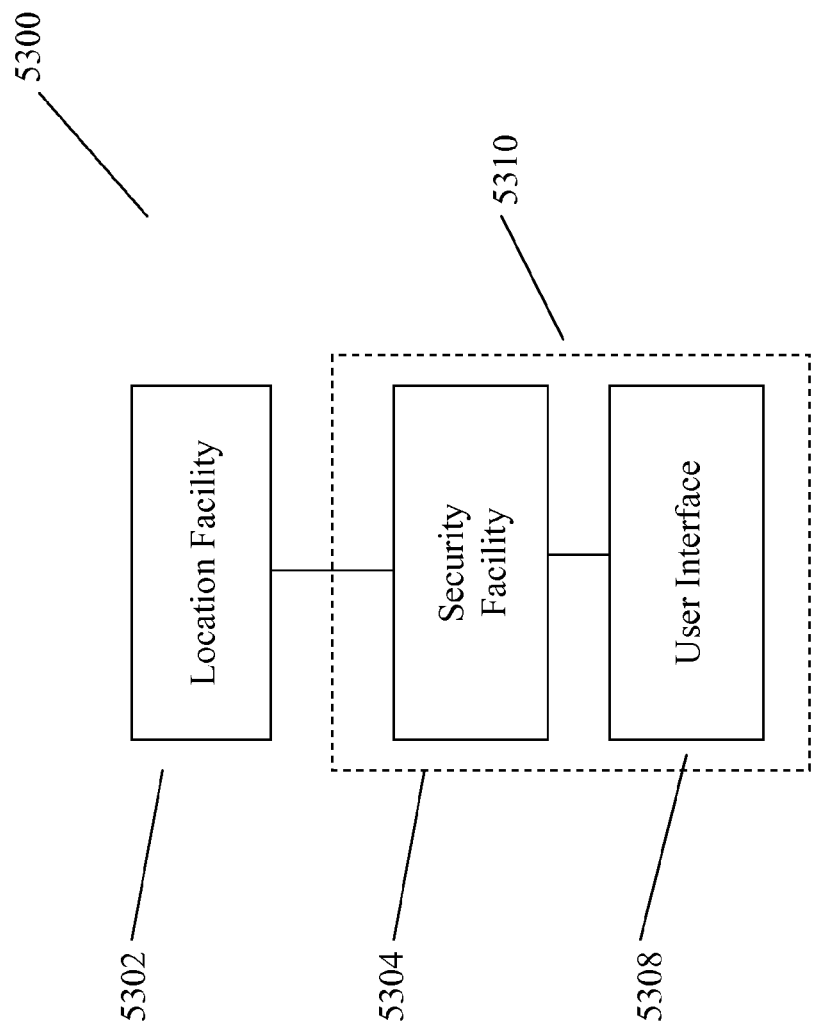
FIG. 53 illustrates a secure location based service process according to the principles of the present invention.

FIG. 53 illustrates a secure location based service process 5300 according to the principles of the present invention. In embodiments, the flow of location information to a location facility 5302 is regulated through the use of a security facility 5304 and a user interface 5308. In embodiments, the user interface 5308 and the security facility 5304 may be provided in another facility, such as a mobile communication facility for example.

An aspect of the present invention is a method or system for providing a secure location based service. The method may involve providing a security facility adapted with a user interface; and manipulating the user interface to select one or more security settings related to at least one location based service. In embodiments, the user interface is provided through a mobile communication facility. In embodiments, the mobile communication facility comprises at least one of a cell phone and a personal digital assistant. In embodiments, the user interface provides a menu of options. In embodiments, the user interface provides a plurality of options wherein the plurality of options relate to at least one of different location based services, different entities, different people, and different locations.

Figure 54:
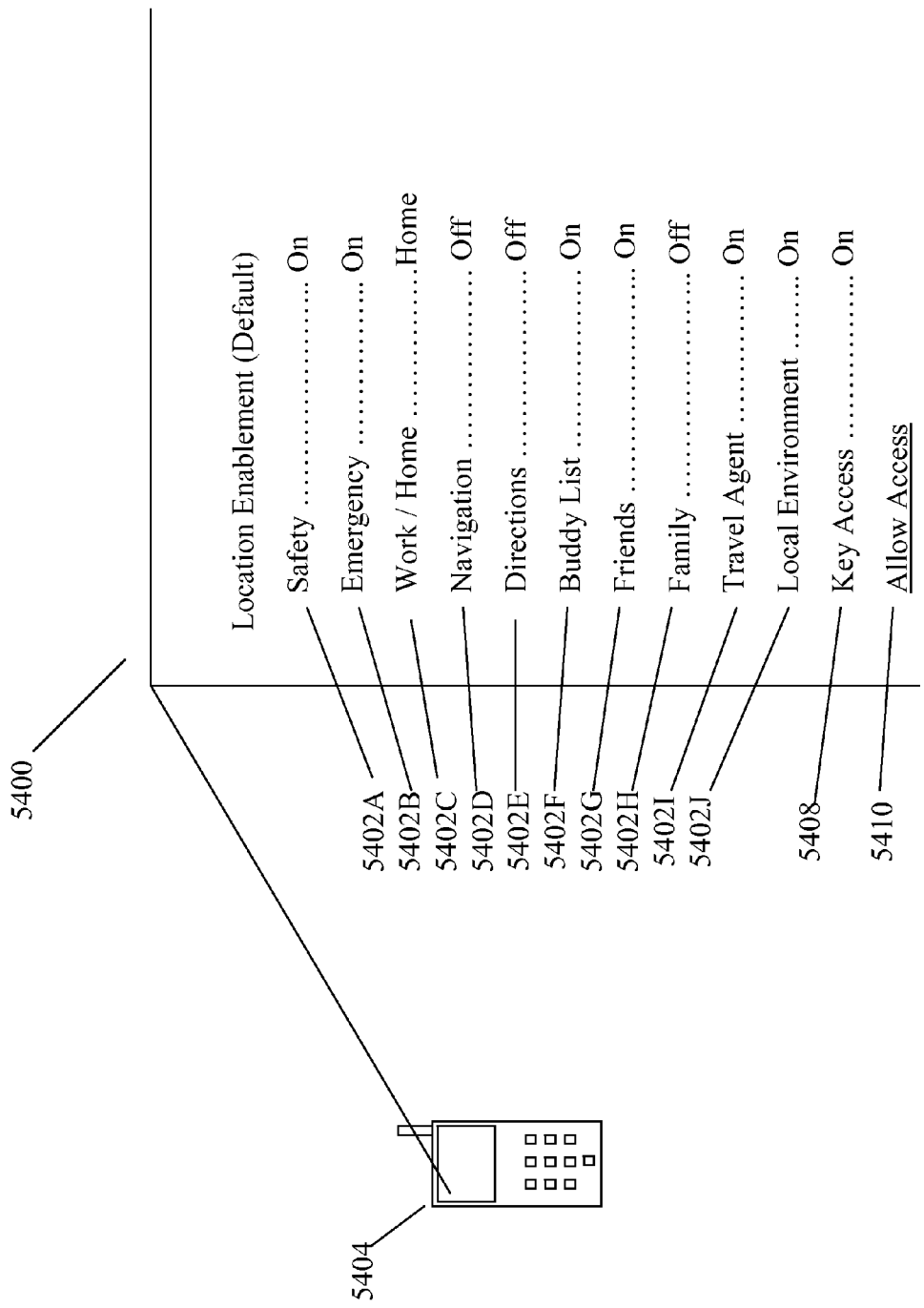
FIG. 54 illustrates a secure location based service user interface.

FIG. 54 illustrates a secure location based service user interface 5400. The user interface 5400 may be presented through a mobile communication facility 5404 by providing a user with a software generated interface. In this embodiment, the user interface is presented with a menu of selectable and or alterable selections 202A-J. For example, link 202 may be provided to enable, disable, or otherwise control the access of the mobile communication facilities location. In embodiments, groups of people or entities are presented through a link. For example, a user may have a 'buddy list' where known people or entities are known and this group may be identified with link 202F. The user may enable or disable this group's access to information in the mobile communication facility (e.g. location information). Other group examples include work, colleagues, home, family, navigation facilities, direction facilities, traffic facilities, friends, agents, travel agent, lawyer, or other groups, entities, and or individuals. Links such as emergency and safety may also be provided to allow the user control of emergency and or safety facilities access to information. In embodiments, links to allow identified access 210 may also be presented. For example, the user may be presented with information that a someone is attempting to obtain information from the user's mobile communication facility and the user may then have the ability to enable or disable the access. The link 210 may also be programmed to provide the user with control over all access. For example, by enabling access through the link, the user may be granting everyone access or certain predetermined groups access to the information. In embodiments, the interface may include a link to control 'keyed' access where a request provided with appropriate key information may be controlled.

An aspect of the present invention is a method or system for providing a user interface for a secure location based service. The method may involve providing a mobile communication facility; and providing a user interface through the use of the mobile communication facility; wherein the user interface allows the selection of a plurality of alternative security settings. In embodiments, the plurality of security settings includes categories of at least one of facilities, people, entities, and location services. In embodiments, the categories further provide the user the ability to selectively turn on or off another parties ability to access an associated location. In embodiments, the categories relate to at least one of friends, family, buddy list, address book, safety, emergencies, work, home, navigation, directions, travel agent, local environments, retail stores, corporations, advertisers, list of acceptable facilities to access the associated location, and list of not acceptable facilities to access the associated location.

An aspect of the present invention is a method or system for providing a user interface for a secure location based service. The method may involve providing a mobile communication facility; and providing a user interface through the use of the mobile communication facility; wherein the user interface provides access to an associated location following identification of a facility requesting access and permission being granted. In embodiments the requesting facility sends a request command to the mobile communication facility in an attempt to gain access to the associated location and the user makes a selection on a portion of the user interface to allow access; wherein upon approval of access, the mobile communication facility provides location information to the requesting facility or provides access to the location information to the requesting facility. In embodiments, the location information is provided through an encryption technique. In embodiments, the encryption technique comprises a public key private key protocol. In embodiments, the encryption technique comprises an encryption key protocol.

An aspect of the present invention is a method or system for providing a user interface for a secure location based service. The method may involve providing a mobile communication facility; providing a user interface through the use of the mobile communication facility; wherein the user interface provides the user the ability to turn keyed location requests on or off. In embodiments, the keyed location request is a private/public key request. In embodiments, the keyed location request is an encrypted key request.

Figure 55:
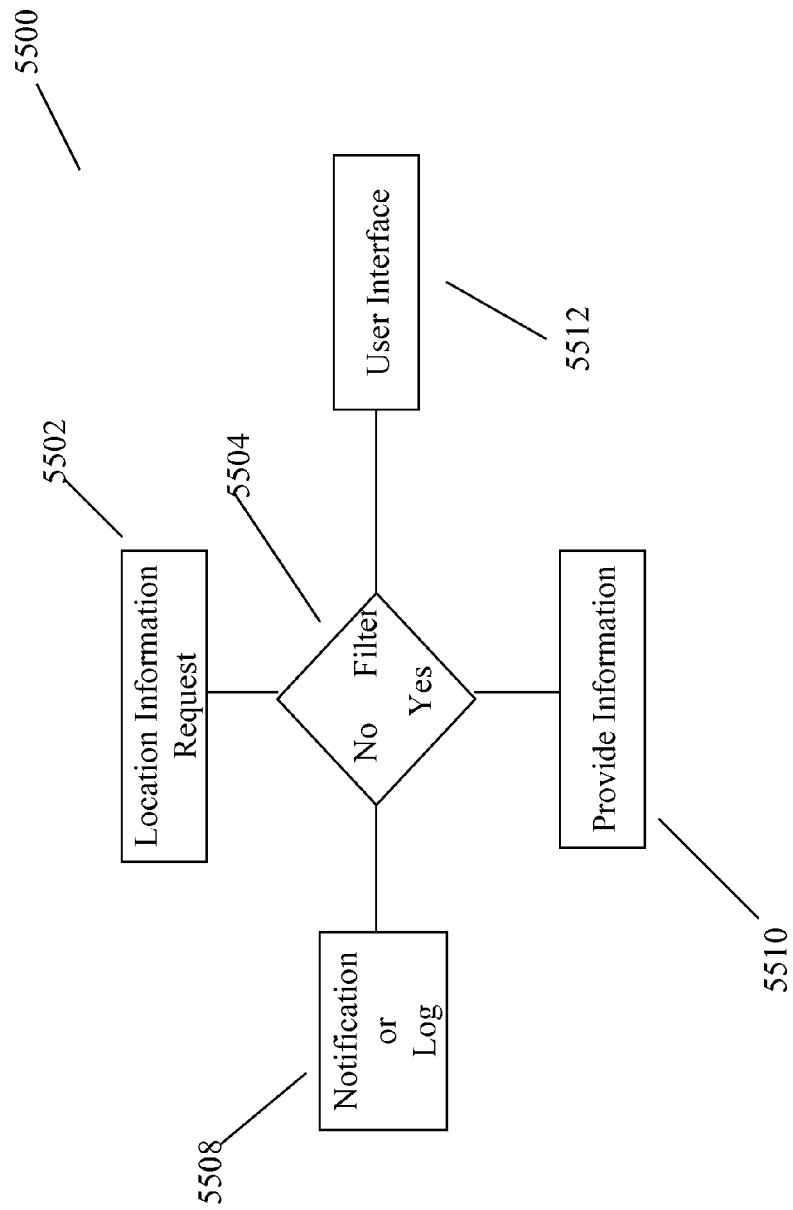
FIG. 55 illustrates a process for providing secure location information transactions through the use of a user interface controlled filter.

FIG. 55 illustrates a process for providing secure location information transactions 5500 through the use of a user interface 5512 controlled filter 5504. In embodiments, the process involves providing a filter 5504 adapted to filter acceptable location requests and unacceptable location requests. For example, the filter may be adapted to allow location information to be provided to certain facilities (e.g. a navigation facility with the designated key) and the location information (e.g. provided through a gps chip in a mobile communication facility) may be provided upon request 5510. The filter may be adapted to compare the requestor or type of information requested by an external facility with the acceptable conditions under which to provide location information and provide information when the appropriate conditions are met. Likewise, in embodiments, the filter may be adapted to disallow the providing of location information if the filter criteria are not met. In embodiments, the filter may be adapted to log the event and or information relating to the location information request in a notification log when information is requested. In embodiments the log may be set to record all requests, allowed requests, and or disallowed requests. In embodiments, the filter may be adapted to provide the user notification of the event and or information relating to the location information. In embodiments the log may be set to provide notification of all requests, allowed requests, and or disallowed requests. In embodiments, the notification 5510 may communicate a 'de-list' request to the requesting facility to request the location facility to remove the user from it's contact list or otherwise block future access requests. In embodiments, the de-list request may be communicated to another facility for reporting such request activity.

An aspect of the present invention is a method or system for providing secure location information. The method or system may involve providing a filter adapted to filter location requests; communicating a location request to the filter;

providing location information when the location request meets specified filter criteria; and not providing location the location information when the location request does not meet the specified filter criteria. In embodiments, the filter is adapted to be modified through a user interface. In embodiments, the filter is adapted to be used in a mobile communication facility. In embodiments, the method or system may further comprises logging information related to the location request. In embodiments, the method or system may further comprises providing an alert that location information was requested. In embodiments, the method or system may further comprises providing an alert that location information that did not meet the filter criteria was requested. In embodiments, the method or system may further comprises providing an alert that location information that met the filter criteria was requested.

Figure 56:
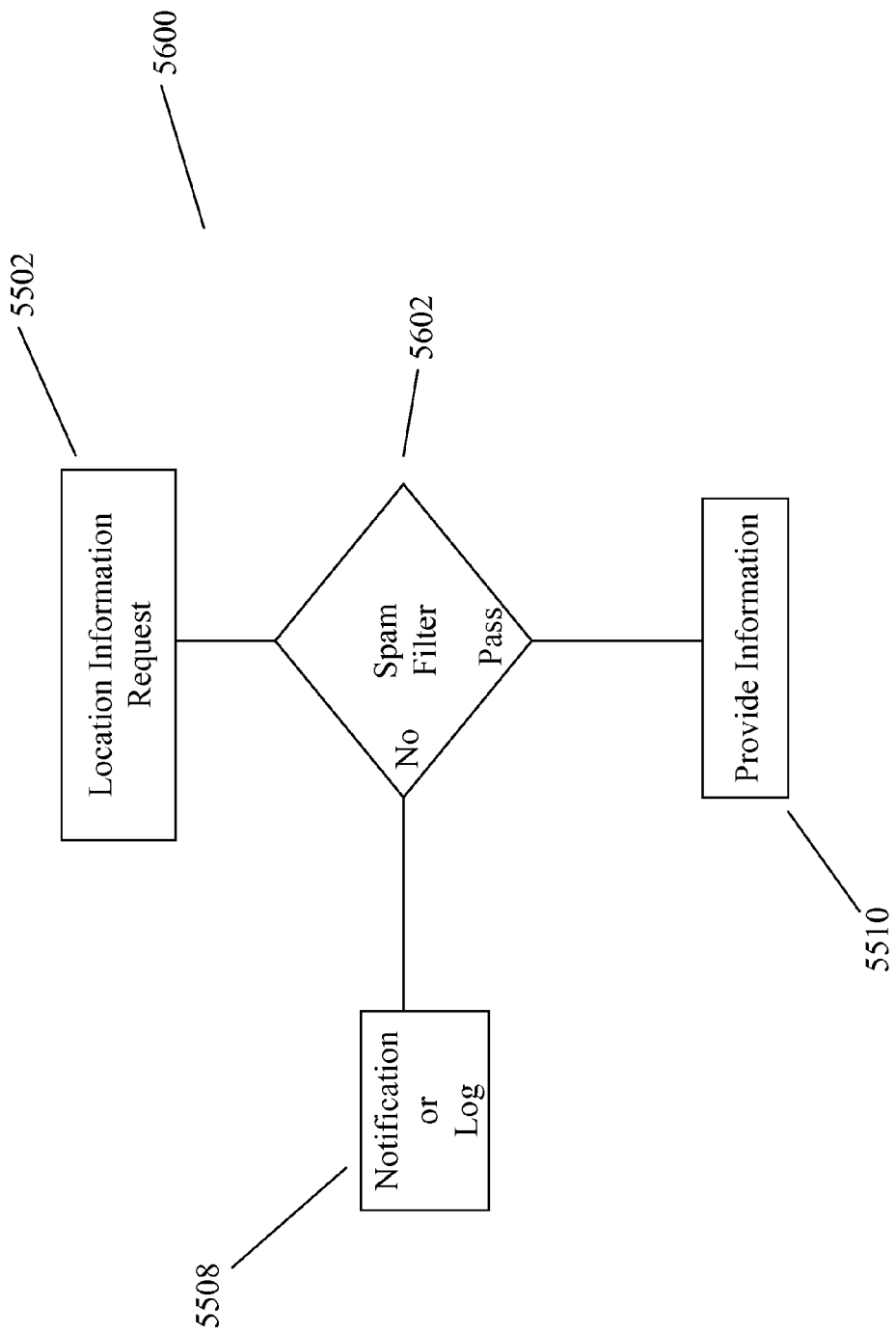
FIG. 56 illustrates a process for providing secure location information transactions through the use of an automatic filter for unwanted requests (e.g. a spam filter).

FIG. 56 illustrates a process for providing secure location information transactions 5500 through the use of an automatic filter 5602 for unwanted requests (e.g. a spam filter). In embodiments, the spam filter may examine the headers and or content of the request, and look for various features. Each feature may be associated with a score (which may be negative). The scores of all the features found may be totaled, and a higher total score may indicate that the message is more likely to be spam and as a result not allowed to pass and or the filter may be used to prevent location information from being communicated to the requestor. In an embodiment a request with a total score over some predetermined amount (e.g. 5) is filtered, and possibly logged or used to provide notification. In embodiments, the user may adjust this predetermined amount higher, to let in more location requests and block fewer legitimate location requests, or lower, to block more spam and risk blocking more legitimate location requests. In embodiments, a user may change the "spam score threshold" on his mobile communication facility, on a related facility, through an associated website facilitating spam filter settings, or the like. In embodiments the spam filter may use location request origin, the software used to send the request, what the request looks like, messages within the request, terms within the request, or other information related to the request as an indication of spam content. In embodiments, if the spam filter passes the request as legitimate, location information may be provided (e.g. from the gps location facility in a mobile communication facility) 5510. In embodiments, if the spam filter does not pass the request as legitimate, a notification may be sent to the user, and or the request may be logged 5508.

Figure 57:
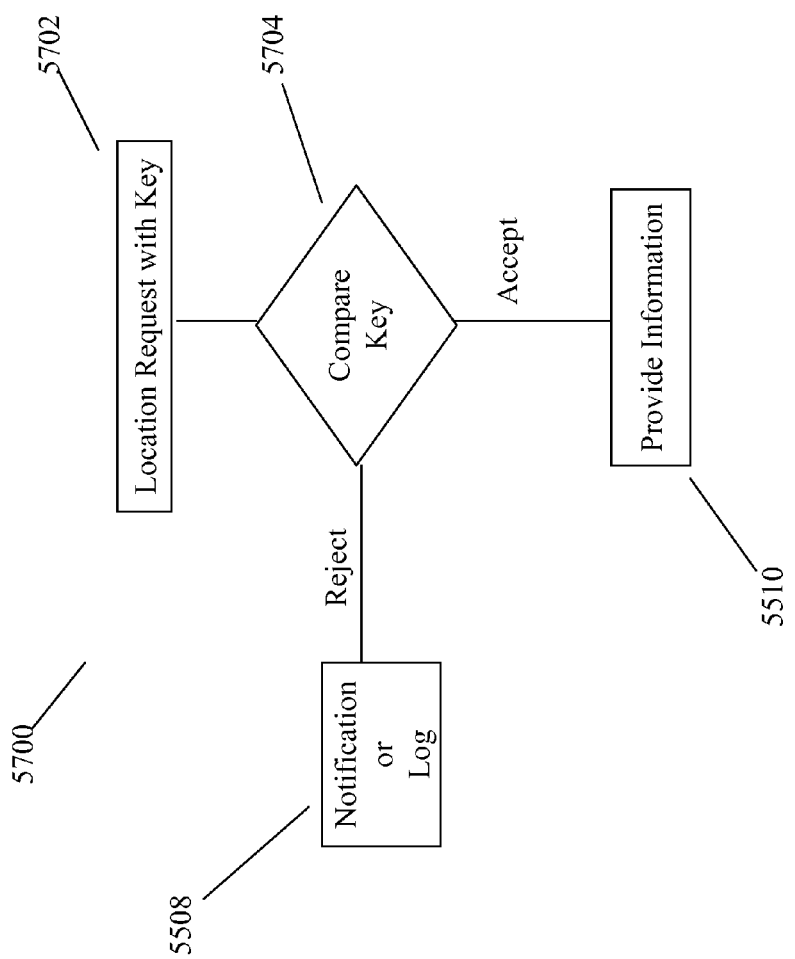
FIG. 57 illustrates a process for providing secure location information in coordination with a key facility.

FIG. 57 illustrates a process for providing secure location information 5700 in coordination with a key facility 5704. In embodiments, the process involves receiving a location request with key information 5702, upon receipt of the key information, the key information may be compared with acceptable keys 5704. In the event the keys match, the location information may be provided 5510. In the event the keys do not match, the location information may not be provided and the request may be logged and or a notification of the request may be provided to a user. There are many techniques envisioned and encompassed by the present invention relating to providing location information to known users or users with approved access. Embodiments involve receiving location information requests through the use of passwords, digital signatures, private keys, public/private keys and or other techniques useful in identifying the source of the request and or identifying the approval level of the request/requestor.

Embodiments involve encrypting the request and or the location information being requested. For example, a cryptographic system that uses two keys—a public key known to everyone and a private or secret key known only to the recipient of the request. In embodiments, the private key may be used to accept the in-bound request and or be provided with the requested location information. For example, a location service may request the location of a mobile communication facility and the request may be accompanied by key information 5702. The key information may have been previously obtained from the user of the mobile communication facility or otherwise obtained authorized key information. Once the location information is received by the mobile communication facility along with the key information, the mobile communication facility may compare the received key information with the user's key information 5704. If they match, or otherwise indicate authorized access, the location information associated with the mobile communication facility may be provided to the service requesting the location information 5510. In the event the location request does not come with key information or appropriate key information, the location information may not be sent. The unauthorized request may also be logged and or a notification of the request may be communicated to the user of the mobile communication facility 5508. In embodiments, the key compare may be done through a facility other than the mobile communication facility. For example, the location information request may be communicated through another computing facility where the compare is completed. Once completed, an approved request may be communicated to the mobile communication facility.

Figure 58:
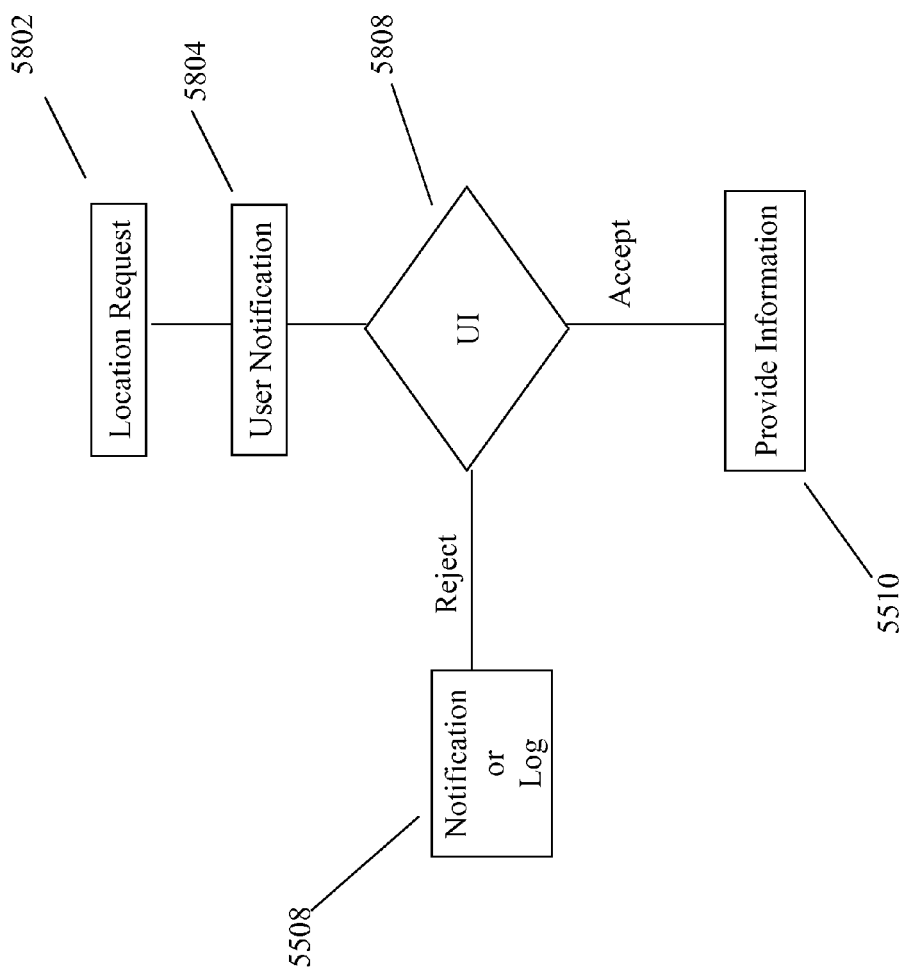
FIG. 58 illustrates an embodiment involving user approval prior to providing location information from the user's mobile communication facility.

FIG. 58 illustrates an embodiment involving user approval prior to providing location information from the user's mobile communication facility. For example, an external facility may request location information from the mobile communication facility 5802. The user may then be notified of the request 5804. The user may then review the information request, requestor information, or other information relating to the request to decide if he wants to provide the location information. The user may then interact with a user interface, on the mobile communication facility for example, to either permit or not permit the information to be communicated 5808. If he accepts the request, the information may be provided 5510. If he denies the request, the information may not be provided and the request may be logged and or other notifications may be provided.

Figure 59:
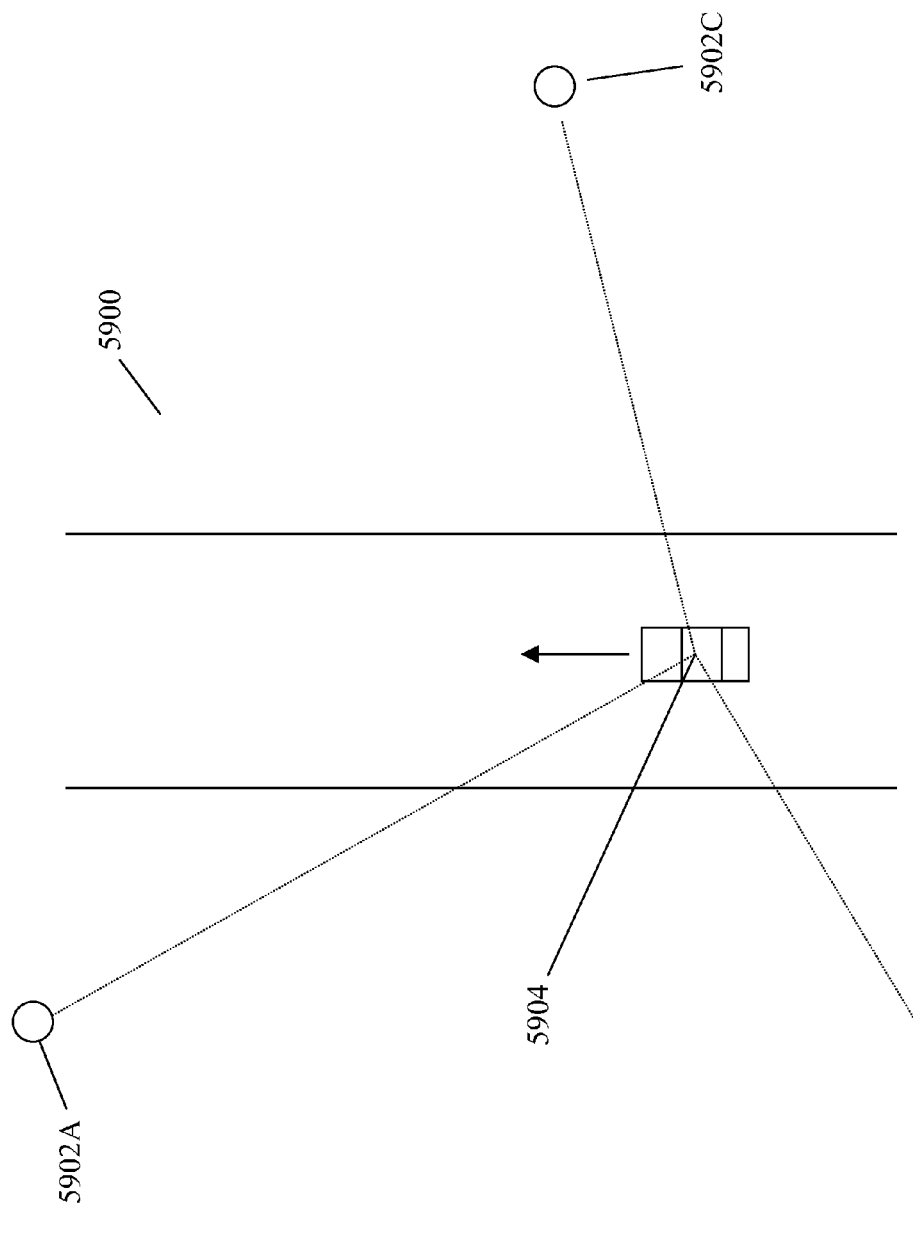
FIG. 59 illustrates a cell phone tower communication progression method and system according to the principles of the present invention.

FIG. 59 illustrates a cell phone tower communication progression method and system according to the principles of the present invention. In embodiments, a location facility may locate and or track the location of a mobile communication facility (e.g. a cell phone or in-vehicle communication facility). In embodiments, the methods and systems involve tracking the position of mobile communication facilities and identifying the best cell phone tower to be used. The evaluation of which cell tower to use may involve proximity to the towers and or prediction of progression of proximity to towers. For example, a mobile communication facility may be used in a vehicle and the vehicle 5904 may be traveling on a roadway. A location facility may track the location of the mobile communication facility and compare its location with one or more cell phone towers 5902A-C. The location system may also predict the path of the vehicle (e.g. by assessing what road they vehicle is on and the most likely progression), and predict which tower is going to provide the best service. in embodiments, the hand-off from one tower to another made be made at least in part by considering the mobile communication facility location, progression, and or predicted path.

Another aspect of the present invention relates to an automated telephone answering system (e.g. an integrated voice response system (IVRS)) with improved communication and navigation. In embodiments, the automated telephone answering system communicates with a web service and can transfer a received phone call to the web service. The web service can likewise transfer the call back to the answering system and or to a human operator for further interaction. For example, a user may use a cell phone to call a movie theater. The call may be answered by an automated telephone answering system and interact with the caller through a menu of options (e.g. "press 1 for . . . "). One of the options presented may be an option to interact further through a web page or other graphical network facility. The user may make the web interaction selection (e.g. through voice prompts or through cell phone number interaction). Upon receipt of the instruction, the telephone answering facility may send an instruction to the cell phone and the cell phone may they connect to the targeted website for interaction. The website may contain information much the same as the information that was available through the voice prompts and or other information and or interaction options. For example, the web interaction page may present movie times and upon selection of a movie time, the user may be able to purchase movie tickets. In embodiments, the cell phone has an economic transaction facility incorporated to facilitate making the transaction of buying the tickets. In embodiments, thicket purchase information may also be downloaded to the phone and the phone may be used at the theater to provide the purchased ticket information back. In embodiments, the telephone answering system, and or the associated web interaction facility may present information to the cell phone user based on the cell phone user's location, which may be obtained through a location facility for example.

Figure 60:
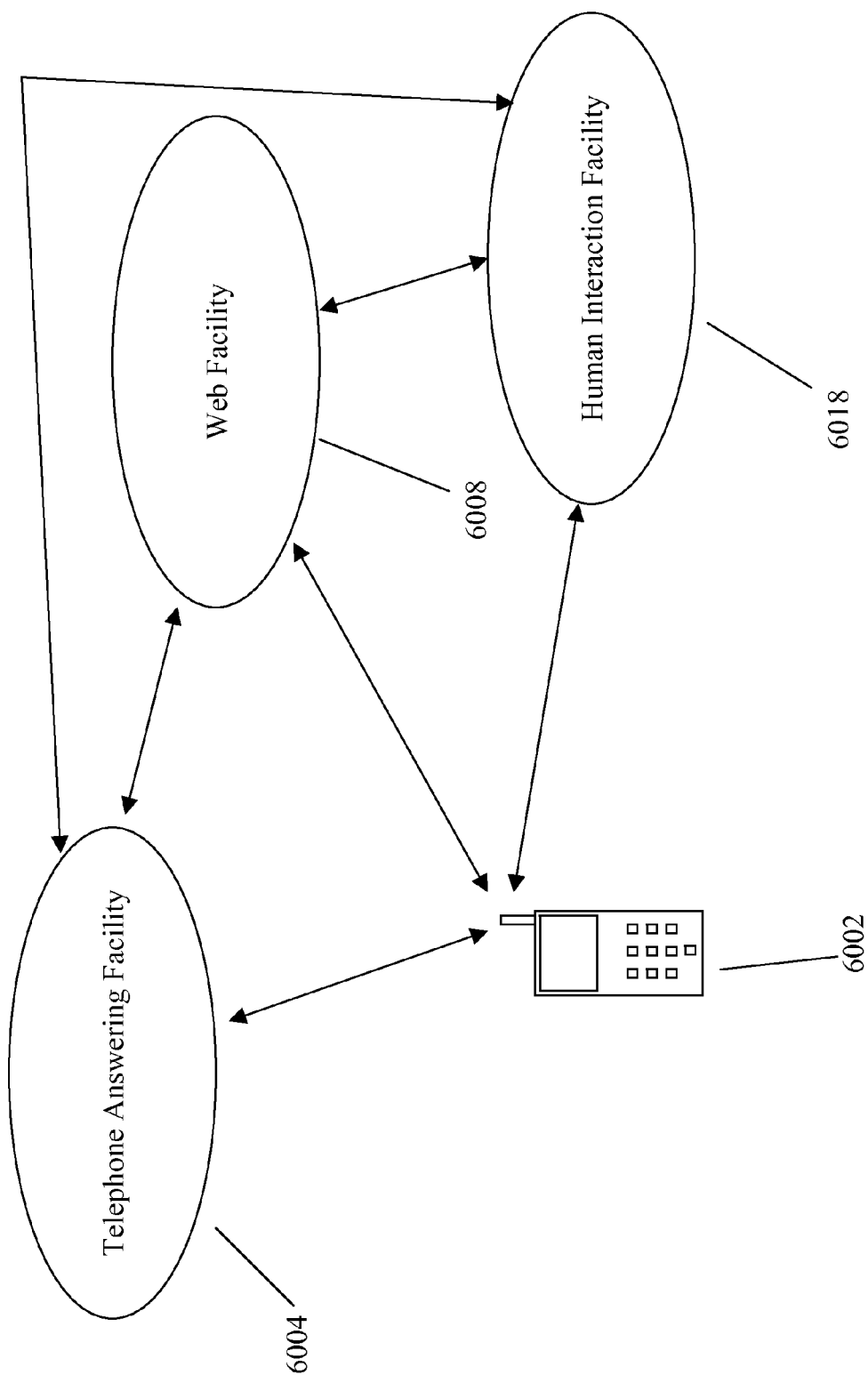
FIG. 60 illustrates an improved telephone answering system according to the principles of the present invention.

FIG. 60 illustrates an improved telephone answering system according to the principles of the present invention 6000. In embodiments, a mobile communication facility (e.g. cell phone) 6002 is used to call an establishment (e.g. business, store, residence, school, government office) and the call is received by an automated answering system (e.g. IVRS) 6004. The telephone answering system may respond to the call by providing an audio menu to the user of the phone (e.g. "press 1 for . . . "). One of the options presented through the audio menu may be to be connected to a web service for other options and or other and or further interactivity. For example, the answering system may respond by 'speaking' "press 5 to be connected to our web service." In embodiments, upon selection of the appropriate link (e.g. "5" in this example) the telephone answering system may redirect the phones communication to a web service. The web service may then download information to the mobile communication facility. The user of the mobile communication facility may then interact with the web service through the mobile communication facility. In embodiments, the web service may provide a link to transfer the call back to the telephone answering system. In embodiments, the web service may provide a link to be directed to a human operator for further human interaction. In embodiments, the web service may provide an indication of the expected wait time on the human operator link if chosen.

In embodiments, a mobile communication facility 6002 may be used to initiate a call to an automated telephone answering system 6004. As illustrated in FIG. 60, the mobile communication facility may also be used to directly interact with a web facility 6008 and or a human operator facility 6018. The call, or interaction, with one of the facilities may be passed, redirected, transferred, or otherwise coordinated by and or between the other facilities. For example, when the call is received by the telephone answering system 6004, it may coordinate the transfer of the communication to the web facility 6008 and or the human interaction facility 6018. Likewise, a call received by the human interaction facility 6018 may be transferred to the web facility 6008 and or the auto attendant 6004. Likewise, a web interaction may be transferred to the human interaction facility 6018 and or the auto attendant 6004.

Figure 61:
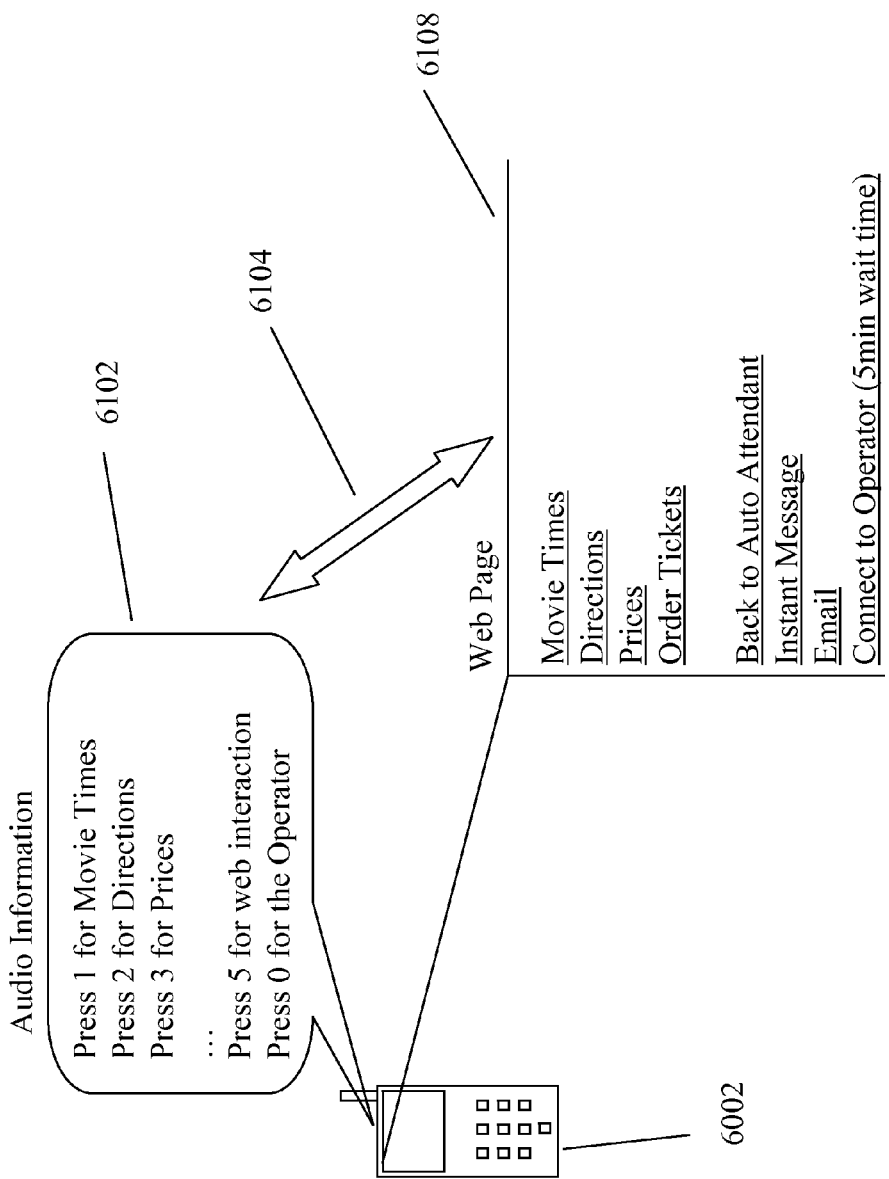
FIG. 61 illustrates an improved telephone answering process according to aspects of the present invention.

FIG. 61 illustrates an improved telephone answering process according to aspects of the present invention. In embodiments, a mobile communication facility 6002 may interact with a telephone answering facility and audio information 6102 may be presented to the user of the mobile communication facility 6002. The information may be presented as a menu of options for example. One of the options presented through the audio presentation of menu options may be to be transferred to a web service or other facility where graphics information may be presented. In the example presented in FIG. 61, the audible option for the transfer is option five. Once the user of the mobile communication facility selects option five (e.g. through a voice activation system or key activation system), the user may then be presented with information through a web service 6018 or other graphic user interface through the mobile communication facility. The transfer from the phone answering system to the web service may be provided through a connection facility 6104. The connection facility may be a system in the telephone answering facility, web facility, cell network, mobile communication facility or otherwise presented.

Figure 62:
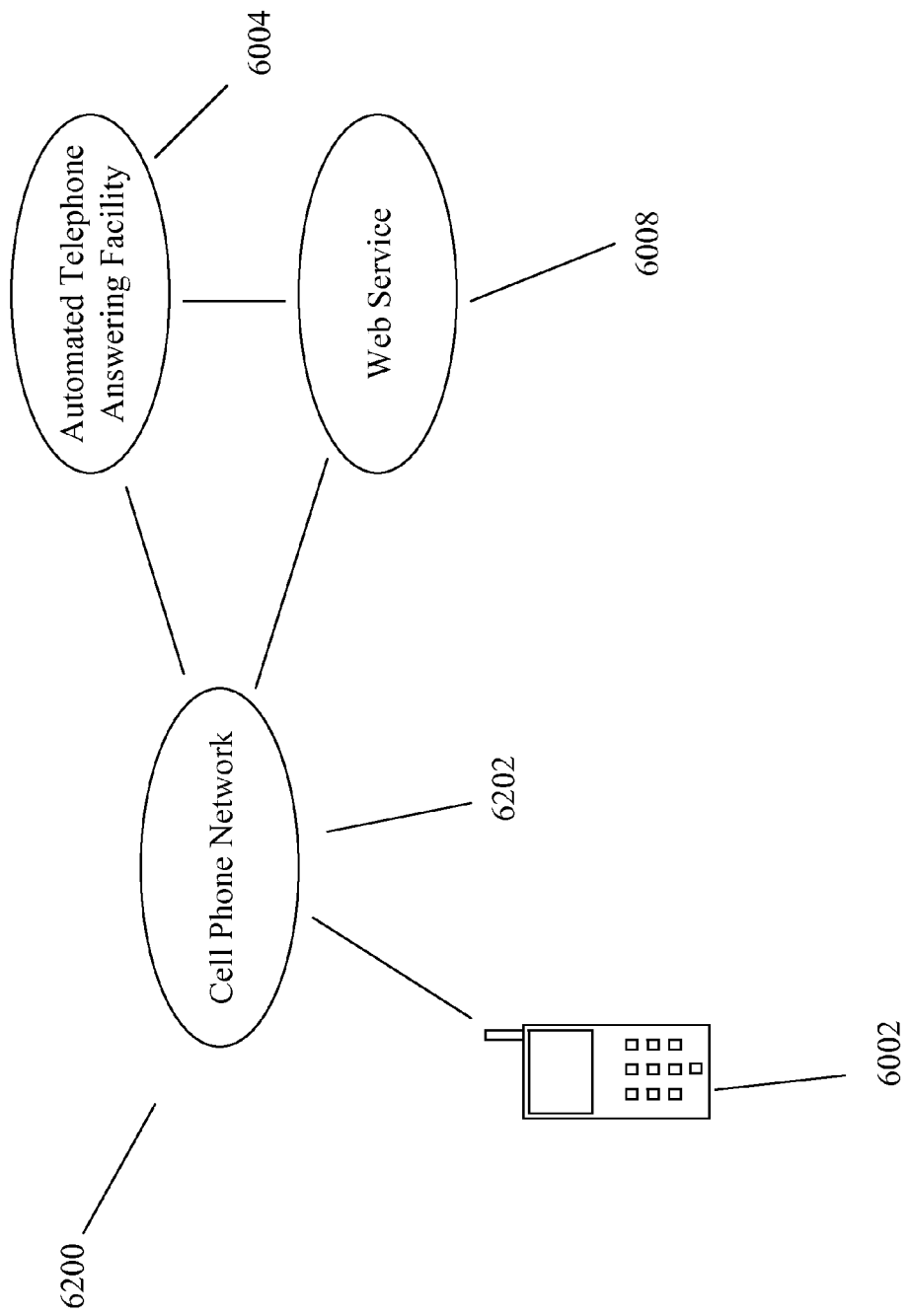
FIG. 62 illustrates a method of communicating with a telephone answering system and or a web service.

FIG. 62 illustrates a method of communicating with a telephone answering system and or a web service 6008. In embodiments, a mobile communication facility 6002 may be used to connect to an answering facility 6004 through a cell phone network 6204. The call interactions may be directed to the web service (e.g. through systems an methods described herein). The communications redirection(s) may be handled through the cell network 6204, telephone answering facility 6004, the web service 6008 and or another facility (not shown).

In embodiments, a mobile communication facility may be associated with a location service (e.g. through a cell phone triangulation location facility, or a gps facility) and a telephone answering facility and or web facility may be adapted to provide information related or based on the location, route, predicted route, or other location information. For example, a caller may call a "1-800" number and be received by a national answering facility. The national answering facility may assess the location of the caller and present information related to his location and or options based on his location. For example, a national retailer, such as the Gap, has stores throughout the US and a national call center may receive a call, assess the location of the caller, and present information (e.g. store locations) based on stores in close proximity to the caller's location. For example, the information provided may include directions, store hours, and or sale information and the information may be presented for the store(s) nearest to the caller.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

The invention claimed is:

1. A computer program product embodied in a non-transitory computer readable medium that, when executed on one or more computers, performs the steps of:
   Step One: identifying a first location, at time one, of a plurality of automobiles using triangulation to locate a cell phone within each of the plurality of automobiles, wherein the triangulation is initiated based at least in part on non-location data that is transmitted from the cell phone over a network that is utilized by the cell phone within each of the plurality of automobiles;
   identifying a second location, at a time two, subsequent to time one, for each of the plurality of automobiles using triangulation to locate the cell phone within each of the plurality of automobiles, wherein the triangulation is initiated based at least in part on non-location data that is transmitted from the cell phone over the network that is utilized by the cell phone within each of the plurality of automobiles;
   calculating a vehicle speed for each of the plurality of automobiles using the first location at time one and the second location at time two;
   using the calculated vehicle speed for each of the plurality of automobiles to create a traffic condition measure for a route in proximity to the first and second locations; and
   Step Two: iteratively performing Step One, in real-time, at a time interval to calculate a real-time traffic condition measure.

2. The computer program product of claim 1, wherein the real-time traffic condition measure is measure of traffic density.

3. The computer program product of claim 2, wherein the measure of traffic density is used to predict a travel time.

4. The computer program product of claim 3, wherein the travel time prediction is based at least in part on the measure of traffic density and at least one parameter.

5. The computer program product of claim 4, wherein the at least one parameter is a time of day corresponding to the real-time calculation of the traffic condition measure.

6. The computer program product of claim 4, wherein the at least one parameter is a day of the week corresponding to the real-time calculation of the traffic condition measure.

7. The computer program product of claim 4, wherein the at least one parameter is a weather condition corresponding to the real-time calculation of the traffic condition measure.

8. The computer program product of claim 4, wherein the at least one parameter is a road condition corresponding to the real-time calculation of the traffic condition measure.

9. A computer program product embodied in a non-transitory computer readable medium that, when executed on one or more computers, performs the steps of:
Step One: identifying a first location, at time one, of a plurality of automobiles using triangulation to locate a cell phone within each of the plurality of automobiles, wherein the triangulation is initiated based at least in part on non-location data that is transmitted from the cell phone over a network that is utilized by the cell phone within each of the plurality of automobiles;
identifying a second location, at a time two, subsequent to time one, for each of the plurality of automobiles using triangulation to locate the cell phone within each of the plurality of automobiles, wherein the triangulation is initiated based at least in part on non-location data that is transmitted from the cell phone over the network that is utilized by the cell phone within each of the plurality of automobiles;
calculating a vehicle speed for each of the plurality of automobiles using the first location at time one and the second location at time two;
using the calculated vehicle speed for each of the plurality of automobiles to create a traffic condition measure for a route in proximity to the first and second locations;
Step Two: iteratively performing Step One, in real-time, at a time interval to calculate a real-time traffic condition measure;
receiving a user request from a user's cell phone for traffic condition information associated with the route; and
presenting the real-time traffic condition measure to a display of the user's cell phone.

10. The computer program product of claim 9, wherein the real-time traffic condition measure presented to the display of the user's cell phone is created upon receipt of the user's request.

11. The computer program product of claim 9, wherein the user request is a manual request.

12. The computer program product of claim 9, wherein the user request is an automated request that is sent from the user's cell phone upon the user's cell phone entering a geographic location.

13. The computer program product of claim 12, wherein the geographic location is a geographic region.

14. The computer program product of claim 9, wherein the real-time traffic condition measure presented to the display of the user's cell phone derives from a second user's prior request for similar traffic information.

15. The computer program product of claim 14, wherein the second user's prior request is a manual request.

16. The computer program product of claim 14, wherein the second user's prior request is an automated request that is sent from a second user's cell phone upon the second user's cell phone entering a geographic location.

17. The computer program product of claim 16, wherein the geographic location is a geographic region.

18. A computer program product embodied in a non-transitory computer readable medium that, when executed on one or more computers, performs the steps of:
Step One: identifying a first location, at time one, of a plurality of automobiles using triangulation to locate a cell phone within each of the plurality of automobiles, wherein the triangulation is initiated based at least in part on non-location data that is transmitted from the cell phone over a network that is utilized by the cell phone within each of the plurality of automobiles;
identifying a second location, at a time two, subsequent to time one, for each of the plurality of automobiles using triangulation to locate the cell phone within each of the plurality of automobiles, wherein the triangulation is initiated based at least in part on non-location data that is transmitted from the cell phone over the network that is utilized by the cell phone within each of the plurality of automobiles;
calculating a vehicle speed for each of the plurality of automobiles using the first location at time one and the second location at time two;
using the calculated vehicle speed for each of the plurality of automobiles to create a traffic condition measure for a route in proximity to the first and second locations;
Step Two: iteratively performing Step One, in real-time, at a time interval to calculate a real-time traffic condition measure;
receiving a user request from a user's cell phone for traffic condition information associated with the route; and
presenting the real-time traffic condition measure to a display of the user's cell phone, wherein the presented real-time traffic condition measure is selected from a plurality of real-time traffic conditions measures based at least in part on the presented real-time traffic condition measure containing traffic data relating to a geographic area in proximity to a cell phone tower from which the user's request was received.

19. The computer program product of claim 18, wherein the presented real-time traffic condition measure is calculated upon receipt of the user's request.

20. The computer program product of claim 18, wherein the presented real-time traffic condition measure was calculated prior to receiving the user's request.

* * * * *

UNITED STATES PATENT AND TRADEMARK OFFICE
CERTIFICATE OF CORRECTION

PATENT NO.         : 8,478,512 B2                                   Page 1 of 1
APPLICATION NO.    : 13/295226
DATED              : July 2, 2013
INVENTOR(S)        : Edward H. Nortrup It is certified that error appears in the above-identified patent and that said Letters Patent is hereby corrected as shown below:

In the CLAIMS:

column 38, line 61, claim 2, delete "measure is measure" and insert --measure is a measure--.

Signed and Sealed this
Fourteenth Day of October, 2014

Michelle K. Lee
*Deputy Director of the United States Patent and Trademark Office*